(12) United States Patent
Potash

(10) Patent No.: US 10,095,641 B2
(45) Date of Patent: Oct. 9, 2018

(54) PROCESSOR WITH FRAMES/BINS STRUCTURE IN LOCAL HIGH SPEED MEMORY

(71) Applicant: Hanan Potash, Austin, TX (US)

(72) Inventor: Hanan Potash, Austin, TX (US)

( * ) Notice: Subject to any disclaimer, the term of this patent is extended or adjusted under 35 U.S.C. 154(b) by 225 days.

(21) Appl. No.: 14/863,032

(22) Filed: Sep. 23, 2015

(65) Prior Publication Data

US 2017/0083464 A1  Mar. 23, 2017

(51) Int. Cl.
G06F 13/36 (2006.01)
G06F 13/00 (2006.01)
G06F 13/28 (2006.01)
G06F 13/40 (2006.01)

(52) U.S. Cl.
CPC .......... *G06F 13/28* (2013.01); *G06F 13/4027* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 5,019,965 A | * | 5/1991 | Webb, Jr. | ............ G06F 12/0886 711/118 |
| 6,249,793 B1 | | 6/2001 | Printezis | |
| 6,604,148 B1 | | 8/2003 | Dennison | |
| 6,782,468 B1 | | 8/2004 | Nakazato | |
| 7,502,859 B2 | | 3/2009 | Inoue et al. | |
| 7,627,739 B2 | | 12/2009 | Farren et al. | |
| 7,685,409 B2 | | 3/2010 | Du | |
| 8,261,281 B2 | | 4/2012 | Kashyap | |
| 8,190,807 B2 | | 5/2012 | Reid et al. | |
| 8,453,126 B1 | | 5/2013 | Ganelin | |
| 8,549,173 B1 | | 10/2013 | Wu et al. | |
| 8,671,418 B2 | | 3/2014 | Barsness et al. | |
| 8,990,308 B2 | | 3/2015 | Wiig et al. | |
| 9,135,079 B2 | | 9/2015 | Flemming et al. | |
| 2001/0049276 A1 | | 12/2001 | Beck et al. | |
| 2001/0049726 A1 | * | 12/2001 | Comeau | ................. H04L 29/06 709/218 |
| 2004/0024791 A1 | | 2/2004 | Martin | |

(Continued)

OTHER PUBLICATIONS

International Search Report and Written Opinion, PCT/US17/029461 dated Aug. 29, 2017.

(Continued)

*Primary Examiner* — Michael Sun
(74) *Attorney, Agent, or Firm* — Chris D. Thompson

(57) ABSTRACT

A computing device includes a main memory; a local high speed memory; one or more functional units, one or more interconnects between the main memory and the local high speed memory, and one or more interconnects between the local high speed memory and the one or more functional units. The local high speed memory implements a frames/bins structure. The local high speed memory includes a plurality of frames, each of at least two of the frames comprising a physical memory element; and a plurality of bins distributed in the plurality of frames. Each of the bins includes a logical element. The functional units perform operations relating to Variables stored in the bins, each of the Variables including one or more words.

40 Claims, 21 Drawing Sheets

(56) References Cited

U.S. PATENT DOCUMENTS

| | | |
|---|---|---|
| 2005/0188055 A1* | 8/2005 | Saletore .............. H04L 67/1097 709/218 |
| 2006/0015263 A1 | 1/2006 | Stupp |
| 2006/0212847 A1 | 9/2006 | Tarditi |
| 2007/0198979 A1 | 8/2007 | Dice |
| 2008/0008188 A1 | 1/2008 | Buga et al. |
| 2008/0215790 A1* | 9/2008 | Coteus ................ G06F 13/1684 710/308 |
| 2010/0005214 A1* | 1/2010 | Trombley ............. G06F 13/405 710/310 |
| 2011/0219208 A1 | 9/2011 | Assad |
| 2011/0320637 A1* | 12/2011 | Coneski ................ G06F 13/126 710/5 |
| 2012/0221755 A1 | 8/2012 | Schultz |
| 2015/0006852 A1* | 1/2015 | Gschwind ........... G06F 9/30145 712/205 |
| 2015/0278110 A1* | 10/2015 | Gschwind ........... G06F 13/1663 711/137 |
| 2015/0286500 A1 | 10/2015 | Desai et al. |
| 2015/0363318 A1* | 12/2015 | Redford .............. G06F 12/0864 711/128 |
| 2015/0378747 A1 | 12/2015 | Mudusuru et al. |
| 2016/0078342 A1 | 3/2016 | Tang |
| 2016/0277311 A1 | 9/2016 | Challa et al. |
| 2017/0083237 A1 | 3/2017 | Potash |
| 2017/0083238 A1 | 3/2017 | Potash |
| 2017/0083434 A1 | 3/2017 | Potash |
| 2017/0083449 A1 | 3/2017 | Potash |

OTHER PUBLICATIONS

Notice of Allowance dated Jul. 11, 2017 in U.S. Appl. No. 14/863,022.
Notice of Allowance dated Jul. 28, 2017 in U.S. Appl. No. 14/863,041.
International Search Report and Written Opinion, PCT/US16/53486 dated Jan. 26, 2017.
Office Action dated Mar. 24, 2017 in U.S. Appl. No. 14/863,022.
Office Action dated Mar. 10, 2017 in U.S. Appl. No. 14/863,041.
Office Action dated Jun. 19, 2017 in U.S. Appl. No. 14/863,047.
Office Action dated Mar. 10, 2017 in U.S. Appl. No. 14/863,052.
Notice of Allowance dated May 1, 2018 in U.S. Appl. No. 14/863,022.
Notice of Allowance dated May 17, 2018 in U.S. Appl. No. 14/863,041.
Office Action dated Mar. 9, 2018 in U.S. Appl. No. 14/863,052.
Office Action dated Feb. 9, 2018 in U.S. Appl. No. 15/139,024.
Final Office Action dated Oct. 18, 2017 in U.S. Appl. No. 14/863,052.
Notice of Allowance dated Feb. 12, 2018 in U.S. Appl. No. 14/863,047.

* cited by examiner

| Mentor Control & VMF Section |
| Variables parameters; |
| Memory location, size, array dimensions |

| History and logic for the Undo |
| of speculative actions |

| Bin to/from Main Memory cache updates and |
| Cache coherency logic |

| Frames, Operand staging and Memory Busses |
| Conflict resolution logic |

| Variable self bounds check logic | Variable's addressing ALU for generating each cycle, Operand addresses in Bin and in Main Memory | Variable intrusion bounds check logic |

FIG. 14

| Mentor ID (8) | L/P (1) | Channel ID (3) | FU leg input/output ID (6) | Indexing Formula ID (4) | Tarmac setup (2) |

FIG. 16

| Size (10) | Type (4) | Variable ID (8) | Dimensions (4) | Mutable (2) | Bin Location (18) | Bin size (12) |
|---|---|---|---|---|---|---|
| Variable Memory address (32) | | | | Variable size (32) | | |
| Dimension 1 Base (2) | Size (30) | | | Dimension 2 Base (2) | Size (30) | |
| * | | | | * | | |
| * | | | | Dimension N Base (2) | Size (30) | |

FIG. 17

| Size (10) | Type (4) | # of Variable (8) | # of constants (8) | Bin Location (18) | Bin size (12) |
|---|---|---|---|---|---|
| Variables Block Memory Address (32) | | | Variable ID (8) | Variable ID (8) | — — — — |
| — — — — | Variable ID (8) | Constants base (12) | | | |

FIG. 18

PROCESSOR WITH FRAMES/BINS STRUCTURE IN LOCAL HIGH SPEED MEMORY

BACKGROUND

Field

The present invention relates to the field of computer processors and methods of computing. More specifically, embodiments herein relate to computer processor architecture implementing multiple control layers.

Description of the Related Art

At one time, computer performance grew proportionally to transistor density. In the mainframe era, for example, the major limitation to performance using single transistors or MSI/LSI chips was physical size, limited by number of transistors per cubic foot of mainframe cabinets. The larger the physical size the slower the cycle time.

In the era of the processor on a chip, yield became the major limiting factor. Along with finer silicon feature sizes more transistors per die became available at acceptable chip yield enabling; first going to wider word sizes, than to simple pipelining (one instruction per cycle) followed by Instruction Level Parallelism (ILP, up to 4 instructions per cycle). The smaller feature size also enabled higher clock frequency and less power consumption per transistor junction, all of which combined to offer much higher performance as level of integration increased.

Past about 2005 the picture has changed as evident by the arrival of multi core chips. Instead of getting four times (or more) faster processor for quadrupling the transistors per die (along with doubling cycle time) as was the case in moving from 16 bits to 32 bit processors, presently when higher transistor count is used to implement ILP register architecture processors, the design brings diminishing returns on performance (this issue is known in the industry as Pollack's Rule). Thus economics has encouraged the industry into moving to multi core in order to take advantage of the available transistor count per die. Also it is noted that for FP programs, ILP machines may achieve 0.5 FP per cycle, where the theoretical limit for using one adder and one multiplier is 2.0, to go further multiple FU copies are thus required. Increasing performance by including multiple copies of functional unit may require shadow register structures whose complexity may far exceed the complexity of the systems described herein. Limits to improvements of scalar performance of computer hardware have been characterized as "walls", including, for example, a power wall, a memory wall, and an instruction level parallelism ("ILP" wall).

While the approach presented herein overcomes disadvantages both in the "Memory wall" and the "ILP wall" we will concentrate our presentation on the effects on "ILP wall" effects first. Some effects improving the "Memory wall" issues will also be noted.

The inability of processor architecture to take advantage of the increased transistor per die to gain performance advantage (the "ILP Wall") is linked to the register machine namespace interfering in both micro-parallelism and macro-parallelism. Regarding micro-parallelism having "registers" as part of the processor's namespace serializes processes that are "embarrassingly parallel".

Present macro-parallelism is limited in some respects due to processor's need to share information and the lack of efficient mechanisms responsible for the integrity of shared variables, an issues addressed herein by the Mentors.

The larger the systems, the larger the memory one wants to access. To access more memory, one has to go off chip. Thus limits on the speed of the clock cycle (power wall) and pin to pin interconnect (memory wall) are at play due to multi chip interconnects and the disparity in cycle times among the different layers of the memory hierarchy (memory wall). Moreover, existing computer architecture may not be expandable to efficiently take advantage of the larger available transistor count. Existing ILP register architecture may be effectively limited by what has been referred to as an "ILP wall". In register machines the unavailability of operands is mostly caused not by the intrinsic data dependency relations in the source HLL program but it is caused by the effects of the register architecture's namespace management. The more one attempts to speed up performance by the use of parallel operations intrinsic in the original HLL algorithm, the more interference in the process is due to the "register" namespace mechanism. Techniques like shadow register provide some relief but they soon become too complex to provide true solutions. In the Von Neumann model the namespace is [Memory]+PC, the only "named" entities are operands and instructions addresses in memory and the program counter. There are two basic problem with the original Von Neumann architecture (the "three address machine architecture" A<=B+C for example see SWAC), the first is that the architecture requires four memory accesses delays per instruction. One memory access for the instruction fetch, two for fetching two data operands and one for storing the results. The second problem is that as memory address size increases, instruction size increases by three fold as each instruction contain three addresses. Typical register architectures reduced the number of memory access per instruction to two, one for instruction and one for data, and each instruction contains only a single memory address keeping instruction size manageable. In RISC machines memory accesses are even less as most instructions do not access memory. However register architecture significantly complicated the namespace. The namespace in a register machine is: [Memory]+Registers+PC+PSDW+CC (condition codes).

The introduction of vector registers improved performance in programs that exhibited micro parallelism. However in the long run vector registers further complicated namespace and the software mobility issues. The namespace in vector machines is: [Memory]+PC+Registers+Vector Registers+PSDW+CC. The namespace mechanism, for register architectures and registers+vector architectures is a major factor in the creation of the "ILP Wall". Once cache is introduced into the picture, cache solves the same operand access delays (staging) problem that registers and vector register originally solved. Operands can be used within one or two cycles in one-operand-per-cycle stream from either the cache, the registers or the vector registers. From that point on, registers and vector registers may further complicate the namespace and coherency issues. Coherency may be lost, for example, when the program changes operand values already staged in cache, a register or a vector registers. Therefore, once one introduces caches into the architecture, the real advantage of register architecture over Von Neumann architecture is in smaller instruction size and thus possibly smaller program size, advantages that can be overcome by namespace mapping methods.

For historical and other reasons both computer machine languages and HLLs do not include the concept and semantics of "plural form" as part of the language for expressing algorithms. For insight at where HLLs did propose (FORTRAN) extensions that do recognize this subject please see "FORALL in Parallel" and "FORALL In Synch" in Modula 2.

In simple algorithms (some micro-parallelism type codes) the existence of parallelism may be deduced by the compiler from the "N times singular" form of the DO or FOR loops.

For insight, "Company about face" is linguistically a plural language form of an instruction in English. While "DO I=1, N; Soldier (I) about face; END DO" is an "N times singular" linguistic form. A characteristic effect of the use of "N times singular" form is that it typically transforms a parallel process to a serial process.

The lack of the explicit "plural form" in both machine languages and most HLLs blocks (1) having dialogs between programmer and compiler regarding the parallel properties of the algorithm as well as (2) addressing parallel properties of complex codes (midlevel and macro parallelism) whose parallel properties cannot be deduced by the compiler but need to be explicitly implemented by the programmer Presently parallel operations may be done, for example, by assigning parallel tasks to different code threads, see CC++ PARAFOR where each iteration of a "PARAFOR" creates a new thread which executes in parallel with all other iteration bodies. Existing ILP register machine and their predecessors may either convert micro-parallel actions into thread structures, appropriate for macro parallel operations but cumbersome for micro parallelism as is the case of PARAFORE. The compiling process removes micro parallelism information and convers the information into a strictly singular (sequential) machine language form. In case of Vector and VLIW machines, the parallelism information is strictly used in the compiler to directly control very specific vector or VLIW hardware structure(s). Those structures may be a good fit for processing micro parallel applications, but they also may produce clumsy code that is hard to debug and very hard to transport.

SUMMARY

Computing devices and methods of computing are described. Computing devices may, in various embodiments, include a processor (e.g., CPU) and computer memory. In an embodiment, a computing device with multi-layer control: mentor layer and instruction/control layer includes a memory and one or more functional units. The computing device may include a processor configured to implement a multi-layer control structure including a data structure layer including a local high speed memory, a mentor layer, and an instruction/control layer. The local high speed memory includes one or more variables. The mentor layer includes one or more mentor circuits. The mentor circuits control actions associated with the variables in the local high speed memory and associated, other cache(s), main memory(ies), communication channel(s) or instrumentation device(s). The instruction/control layer includes one or more circuits that interpret instructions or control operations by one or more functional units. In some embodiments, the local high speed memory implements a frame/bins structure.

In an embodiment, a method of computing with multi-layer control (mentor and instruction interpretation/controls) includes managing, by a mentor circuit in a processor, one or more variables in a local high speed memory (and other associated data locations), performing, by an instruction interpretation/control circuits, one or more instructions or control of one or more operations by one or more of functional units of the processor.

In an embodiment, a computing device includes a main memory, and local high speed memory, one or more functional units, and one or more interconnects. Local high speed memory implements a frame/bins structure. The local high speed memory includes a plurality of frames, each frame including a physical memory element. Bins are distributed in the frames. Each bin includes a logical element. Functional units perform operations relating to one or more variables stored in the bins.

In an embodiment, a computing device includes a main memory; a local high speed memory comprising one or more bins, one or more functional units, one or more interconnects between the main memory and the local high speed memory; one or more interconnects between the local high speed memory and the one or more functional units; and one or more mentor circuits. The each of the bins stores a Variable. The functional units perform operations relating to Variables stored in the local high speed memory. The mentor circuits control operations relating to at least one Variable stored in at least one of the bins. In one embodiment, a method of computing includes managing, by a mentor circuit in a computing device, one or more Variables contained in one or more bins of a local high speed memory; and performing, by the computing device, one or more instructions or control of one or more operations using one or more of the Variables managed by the mentor circuit.

In an embodiment, a computing device includes a main memory; a local high speed memory; one or more functional units, one or more interconnects between the main memory and the local high speed memory, and one or more interconnects between the local high speed memory and the one or more functional units. The local high speed memory implements a frames/bins structure. The local high speed memory includes a plurality of frames, each of at least two of the frames comprising a physical memory element; and a plurality of bins distributed in the plurality of frames. Each of the bins includes a logical element. The functional units perform operations relating to Variables stored in the bins, each of the Variables including one or more words In an embodiment, a computing device includes a memory structure storing one or more Variables; and a logical mentor. The logical mentor is assigned to at least one of the one or more Variables and performs addressing operations with respect to the Variables to which it is assigned. In an embodiment, a method of computing includes storing one or more Variables in the memory of a computing device, assigning a logical mentor to the Variables; and performing, by the logical mentor, addressing operations with respect to the Variables.

In an embodiment, a computing device includes a memory storing one or more Variables, and information relating to the singular/plural nature of at least one variable and/or algorithm, one or more functional units (Language Unit). The functional units receive the singular/plural information and perform one or more operations using at least one of the Variables using the singular/plural information. In an embodiment, a method of computing with plural information includes storing, in a memory, one or more Variables, storing, in a memory, information relating to the singular/plural nature of at least one algorithm; receiving at least a portion of the singular/plural information; and performing, using the singular/plural information, one or more operations using at least one of the Variables. In one embodiment, a method of computing includes linguistically implementing, by one or more circuits, plural-form instructions comprising one or more threads. Each thread may be a set of one or more programs. Each thread may be associated with one or more Variables such that the thread can be assigned plural and robustness properties relating to its interaction discipline(s) with other threads.

In an embodiment, a computer processor includes an operands-mapped namespace and/or a Variables mapped namespace. In some embodiments, a system for performing computing operations includes a processor comprising a namespace; and one or more memory devices physically or logically connected to the processor, wherein the memory devices comprise memory space. The namespace of the processor is not limited to the memory space of the one or more memory devices. In an embodiment, a method of computing includes physically or logically connecting a processor to one or more memory devices comprising memory space, and implementing, by the processor, a namespace, in which the namespace is not limited to the memory space to which the memory space is physically or logically connected.

BRIEF DESCRIPTION OF THE DRAWINGS

FIG. 14 is a functional diagram of a mentor circuit in one embodiment.

FIG. 16 illustrates a mentor/bin to functional unit command transfer format.

FIG. 17 illustrates a virtual mentor file (VMF) format for dimensioned element (array).

FIG. 18 illustrates a virtual mentor file (VMF) for mentor holding single variables and constants.

Figure 1:
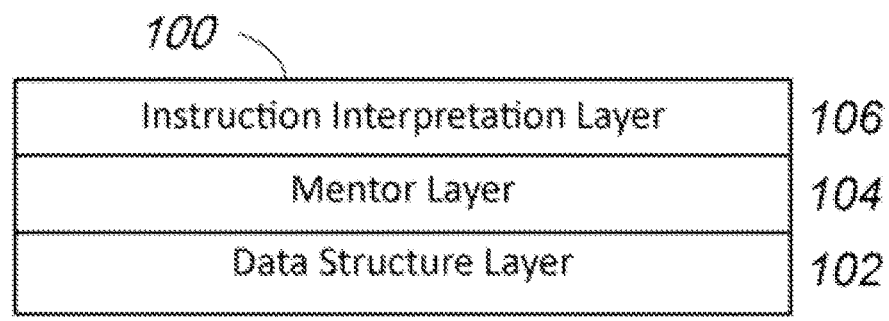
FIG. 1 illustrates one embodiment of computing device implementing a mentor layer.

While the invention is described herein by way of example for several embodiments and illustrative drawings, those skilled in the art will recognize that the invention is not limited to the embodiments or drawings described. The emphasis in the examples is to show scope of the architecture, not to present preferred implementation(s). It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Architecture

In various embodiments, a variation/enhancement on Von Neumann architecture expands the architecture's namespace in two ways. The first way is by providing compatibility with software's and HLL "conceptual units", and the second way is by including in the namespace not only memory but also any and all other relevant data interconnects. In a classical Von Neumann architecture, both program and data are in a single memory that is the processor's namespace. In embodiments described herein, the Von Neumann namespace definition is expanded by hardware mechanisms mapping software's "conceptual units", the "Variables", to form the full scope of computer's data connectivity through the Variables not only to memory but also to I/O, communications, and instrumentation data access, all this while freeing one from the need for hardware specific means (Registers, Stacks, Vector registers, means that can, in some cases, limit performance and create idiosyncratic namespace distortions.) Embodiments as described herein may implement a processor architecture framework that inherently takes advantage of the multiple copies+spar(s) technology.

This disclosure shows what the device in the embodiments is doing and then is show how it is doing it.

First, with respect to what the device is doing:

Consider the statement by John Backus in the DARPA 2008 supercomputers report page 62:

"Surely there must be a less primitive way of making big changes in the store than by pushing vast numbers of words back and forth through the von Neumann bottleneck. Not only is this tube a literal bottleneck for the data traffic of a problem, but, more importantly, it is an intellectual bottleneck that has kept us tied to word-at-a-time thinking instead of encouraging us to think in terms of the larger conceptual units of the task at hand. Thus programming is basically planning and detailing the enormous traffic of words through the von Neumann bottleneck, and much of that traffic concerns not significant data itself but where to find it."

As noted by Backus, a significant limitation of present processors is due to the fact that while software, communications, instrumentation and systems are designed in terms of "conceptual units" (Variables) consisting of; single variables, arrays, lists, communication frames, queue, and more complex structures, processors deals with single words in memory as data items or individual instructions.

This conceptual discontinuity between the processor proper and system's "conceptual units" is a key to understanding the causes for many limitations of present IPL processors including limit to processor performance (ILP Wall), low robustness, security issues, excessive system complexity and associated drop in performance due to this complexity, communications and instrumentation elements are not part of the processor model, as well as many other limitations.

Using the architecture as described in some embodiments of the present disclosure, the software program deals with "conceptual units" (Variables). The hardware takes the responsibility of mapping "Variables" to physical words and physical gating and Functional Units (FUs). The assumption of the "Variables" management responsibility by the hardware and the integration of robustness capabilities like bound checks in the hardware leads to advantages in performance, software robustness, multiprocessor work teams, system robustness, system simplicity, and the application of the basic processor model not only to data in memory but also to communications and instrumentation elements (communications and instrumentation Variables are noted as "Infinite Variables" in contrast to "finite Variables" residing in memory). The above discussion addresses, in general terms, "what" is the device doing.

With respect to how devices as described herein perform their functions, the devices introduce, in various embodiments, two new elements into processor architecture.

The first element is the Frames/Bins element that replaces the Registers, Condition Codes, L1 data cache, instruction cache, shadow and vector registers of conventional design.

The second element is the Mentor layer. The mentor layer is a new control layer positioned between the instruction interpretation control layer and the data structure. The Mentor layer is a set of one or more Mentor circuits that receives control activities in terms of logical Variables and translates it to control activities in terms of physical devices and physical data locations in the Bins and memory.

The following includes an overview of the hardware embodiments, including discussion of several advantages of the devices. Many of the advantages not explored herein may be revealed in specific implementation details such as silicon technology used (logic design technology, PIM technology) spares strategy, type of package and number of pins, etc.

In some embodiments, the processor architecture accommodates communications, inter-processor links, instrumentation's and I/O's that needs to handle "infinite variable" representing access to data elements outside of memory.

In some embodiments, mentors of shared variables address limitations in macro-parallelism by providing an efficient mechanism responsible for the integrity of shared variables.

In some embodiments, the architecture model is based on a namespace definition and two-layered access to operand structure that the definition entails.

The namespace may be: Variables+PC (Program Counter).

In this embodiment, by placing the PC of the Von Neumann architecture in a Memory location (for example address location "0") the Von Neumann namespace is just [Memory].

The corresponding assertion, when applied to this embodiment holds that by defining a specific Variable as the PC, the computing element's namespace is just Variables.

In this case, the only names that may be seen by the application algorithm are the Variable names; this includes the program files as those files are also Variables. Instruction interpretation in the first architecture level operates upon Variables. Variables may be arrays, code segments, lists, individual words, or data elements outside Memory accessed through communications or instrumentation interfaces.

The read may recognize that our definition of "Variables" is similar in definition to the term "Object" in "object oriented" systems such as C++. Data is not just a segment of words in Memory but a combination of the segment of words with a set of properties and rights. The properties and rights may be explicitly defined by an accompanying descriptor or may be deduced by the system from the data segment itself and other system information.

Therefore, for insight one may view the computing element's namespace as a namespace of "objects" and the described processors as an implementation of object oriented computing device. However, as will be further discussed some of the elements, such as Infinite Variables, Variable Mentor File (VMF) are not part of present models of object oriented systems such as C++. Furthermore the computing device described herein, is efficient in micro parallelism which is very inefficient in systems that assign threads to micro parallel actions (see C++ FORALL).

Thus while Variables and Objects may look similar, the definition of object oriented architecture in C++ includes specifics about: object, class, abstraction, encapsulation, inheritance, polymorphism, etc. The implementation of Variables in this computing element (1) has Variable types (classes) that are not included in the C++ or similar object oriented sets (Infinite Variable, VMF) and (2) the computing element described herein may choose similar definitions for Variables as in an existing object oriented, for compatibility and software transport reasons, or it may choose totally different set of characterizations, rights and properties in the computing element's language and Variables, or a combination of the two approaches. Therefore for the rest of the document the term Variables is used.

The second control level in the architecture may be referred to herein as the mentor level. The mentor level is responsible for all operand access (operand read and operand write).

According to the Variable's definition, the operands may be in Memory, or they may be outside Memory in communications or instrumentation environments. Thus the "namespace" scope of the architecture has been increased from "main memory" to anything that is named as a Variable.

FIG. 1 (see also FIG. 13) is block diagram illustrating a dual control-level architecture in one embodiment. The top level is similar to processor control circuit containing basically two parts, the instruction decoding part and the instruction issue part.

However, in various embodiments described herein, the instruction issue is generated in terms of Variable and not in terms of end operand activity. It is up to the Mentor level to translate Variable addressing to operand addressing. The operands may be in [Memory] or they may be acquired/sent to communication, I/O, processor-to-processor links, or instrumentation elements supervised by their respective Mentors.

The namespace architecture may be upward compatible to a Von Neumann architecture namespace definition. All Variables in [Memory]+PC are accessed through the Variables+PC namespace. However the Variables+PC namespace may also access data that is not in [Memory]. While connectivity to data outside Memory is standard in most systems, this data transfer work is done outside the scope of the basic architecture model. In contrast, the architecture model in embodiments described herein may include all of the information accessed by the computer system.

Like some present processor ILP control structure, a processor in the implementations described herein may interpret multiple instructions per cycle and issues control signals to the underlying data structure in order to execute the instructions. However the operand namespace addressed by the top level control is not in terms of registers and memory addresses but in terms of Variable names where a Variable may be; a single word, array, list, queue, program file, I/O file, etc.

The second control layer is built from a set of Mentor circuits. The Mentor circuits are responsible for mapping the Variable's (i.e. "conceptual units") ID (Variable names) to the appropriate Variable operand (specific array words) in order to present the operands to the arithmetic and logic functional units. The Mentors know (e.g., maintain information on) the Variable's type, (word, byte, etc.) memory location and dimensions and may be responsible for the Variable's cache management and coherency issues.

In register architecture, the compiler may receive from the HLL program information regarding the "conceptual units" in terms of Variable's properties. However, the information is not typically transferred to the hardware as the hardware does not have means to understand it. The Mentor structure does understand this information and can take advantage of it. The inclusion of "Registers" into the processor's namespace impedes the hardware from taking advantage of the algorithm's parallelism in two ways; the first as stated above the information about parallelism is not available to the processor, this issue will be discussed later under "plural form".

The second issue is that the use of "Registers" in the instruction set turns parallel processes to serial processes due to instruction set requiring that operands are staged through a register (scalar or vector) on the way from memory to a FU and again on the way from the FU to memory. This staging, while when originally introduced significantly reduced memory traffic presently may pose traffic bottlenecks.

The following example details the problem:
BEGIN ADD-ARRAYS;

*DO I=1,P;*

*D(I)=A(I)+B(I)+C(I);*

END DO; END ADD-ARRAYS;
A RISC "register" machine language equivalent of ADD-ARRAYS is:

*R*7<=Mem[*A* array base]

*R*8<=Mem[*B* array base]

*R*9<=Mem[*C* array base]

*R*10<=Mem[*D* array base]

*R*11<=Lit "1" Comment: The value 1 using the literal field.

*L*1 *R*12<=Mem[*R*7,*R*11] Comment: *R*7+*R*11, *R*11 base, *R*7 Index.

*R*13<=Mem[*R*8,*R*11]

*R*13<=*R*13+*R*12

*R*12<=Mem[*R*9,*R*11]

*R*13<=*R*13+*R*12

Mem[*R*10,*R*11]<=*R*13

*R*11<=*R*11+Lit "1"

*L*2*R*12<=*R*11−Lit "*P*" Comment: *R*12 register reused in branch test BRANCH-ON-NEGATIVE TO "*L*1"

The potentially highly parallel HLL algorithm has been converted to a sequential process in the Register machine language code. All elements of arrays A and C are passed through a single register R12. Thus R12 has multiple uses in the machine language code. First it is used for the transport of array A and C operands. R12 is later used for Condition Code checking for loop termination by line L2. This practice is known as "register reuse".

In compilers optimized for ILP register machine one attempts to avoid some of the serializing processes. Serializing effects, like register reuse may be remedied by the compiler, for example by using a different (unused) register rather than R12 for array "C" and converting L2 to use yet a different register:

*L*2 *R*14<=*R*11−Lit"*P*"

However those corrections do not remedy the basic problem which is that operands of an array in a Register machine must serially pass through the same "Register".

An analysis of the HLL source will show that the computation of all the D(I)=A(I)+B(I)+C(I) statements may be done in any order including doing all P iterations simultaneously. There are no operand dependencies among A, B and C operands and the D array results. However once the code is compiled to "Register" based machine language all "A" operands must progress serially through a single register (R12), all "B" operands must progress serially through R13, etc. It is not the mere existence of "Registers" in the Register machine namespace that is of concern, it is the fact that operand traffic need to go through those Registers in sequential order on the way to and from the arithmetic and logic units, an issue which engenders traffic flow problems when micro-parallelism is considered.

The Mentors may manage individual cache sectors assigned to their Variable. One of the Mentors may, for example, be assigned to the program thus this Mentor may manage the program cache; the rest may manage their data cache. The Variables assigned to I/O, communications or instrumentation will manage the appropriate protocols and assigned cache. In addition to managing the cache for each Variable, the Mentors may contain bounds checks and other mechanisms that enhance both security and program debug feature to protect Variables' integrity and assist in program debug.

This approach of handling arrays may be different than the one of including vector processing where the compiler omits the entire array's original information by transforming the HLL's array information to the one word scalar and 64 word vector registers, terms that the machine language understands.

Both vector structures and the Mentors described herein add complex hardware structure to the basic Von Neumann machine, the difference is that vector processing requires compiler involvement in internal hardware details, while the addition of Mentors engenders the processor's (hardware) understanding about the nature of the program's "conceptual units" and as such software tasks and portability are simplified.

In terms of the OSI reference model, the architecture of embodiments described herein moves the hardware/software interface upward toward the HLL application layer. The Mentor layer may manage the Variables' caches in ways that (1) provides continual operand streams, enabling array (vector type) operations without the unwanted artifact of either vector or scalar registers or breaking a DO loop into 64 word "chunks" (2) includes automatic bounds and other checks to protect the Variables' integrity for security and debug support; and/or (3) enables including in the model Variables that do not reside in part or whole in Memory, those Variables include communications, instrumentation, etc.

Use of Variables

In some embodiments, the top layer contains the instruction interpretation and control layer is strictly dealing with logical Variables, while the Mentors are responsible for mapping the logical Variable namespace to the physical memory address space.

In some embodiments, the HLL DO statement is made more effective by deploying "plural" concepts of the ALL and IMMUTABLE and other additions to both the HLL(s) and to the machine language OP Codes.

Plural Forms for Computer Hardware and Software Languages

As used herein, "plural forms" may define parallel properties of algorithms independent of the specific means or of the amount of parallelism actually deployed in any particular hardware and/or software implementation. Plural forms may be applied, in various embodiments, in the context of HLL or machine languages. To facilitate parallel processing and portability, (1) the parallel properties of codes (algorithms) should preferably be made very clear and (2) the parallel properties of code should preferably be stated in a form that is independent of the specific means or the amount of parallelism deployed in any particular software and/or hardware implementation.

In some embodiments, a processor directly accepts information regarding the singular/plural nature of an algorithm. A hardware software interface may transfer the "plural form" of information regarding the algorithm in the machine language or other means. The information such as DO, ALL, IMMUTABLE, BRANCH-OUTSIDE-THE-LOOP-(OR-CODE)-SEGMENT, END, etc. may be provided in order to take advantage of the parallel nature of the algorithm and in order avoid the "outside of the address space reach" that is associated with the use of conditional branches in machines that deploy speculative execution. In addition "plural form" information, as demonstrated by "simple relaxation algorithm" may serve to improve the accuracy of algorithms when modeling naturally parallel processes.

In some embodiments, "plural form" is included as part of expressing algorithms in HLL. In some embodiments, "plural form" is included as part of expressing algorithms in machine language.

The information regarding plural or singular may allow for separation between stating the parallel properties of the algorithm which is machine independent information and the mechanisms of doing the task which should be done by the compiler through the OS and the machine language in order to use the parallelism in the algorithm and in the processor for performance, robustness or other considerations.

In some embodiments, OP code "DO" and "ALL" are used in loop control (instead of using, for example, JUMP and BRANCH). There may be certain advantages to doing so: First, this information enables the hardware to engage in effective streaming operations, i.e. "vector type processing" without the need to resort to "vector register" or vector instructions as well as enabling the design to perform bounds checks for both fetch and store operations.

BRANCH instructions typically use speculative branch prediction to speed up execution. However in loop control process DO and ALL may replace BRANCH. When using BRANCH (and branch prediction) the program flow may overreach at the last loop iteration(s) addressing operand(s) in memory which are typically in the zone belonging to the an element placed in memory next to the array. Thus, toward the loop end, the "speculative" memory addresses may reach outside array bounds. In some cases, speculative look-ahead associated with BRANCH may be an obstacle to both performance (the last operations need to be undone upon miss prediction) and cause difficulties in implementing automatic array bounds checks since the instruction execution mechanism does out of bound reads as a matter of course during speculative execution.

Instead of just having Conditional-Branches in the instruction repertoire, having a "DO" as well as "ALL" instructions, which contains the Index parameters as well as having all array parameters available to the hardware enables the architecture to makes sure that the DO (or ALL) loops never fetches operands beyond the Variables' range and still operates at maximum performance.

Thus, while pursuing the direction of providing the hardware the most relevant information for effective program processing by using powerful instructions sets, methods such as those described herein may linguistically provide better information by implementation of added HLL linguistic concepts. Some examples are provided herein for HLL DO commands (ALL, IMMUTABLE code). The addition of the information to HLL and to the code may promote higher performance, bounds protection and better code debugging assists.

Stated differently, in addition to the three "walls" the power wall, memory wall and ILP wall, there are limiting factors to processing capabilities due to the fact that important information regarding properties of array and other Variable type conceptual units are not stated in present register machine codes.

Present HLL software uses DO for both sequential and plural operations. One can see the true sequential reason in implementing a Fibonacci sequence:

$A(1)<=3; A(2)<=6; DO\ i=3,50; A(i)<=A(i-1)+A(i-2);$
  END *DO;*

In the Fibonacci example above there is a truly sequential relation among operands. One cannot compute A(i) prior to A(i−1) and A(i−2) being present.

However the in most present HLL linguistics, the commands DO or FOR are also used in plural operations (with PARAFOR and FORALL being noted exceptions).

For explanation, comparing this to military commands in English, one does not have the language words to say "company about face" one can only say "soldier I to N, DO an about face" where it is unclear whether they should "DO the about face" one after the other (wave) or they may do or they may the "about face" all in parallel or in combinations. Consider the following:

DO $i=1,N$; $A(i)<=B(i)+C(i)$; END DO;

Where DO (or FOR) is the way one typically states in HLL the requirement to perform ALL the above N additions. The ALL HLL word and corresponding ALL OP Code state that one may perform the operations all in parallel or in any parallel/sequential order one may select.

In introducing ALL and the corresponding ALL OP Code as in

ALL $i=1,N$; $A(i)<=B(i)+C(i)$; END ALL;

we have removed the ambiguity between sequential operations and plural operations.

The removal of this ambiguity allows the hardware to best deploy its resources for maximizing performance and for bounds protection.

The use of IMMUTABLE further expands the ALL concept to assist during program design where data "version control" is required in order to use plural Variable properties for better program design and providing more accurate results (See Simple Relaxation example).

The ALL and IMMUTABLE HLL and machine language capabilities are important but are not a prerequisite to the architecture's use of the Variables and associated Bin and Mentor implementation. Present register architectures are limited in their abilities to deploy parallel activities, specifically of the class described as micro parallelism; therefore the issue of expressing the parallel capabilities in HLL has been marginalized Proper handling of micro parallel activity may be best handled by cooperation of software and hardware which requires linguistic upward changes to include HLL and machine languages that include the plural properties of both Variables and algorithms.

As a further illustration, consider thread linguistic access property ORDERD-QUEUE for multiple requestors accessing multiple resource servers.

ORDERED-OUEUE may be implemented by a QUEUE-CLEARK where a requestor is assigned by the QUEUE-CLEARK to a particular server and is put on a queue there (SS office method), the requestor judges queue length and selects a queue (supermarket), the requestor tears of a tab thus receiving a queue number and waits until the number is called (DPS method), etc.

The thread access discipline is linguistically ORDERD-QUEUE, how to implement ORDERD-QUEUE is an implementation decision.

Defining powerful OP codes for handling "powerful conceptual operations" involves the subject of array and loop indices. In some embodiments, loop indices are considered as parameters of "DO" (or FOR) instructions rather than Variables (in a similar way that the number of bytes is a parameter in a "byte stream move" instruction). Though, indices and Variables may certainly exchange information.

While some namespace architecture approaches may accommodate additional extensions as in the case of "Memory+PC+Registers+PSDW" and "Memory+PC+Registers+Vector Registers+PSDW", in most instances this is not the case. Some previous attempts to contain both Registers and STACK in the same architecture failed as the "Registers" became dominant. Similarly it may not be useful to extend the namespace beyond "Variables" however, based on past experience, other types of namespace extensions will be marginalized.

The architecture as defined herein however does not require excluding hardware defined elements as part of the namespace or the architecture, it only requires that the Mentor handling the element understands what the element is and handles them as Variables, to with a Mentor handling a gigabit Internet channel.

Restating the register in the namespace issue differently, a "register" in hardware is a set of F/Fs. A "register" in ILP machine language is part of the namespace. This namespace element, though inspired by hardware registers, is none the less a totally different entity, typically implemented in ILP machines using register(s), shadow registers and a host of logic elements. "Does 1600 Pennsylvania Av. agree with 10 Downing St. or is it aligned with Elysee palace . . . " is surly not a discussion about buildings' brickwork.

Embodiments described herein may provide the ability to address "infinite Variables", system data elements that are not in Memory. Applications in which may include:

(1) High speed communications channels, whether they handle Internet, SONET or other protocols deploy "infinite" data streams. A processing element whether it is called a router or switch continually processes the incoming stream, adds and/or subtracts portions and forwards the outcome to the output stream. Parts of the information may or may not be placed in memory.

(2) Instrumentation. The extended concept of Variables as described herein may allow inputs for sensor and outputs to actuators to be included without any requirement that the corresponding data is placed in memory (by means that are outside of the current "processor" model). In this context, a requirement is that the mechanism responsible for the Variables (the Mentor) knows how to send settings to actuators and obtain sensors' readings.

The Variable may be an "infinite Variable" and the processor hardware providing the needed operational buffers and protocol control logic. Some of the Variables used in communications or instrumentation may have partial information placed in main Memory or may have no residence information placed in main Memory.

Providing in the basic model mechanisms such that information need not be staged through main Memory has a potential of significantly reducing volume traffic through Memory, thus may significantly also solve or reduce the effects of the "Memory Wall" limitation.

Figure 2:
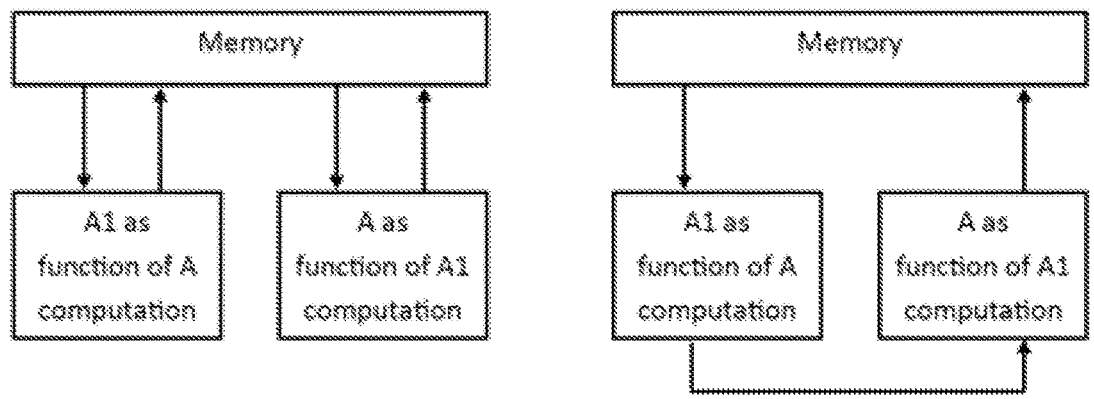
FIG. 2 illustrates memory bandwidth requirement reduction using processor teams.

As an example, assume that two processors are assigned to the task (or two sets of processors if the task is broken to array segments and each segment is assigned two processors). FIG. 2 illustrates memory bandwidth requirement reduction through the use of processor teams. The first processor accesses array A in Memory and produces A1. A1 is defined as an "infinite Variable" and transferred via processor to processor link to the second processor (or set of processors) which buffer the content of only three rows of A1 data in internal processor buffers.

This example demonstrates two aspects of the use of "infinite Variables". The first aspect is the reduction of demands on main Memory both in size of Memory space needed and in main Memory bandwidth (when the processor internal buffers can handle the intermediate results). The second aspect of this example is the general use of "infinite Variables" for forming "production line teams", where each portion of the task is done by a processor set. Results are passed to the next set in the production line requiring only the minimum amount of memory/hardware registers space to stage buffering. For a full example of the "production line" approach consider airplane design system where one set of processors converts the mechanical drawing tables to finite elements data tables, the second set performs the finite elements analysis, and a third set interacts with the designer(s) through graphic interface(s).

Processors as described herein may include a computer core architecture that produces improvement in the following areas:

(1) Performance: An architecture overcoming the performance barriers, such as the "ILP Wall" characteristic of some existing register-based architecture cores.

(2) Hardware resilience: The architecture, based on spare section replacement strategy enables high manufacturing yield, low cost, and field self-repair capabilities.

(3) Software robustness (e.g., a general measure of to how long it takes to debug a program or a system and operation time duration between program or system failures.) Embodiments as described herein may include a set of advances "built in" hardware elements that provides system semantic coherency providing debugging support and error exclusion methods for system debug.

(4) Compatibility. In many aspects one will find compatible, operative or conceptual to powerful software systems concepts such as "object oriented systems". In some embodiments, in order to facilitate and shorten system/program debug time, a device provides built-in software compatibility and migration abilities that eases the transportation and allow "AS-IS" use of existing machine language applications. Specifically, one will not, in "compatibility mode" be able to get the advantages of all the new capabilities mentioned above, but will be able to run machine language programs AS-IS.

Other advantages of embodiments described herein may include:

1. Instruction set architecture is implementable for both high end processors as well as for the workstation or personal device (cellphone) versions. The high end example presented in the following presentation may deploy Processor-In-Memory (PIM) large footprint silicon technology. Note that the architecture described in this document has, in some embodiments, a Memory interface of four 512 bit words, a design that will require several thousand pin package if implemented as a single processor on a die. The PIM implementation allows this very wide interface for example for a PIM module with (internally) 8 processors and large Memory per die. Another implementation version (described under the heading Alternate Embodiment #2_in this description) is targeted to use a smaller footprint and most important a limited number of I/O pins package whether the design is implemented in PIM type (limited number of metal layers) or in the higher number metal layers typical of silicon processor logic technology.

The implementation produces processors that may outperform their register ILP counterparts due to parallel operation of addressing and data ALUs and due to the removal of the artificial serialization caused by the registers in the processor's namespace of ILP processors. Processor performance is critical, as discussed earlier; going down in performance just does not work in the market place. Thus the architecture has the same advantage that catapulted the IBM-360, the instruction set architecture that fits the "processor family" concept, producing instruction set compatible low end processor that fits the general requirements of supercomputers as well as workstations, PCs, personal devices, graphic devices and instrumentation devices (DSPs, etc.). Thus program developers may develop or modify programs using their workstations with only occasional checks on institution's high end supercomputer machines.

2. The Variable namespace described herein may allow for automatic bounds checks and other program debugging supports.

3. Using addressable elements as seen by the application program Variables. The Variable arrangement allows one to associate hardware visible properties with the Variables, properties such as "to be used by one processor or processor-task-team at a time" and come up with much more efficient, less malware intrusion susceptible or error prone, methods of handling the distributed memory.

4. By making "Infinite Variables" part of the basic system model, processor-to-processor links may be formed without the need to deposit all information in Memory. Similarly raw instrumentation data can be processed and filtered before depositing relevant information in the Memory.

In embodiments described herein, (outside AS IS emulation mode) there is no "tower of Babel of machine languages among modules"—all the modules can use the same machine language, the machine language need not contain namespace elements relating to "Registers", "Vector Registers", "stacks" or other hardware elements. The machine language in embodiment described herein may include both the DO op code and the ALL opcode as loop operators. The use of the ALL OP code may enable a compiler to indicate to the module that the computations in the loop are immutable, input operands are not changed by computations within the loop. The module MAY therefore process the loop iterations and sub elements of arithmetic statements in any order.

The processor thus may deploy performance enhancements using multi word operations (as will be described in the following sections when the design is using 8 operand sets) presently seen as Vector operations, multithreading or other parallel means. A user developing a model on a GPP, processor may see an order of magnitude performance enhancement by moving the model to a single PIM based processor.

The hardware mechanism in the embodiments described herein may deploy the IMMUTABLE program micro-parallelism and be in charge of all the associated data buffering. Furthermore the hardware may choose to process large arithmetic expressions by "Vector type grouping" or by processing one expression at a time. Consider the expression:

$$DO\ I=1,\ 10000;\ A(I)=(B(I)+C(I))*(D(I)+E(I));\ END\ DO;$$

For example, in Vector grouping a set of 256 (B(I)+C(I)) computations are performed and stored in BUFFER. Next 256 A(I) (B(I)+C(I))*BUFFER (i) are performed where "I" is the expression index and "i" is the BUFFER index. The hardware takes full responsibility for Vector type grouping and BUFFER size, BUFFER does not show up in the software and the software need not map the algorithm to Vector registers as the process is similar to cache and virtual memory operation in the fact that it is fully transparent to the program.

The compiler is however entirely responsible for checking the immutability assertion and will use ALL instead of DO to indicate the loop operation is indeed immutable. More advanced compilers may use the "IMMUTABLE" assertion in the code to include version control or other techniques to provide for program section immutability (see Simple Relaxation). Similarly the compiler and other software tools may analyze and provide macro parallelism enabling multithreading of the code.

To provide compatibility among the various modules, all modules may recognize all family data types and perform all programs at least in sequential pace. This may include some graphic data types, or in case of a C++ compatible computing device design all the C++ Object oriented structures including objects, class, abstraction, encapsulation, inheritance, polymorphism, etc. The definition may include what graphic operations are done by the nodes in the "processor logic" or PIM silicon environment and what operations are parts of the rendering hardware that is included in the display. As was indicated before, different than current processors, I/O Variables are part of the Variable namespace in all implementations whether it is the PIM environment or processor bus environment and whether the information is deposited in Memory or not. The replacement of the single level control by a dual level control and the replacement of "[Memory]+Registers+PC+PSDW" with the "Variable" namespace thus may provide an architecture that is applicable to a diverse range of processors.

Operand Traffic Strategy and Processor Performance

In some embodiments, a processor implements a multi-layer architecture. FIG. 1 is a diagram illustrating one embodiment of a processor including a three-layer-architecture. Processor 100 includes Data Structure layer 102, mentor layer 104, and instruction interpretation and control layers 106.

In this example, the hardware architecture is built in three layers. The bottom, Data Structure layer is dedicated to "end operands" operations, (floating point operands in floating point operand representation programs) what Backus calls "significant data itself".

Data Structure Layer

The Data Structure layer contains:
(1) the local high speed storage (which is the equivalent of the registers, cache, vector registers and shadow registers in a conventional design),
(2) the functional units (mostly in groups of 8 identical units+spare),
(3) the multiplexing and gating structures connecting main memory, local storage and functional units and
(4) any traffic matching buffers needed to align operands when data blocks (of 8 words) are either aligned to block boundary or converted to/from single word to block format. (Such buffers are used for example in conventional systems for "traffic matching" between main memory and data caches or instruction caches as data from main memory to cache is transferred in data blocks.)

The arithmetic manipulation and the traffic associated with forming operand addresses traffic concerns—not significant data itself—but rather where to find it—that task is assigned to the next layer, the Mentor layer.

The top layer includes the Instruction interpretation and the program flow control section. It is understood that data traffic thus exists not only within a layer but also among the layers. In the description below, the first layers to be addressed is the traffic within the bottom (Data Structure) layer and then the discussion moves to addressing control and data traffic among layers.

In some embodiments described herein, the software/hardware interface, (the DONA instruction set), are intended to be as devoid as possible of the internal hardware structures in the aim that the DONA interface should be "encouraging us to think in terms of the larger conceptual units of the task at hand".

Data Structure Mission Statement (PIM Embodiment)
The mission of the Data Structure is:
(1) To provide an effective main memory interface, local high speed memory and functional unit 8 words wide "end operand" manipulation freeway structure.
(2) Use the identical copies plus spares strategy.
(3) Design a Data Structure specifically optimized to directly manipulate Variables which is the term that corresponds to Backus's term "conception units".

Main Memory, Resisters, Cache and Operand Staging Traffic

Observations:
(1) Main memory is typically at least order of magnitude slower in response than the operand flow cycle time used for keeping the pipelined Functional Units busy.
(2) An operand just computed is much more likely to be required in next computation than a random operand in memory.
(3) Most computations involve arrays where one can typically anticipate (speculate) which operands are needed before the operands are used, so operand traffic should be staged through a very high speed local storage, preferably implemented using simple single cycle time devices. In a typical ILP register machine design, this local storage comes in several categories, the usual types are: machine registers, shadow registers, vector registers, L1 data cache, and instruction cache.

Operand Traffic Considerations

To overcome the speed disparity between the machine cycle time and main memory a high speed, preferably one cycle access time may be used in the architecture. In some embodiments, this high speed internal memory is in the form of a Frames/Bins structure. This structure may be relevant to several different contexts as described below:
(1) The first is that the local high speed memory (acting as a cache) is the basic remedy for (main) memory access delay.
(2) The second is that the local high speed memory is a multiplier memory of bandwidth, as operands already in the cache need not come from memory.
(3) The third item is providing the underpinning elements for handling operands in terms of Variables (the conceptual units) rather than just word operands.
(4) The fourth is that, through the Variables construct, the machine provides operand coherency as part of software robustness. As one aspect, operand coherency assures that for read and writes operations full array bound checking is performed.
(5) Speculative execution support. One need not add shadow registers and the like in order to support the storage for the undo operations that are part speculative execution such as branch prediction and out of order FU operations.

Contribution of operand staging in a high speed local memory thus fall into two domains, one is an increase in the speed of operand access; the other is as a multiplier of operand bandwidth (volume of operands) available to the functional units. The speed gain is proportional to the number of cycles of main memory access versus cache access. If memory access is N cycles the cache improvement in operand access speed is up to N to 1. Bandwidth Multiplier however is even more impressive as it may raise operand bandwidth by a larger factor, a very important factor for compute intensive programs when both program and data may fit inside the local high speed memory; in current ILP register machines the role of this high speed memory is done by the "cache" and/or by the cache hierarchy, the L1, L2, L3 caches.

Speed Gain:

The effects of a local, one cycle memory access time are obvious, performing the original three address Von Neumann type instruction (for example the SWAC machine) required four memory accesses, one for reading the instruction, two for reading operands and one for storing results. The introduction of any form of Local High Speed Memory (LHSM), originally Accumulator (ACC) in the IBM 7094 and Univac 1108) then "registers", then caches then shadow registers in ILP machines, all of the above are methods for boosting performance by increase access speed through the use of the LHSM.

Bandwidth Multiplier:

Especially in array or lists operations, the presence of the LHSM is mainly needed in order to supply very high operand bandwidth to/from multiple of pipeline stages for multiple simultaneous operations or for use of multiple copies of Functional Units. The bandwidth multiplier is due to the fact that recently used operands are already in LHSM and when array operands are used the next set of array operand in the cache can be anticipated or they are recent results of computations. The computational bandwidth, especially when using multiple Functional Units, is directly related to operands bandwidth. An algorithm may include a given number of "end operand" computations, the higher the "end operand" bandwidth, the faster the program completes.

Data Structure Overview

In some embodiments, a processor includes a Frames/Bin structure. The frames/bin structure may implement a method that supports the handling of data structures larger than one word, with the "conceptual units" being Variables in this presentation's nomenclature. A Frames/Bins structure may dispense with the need to use specialized shadow circuits and directly support "undo" operations fundamental to speculative execution. The "undo" capability is mandatory for branch prediction and may be also used in debugging tools (as it may, for example, present to the debugging tools the program's history just prior to an exception or a encountering a "debug flag" during program access to a memory or a Bin location marked by the debug flag), those debug tools may prove to be a capability critical to support high software robustness. The Frame/Bins structure may enables the expansion of the model and the scope of Variables to include not only accessing words in Memory but to be used as a home for handling "infinite Variables" such as communications channels, I/O, processor-to-processor links and instrumentation.

In some embodiments, a processor implements a crossbar interconnect schema. The schema may provide a general solution for operand flow as well as operand word alignment, such that the data structure properly supports both; single words (scalar) and array (vector) operations as well as having several available forms of addressing the spares yield issue needed for high reliability high yield designs.

In some embodiments, tarmac registers are placed and used to aide in control synchronization, operand flow and operand alignment. (By analogy, your arduous flight just landed, sitting on the tarmac, you are cooped on the plane as a departing flight is yet to leave your assigned arrival gate.)

As was previously pointed out, performance increase by an order of magnitude over present ILP designs requires the use of multiple sets of (FADD, FMPY, etc.) functional units. So for meeting performance and spares target the functional units set size is chosen as 9 functional units, 8 operational and one spare.

Figure 3:
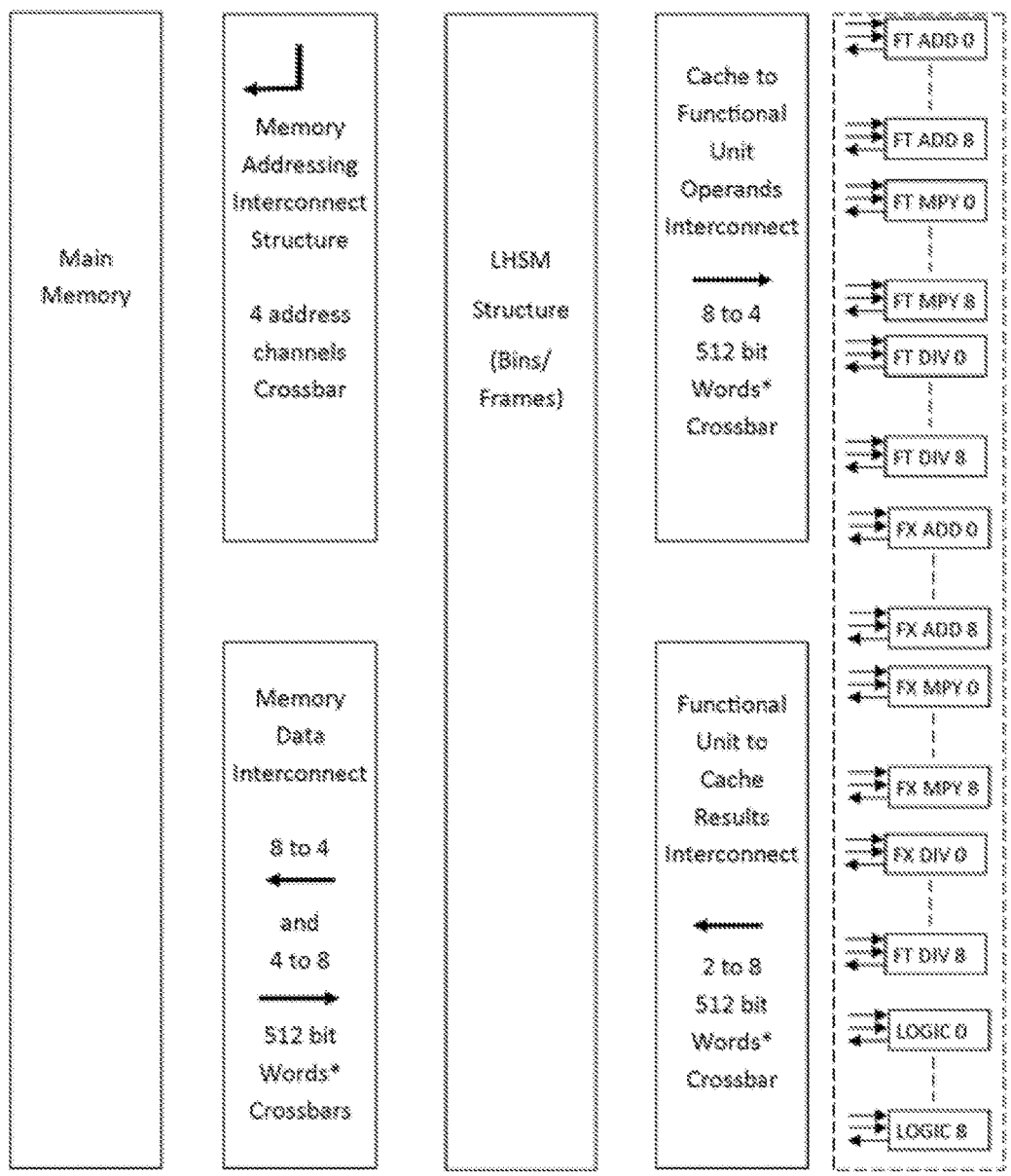
FIG. 3 illustrates data structure elements in one embodiment.

Considering the data bandwidth to deploy 8 FADD, 8 FMPY, etc., the basic data structure elements; which are the Main Memory, LHSM and interconnect structure handle the traffic of blocks of eight, 64 bit words. From a traffic flow point of view, the data structure handles 512 bit words operands. FIG. 3 is a diagram showing an overview of the data structure in certain embodiments. In FIG. 3, arithmetic Functional Units on the right side of FIG. 3 show sets of 9 identical Functional Units.

Figure 4:
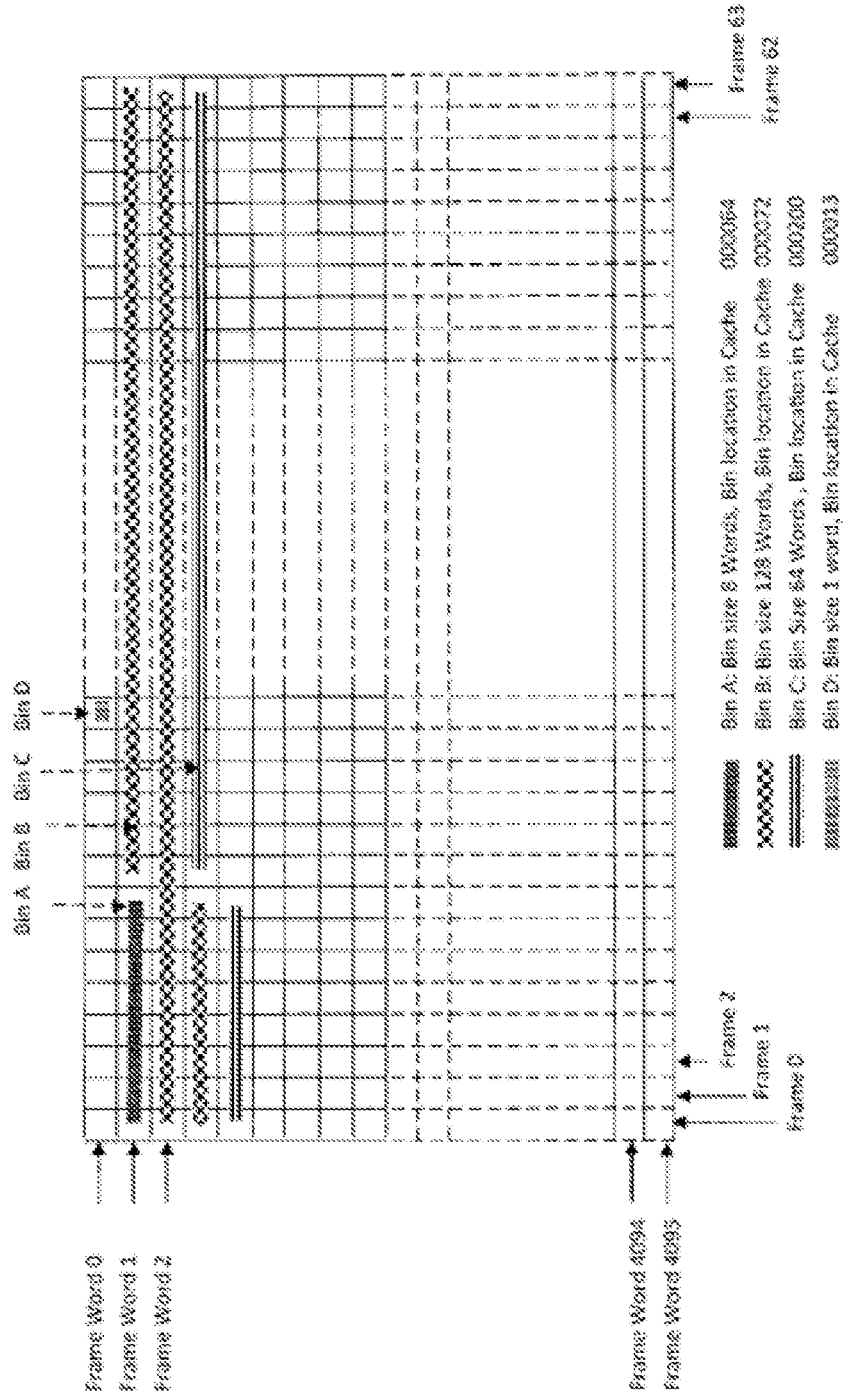
FIG. 4 is a diagram illustrating a frames/bin structure.

In this example, the processor implements LHSM by the Frames/Bins design depicted in FIG. 4. The Frames/Bins structure may address operand access via Variables (conceptual units), operand memory latency, operand flow bandwidth, and software coherency for Variable.

The Frames/Bins Structure

FIG. 4 is a conceptual diagram of the LHSM, the Frames/Bins structure, the center element in FIG. 3. The LHSM may include, in one example, 64 one-cycle memory elements, 4K words 64 bit each; each individual memory may be referred to as a Frame. The Frames/Bins structure forms a multiported high speed local high speed memory design where the 4K×64 bit words single ported Frames are the physical elements and the Bins are the logical elements. The size of a Bin may range from a single 64 bit word to 262,144 (256K) 64 bit words. The content of a Bin larger than one word is multiplexed across multiple Frames. The specific Frames numbers and sizes are provided for illustrative purposes only.

Figure 5:
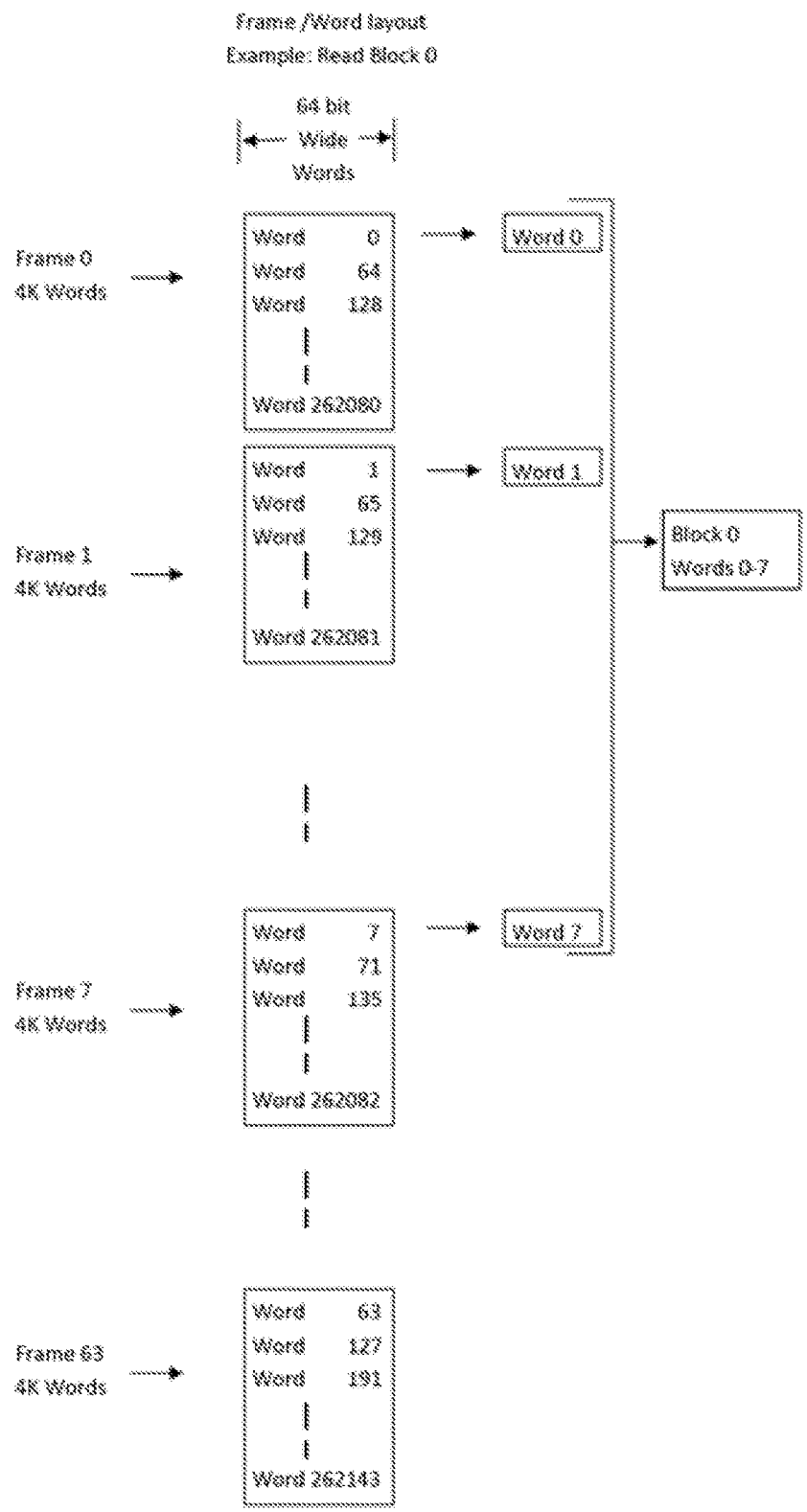
FIG. 5 is a diagram illustrating a word arrangement in blocks and frames.

Specifically the 6 least significant bits (LSB) of a Bin address select the Frame and the most significant bits (MSB) select a word location within the Frame. In FIG. 4 Bin A is an 8 word Bin located in 8 adjacent Frames, from Frame 0 through Frame 7. Bin B is a 128 word Bin spread across all 64 Frames. Bin C is a 64 word Bin also spread across all the Frames and Bin D is a one word Bin located in Frame 13. FIG. 5 is another presentation of the Frames/Bins implementation showing the addressing arrangement of Bin words inside the Frames structure.

This Frames/Bins arrangement is using single ported memory devices and as a structure the Frames/Bins provides the capability of a multi ported central LHSM for the design. The Frames/Bins arrangement also provides the "home" of all "conceptual units" which are the Variables.

The Frames/Bins may replace all registers, vector registers, data cache, instruction cache, speculative execution shadow registers such as are found in some existing processors. The full Frames/Bins address size is 18 bits. Specifically, the 6 least significant bits in a Bin address select the Frame. The upper 12 bit of the Bin address selects a word in the Frame.

The advantages of this approach from a data flow model perspective may include:

1. The basic Frame element is a standard single ported memory device where the local high speed memory (LHSM) tasks demands a multi ported apparatus for the many parallel tasks of local high speed storage in each cycle. The approach provides for design simplicity, design flexibility and applicability of the spares strategy.

Regarding spares, the implementation has one or more Frames as spare elements. As to design flexibility example, one for example may use 128 dynamic memory devices of one cycle access two cycles per operation, for achieving an overall performance that is not far below the approach using one cycle devices.

2. The Frames/Bins structure may be operated as multiple simultaneous ports for single (64 bits) words ports and/or parallel 8 consecutive words block ports (512 bits ports).

3. Operand traffic is self-aligning and may avoid the traffic blockage problems that occur when two or more ports request access to the same physical memory device. In this Frames/Bins multi access structure, once the first logical port is given a single cycle access, the next port's transfer is from a different set of Frames allowing the second requestor access within one cycle. The computing device may be equipped with a small amount of alignment data buffering (e.g., by way of tarmac registers as further described herein or other means) as part of each functional unit, the data buffering is used to self-align traffic in one or more cycles in order to deliver maximum operand bandwidth.

54. The data structure may be, in one example, 512 bit wide data structure that operates using "channels" of 8 word blocks. The Frames/Bins structure may be capable of simultaneously servicing up to 8 accesses of 8 word block in each machine cycle. In this case, the maximum bandwidth of the Frames/Bins structure would be 4096 bits per cycle. The Frames/Bins structure is managed through an addressing structure that is capable of accepting request from up to 10 "channels". The addressing structure resolves contentions when more than one channel requests the same Frame and decides which 8 out of 10 channels are given access each cycle. Memory to/from Frames/Bins traffic is given priority.

155. The logical channel allocation may be, in one example, as follows: four 8-word wide channels handle Bins to FUs operands traffic. Two 8-words wide channels handle FUs to Bins results traffic. Four 8 words channels handle Bins to/from Main Memory transactions.

The Bins as Software's Conceptual Units

Data in the Frames is arranged by (logical) Bins. Each bin represents one or more Variables, the program's logical entities be they a single variable, an array, a program, a byte-string file, etc. Each bin thus represents one or more software conceptual units (as used in Backus' terminology). The bins may be the homes of individual program Variables.

The operand may be addressed by its Bin address and is assumed to reside in the Bin (the Variable's cache). If it is not in the Bin, the Mentor mechanism associated with the Bin will fetch the operand from Memory and will deliver it (after memory access delay) from the Bin.

Each program Variable, including the program file itself has a Bin, which is a local high speed memory which contains all or part of the Variable's data. The full data sets of all the Variables reside in Memory as per this model, (unless they are Infinite Variables) but this fact is invisible to the program as all accesses to the Variable are done through its assigned Bin. As far as the program is concerned the Variable, be it a single operand, array, list, program, communication or instrumentation port while they "exists in main memory storage or the communications or instrumentation ports", are accessed through the Bin allocated to them—they "live in the Bin".

The Bin is a logical structure that is distributed across a set of 64 physical Frames. It may be implemented by a different number and/or size of Frames or other means than the Frames/Bins structure described herein, without losing its software coherency as the logical means of accessing Variable.

Operational Aspects of Bins/Frames

In accessing the Frames/Bins all requests that have the same 6 LSBs in the Bin's Cache address during the same control cycle will request the same Frame, sometimes causing collisions of the requests. A priority resolution circuit provides access and allows an immediate Bin transaction for this physical cycle for one of the channels in the conflict. If all requests in a control cycle are not honored due to request conflict(s), the data for the honored request is staged in Functional Units (or other location) buffers called the tarmac registers.

In a conflict situation one of the requestors is granted Frames access, in the following machine physical cycle both the first and the next requestor are given access to the Frames. The first requestor, that was already granted one access is now looking ahead and receiving/depositing its next operand block by accessing operands from the next set of Frames. This self-aligning process continues until all the requestors in the current control cycle are granted Frame access. Note that in the last physical cycle all operands with access Frame conflicts receive access, some for the current and some for future operands (operand staging). The control cycle is now allowed to conclude by following through the Functional Units pipelined part of the conflicted control cycle. The Functional Units move their pipeline according to the cadence of control cycles. Note that this pre staging process that may take several cycles typically occurs once at the loop's onset. Once pre staging is done, the following control cycle will typically require only a single cycle as all operands are already aligned in the tarmac buffers to simultaneously deliver operands to/from physically different physical Frames segments.

Definition: A control cycle takes one or more machine cycles and ends when all requests from the Frame/Bin structures have been granted.

Therefore, a control cycle may initially take several machine cycles in order to align requests by buffering the operands in tarmac registers ahead of/after use. During loop operations the buffering arrangement using tarmac registers is retained for following loop cycles such that upon executing the same control cycle the next time, the access to the Frames is already properly aligned and staged ahead of time and in all consecutive loop cycles control cycles is typically executed in a single cycle. The consequence of "the traffic is self-aligning" is that the staging penalty is paid once at the onset of a loop and then the system stays synchronized such that the majority of loop operations are performed at maximum throughput where one control cycle duration is typically a single cycle.

The definition of "control cycle" is thus distinct from (physical) machine cycle; this is due to the fact that the operand activities in the Functional Units and in the controlling "Dynamic VLIW" are dictated by "control cycles". ("Dynamic VLIW" to be later explained as part of defining the Exa-64 control structure). Control cycles are issued based on traffic to/from the logical elements Bins which sometimes, when alignment is necessary due to Frames conflicts or operand position in an 8 word block, the first control cycle will typically take several physical cycles to conclude. The conclusion of a control cycle states that all operands are now available at the Functional Units inputs, so the Functional Unit pipeline may commence the arithmetic or logic operation. Similarly upon the conclusion of the control cycle the Dynamic VLIW may issue the next VLIW coded instruction.

The mechanism of separating control cycles from machine cycles may take one or more extra cycles at loop onset. After a few extra cycles at the onset of a loop the system delivers close to the maximum operand flow made possible by the number of Frames in the LHSM.

Figure 6:
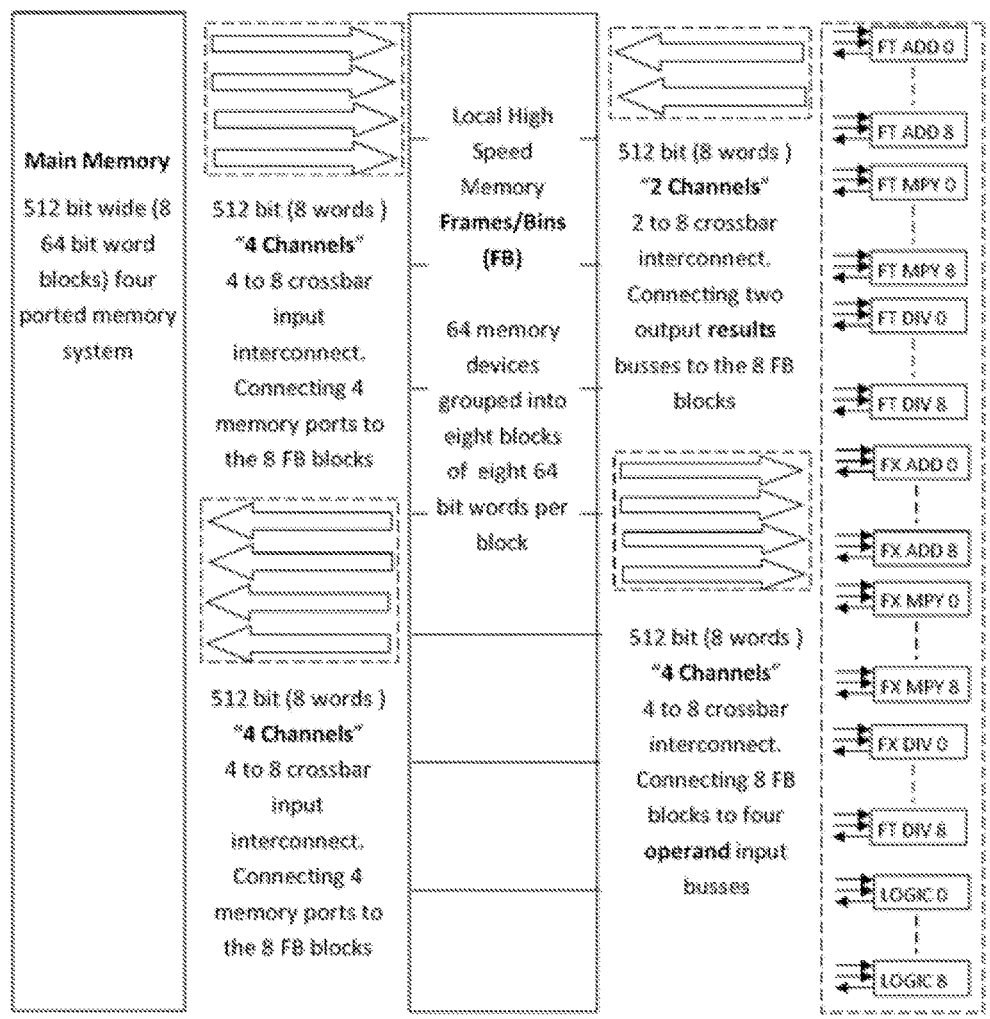
FIG. 6 is a diagram illustrating a data structure with frame/bins in a high speed local memory.

The following is a discussion addresses of the circuits in FIG. 3 surrounding the Frames/Bins structure. FIG. 6 is a diagram illustrating Data Structure interconnect emphasizing the level of interconnect among the various elements in terms of "Channels".

The term "Channels" mainly represent a logical way to show interconnects. The implementation of the powerful and complex interconnects is explained after Main Memory and Functional Units are presented.

Main Memory

Main Memory in this example is a 4 ported Memory system. Memory may deploy L2 and L3 caches as well as Virtual Memory structure and will typically connect to multiple processing cores.

Functional Units Tarmac Circuits Alignment and Staging

The Functional Units (FUs) section deploys multiple copies of the same functional units. The use of multiple copies of functional units provides high performance and enables high chip yield through spares replacement. The Functional Units (FUs) are the standard pipelined functional units consisting of floating point, fixed point, logic and byte manipulation units of ILP design plus a new set of units that will be addressed later in the presentation, however for this section for presentation assume the standard kinds of arithmetic and logic FUs.

Figure 7:
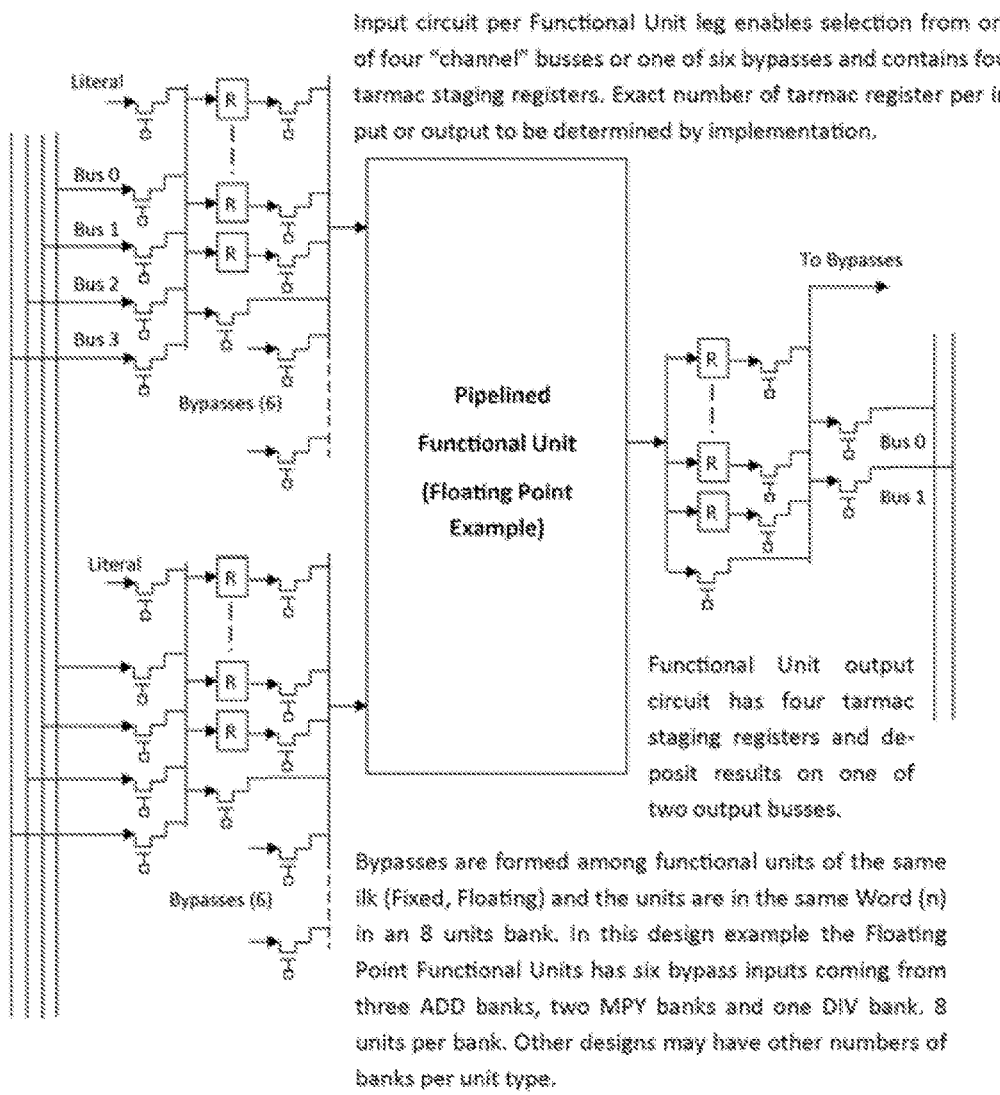
FIG. 7 is a diagram illustrating a functional unit and associated tarmac registers.

As previously stated, all the FUs are equipped with a set of "tarmac registers" (see FIG. 7) to align operand traffic, to provide for operand staging in cases of conflicts among the channels vying for access at the same cycle, and to "block align" traffic according to the block alignment of the outputs in operating on 8 word data blocks. In addition to the operand staging that is needed in case of Frame use conflicts, the tarmac registers are used for operand alignment. Specifically when operands are used in blocks of 8 words, the input 8 word blocks may not be properly aligned to the word positions in the results blocks. The combination of tarmac registers and alignment circuits position the input operands to the proper 8 word block position for the results.

The block alignment topic is easier to explain when considering single word operations. Considering an operation containing three single word operands A, B and C for A<=B+C operation. There is a very high likelihood that the 3 least significant bits of the Bin addresses for A, B and C will not be all the same 3 bit values, so B and C will typically come in different "highway lanes" (bloc positions) in the incoming 8 lanes channels. Also, the results will need to be sent to a "highway lane" matching A's position.

In the data structure described herein, the alignment logic may switch the B and C input to the "highway lanes" corresponding to A at the ADD FU input such that the ADD result will show up in "A's highway lane" for storage into the A Bin. The Bin storage operation is controlled using the Bin address and an 8 bit "write mask" used for selecting the proper single Frame in the proper 8 Frames block.

Operand alignment and access conflict resolution mechanisms may be implemented at any part of the data structure system; next to the Frames/Bins, the data exchange channels or the FUs. In this example, traffic matching logic uses the tarmac registers at the FUs. Staging and alignment also takes place in FU bypass circuits where the result of one FU operation is immediately used as an input to the same or different FU and the intermediate result may not be stored, so the bypass function is most efficient when it takes place by the FUs. Thus, the staging/alignment logic is mainly located in this example next to the FUs by using the tarmac registers. Nevertheless, in some embodiments, alignment is implemented and conflict resolution is placed in the data structure in different places or uses other suitable alignment circuits.

Thus, in various embodiments, tarmac circuit obligations may include:

The task of supporting staging to resolve Frame use conflicts and the task of operand alignment.

Scalar alignment, in scalar computations where only one word operand per input is involved; the input operands are aligned to one of eight FUs in the block location of the result (FU output).

Bypass connection for immediate results of a pipelined FU to the same or different FU.

Staging for repeated loop use of same operand(s); for example in A(I)<=B(I)*3.75, the 3.75 operand is staged in one input of all tarmac MPY FUs for the loop duration.

The same applies to the staging of operand C(J) in the loop computation of: B(I,J)<=A(I,J)+C(J), a copy of C(J) will be placed for inner loop duration in one side of all the FP ADD used in B(I,J)<=A(I,J)+C(J). Upon next inner loop operation C(J+1) will be now placed in all (one side) of FP ADD tarmac registers before the next inner loop commences.

The Interconnect Sections

Returning to FIG. 6, note that there are four sets of "channels" of Frames/Bins interconnect circuits in the figure, two sets are going to Memory, one set is going to the Functional Units and one set is coming from the Functional Units.

The first "channel" circuit set on the bottom right side of FIG. 6 provides a maximum of four 512 bit (eight 64 bit words) operands going from the Bins to the FU inputs. This interconnect requires a crossbar (or multiplexor) apparatus where each one of the four, 8 word FU(s) inputs, receives (reads) one out of 8 groups of 8 words from the 64 words LHSM Frames/Bins structure.

The next "channel" circuits is on the top right side of FIG. 6 is the "results" crossbar where up to two 8 word result FU(s) output is gated to write inputs of two out of the 8 segments of the appropriate Bin in the allotted Frame positions.

The next circuit, left side bottom, is the Main Memory "channels" of data to Memory from the LHSM structure. Finally the circuit, left side top, represents the Main Memory "channels" of data from Memory to the LHSM structure. Depending on implementation and type of Main Memory technology the two sets of memory "channels" may use two physical crossbars (or multiplexors), one input and one output or a "line sharing" types of circuit(s). Each one of the 8 Frames/Bins 8 word blocks may be sent to or received data from one of the four, 8 words wide Main Memory ports. Thus a maximum of four eight word transactions may take place in each cycle.

In this case, all four interconnect circuits, being 8 words wide, may use most types of the spare replacement techniques used in the industry, whether the techniques are used as a part of the manufacturing process or may be used in the field for system self-repair. Note that in large footprint devices a spare replacement strategy in the majority of device parts may be the basic prerequisite for manufacturing the device (e.g., the yield will be too low without spares replacement), and also the key to its low cost.

Data Structure and Crossbar Interconnects

The following section describes the Interconnect structure implementation based on the use of crossbar technology in various embodiments.

Figure 8:
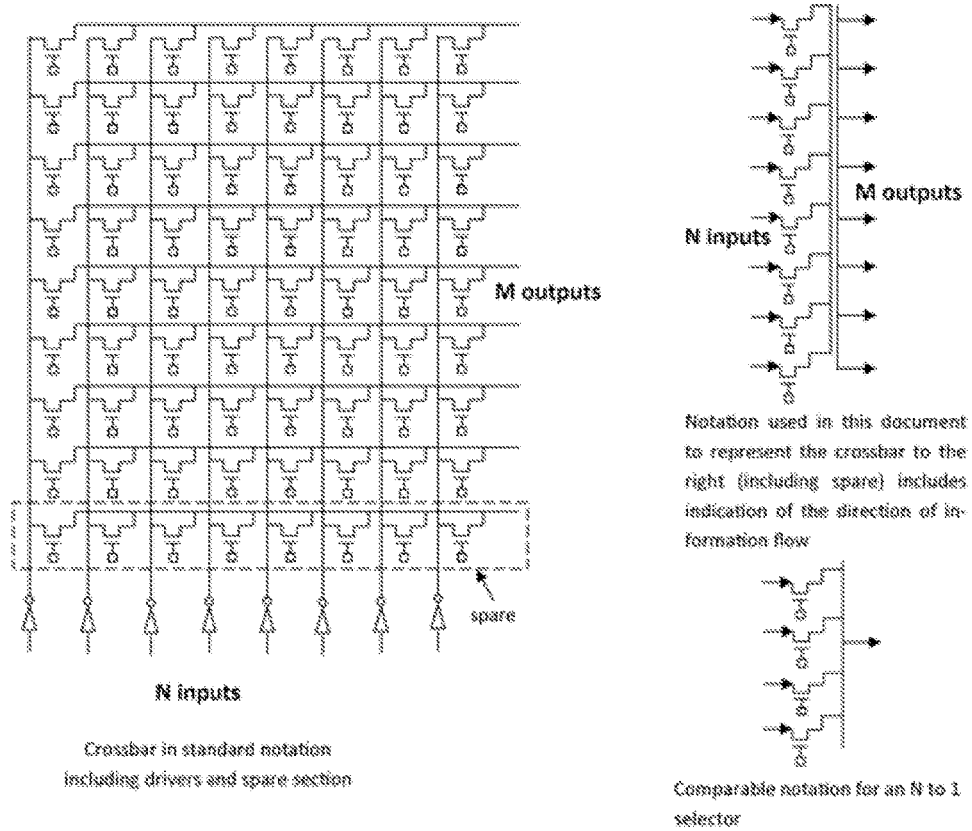
FIG. 8 is a diagram illustrating crossbar notations in one embodiment.

FIG. 8 is a diagram illustrating a crossbar. In the images on the right, a double line represents a full crossbar, and a single line represents a selector.

Bins/Frames Interconnect to and from Main Memory

Figure 9:
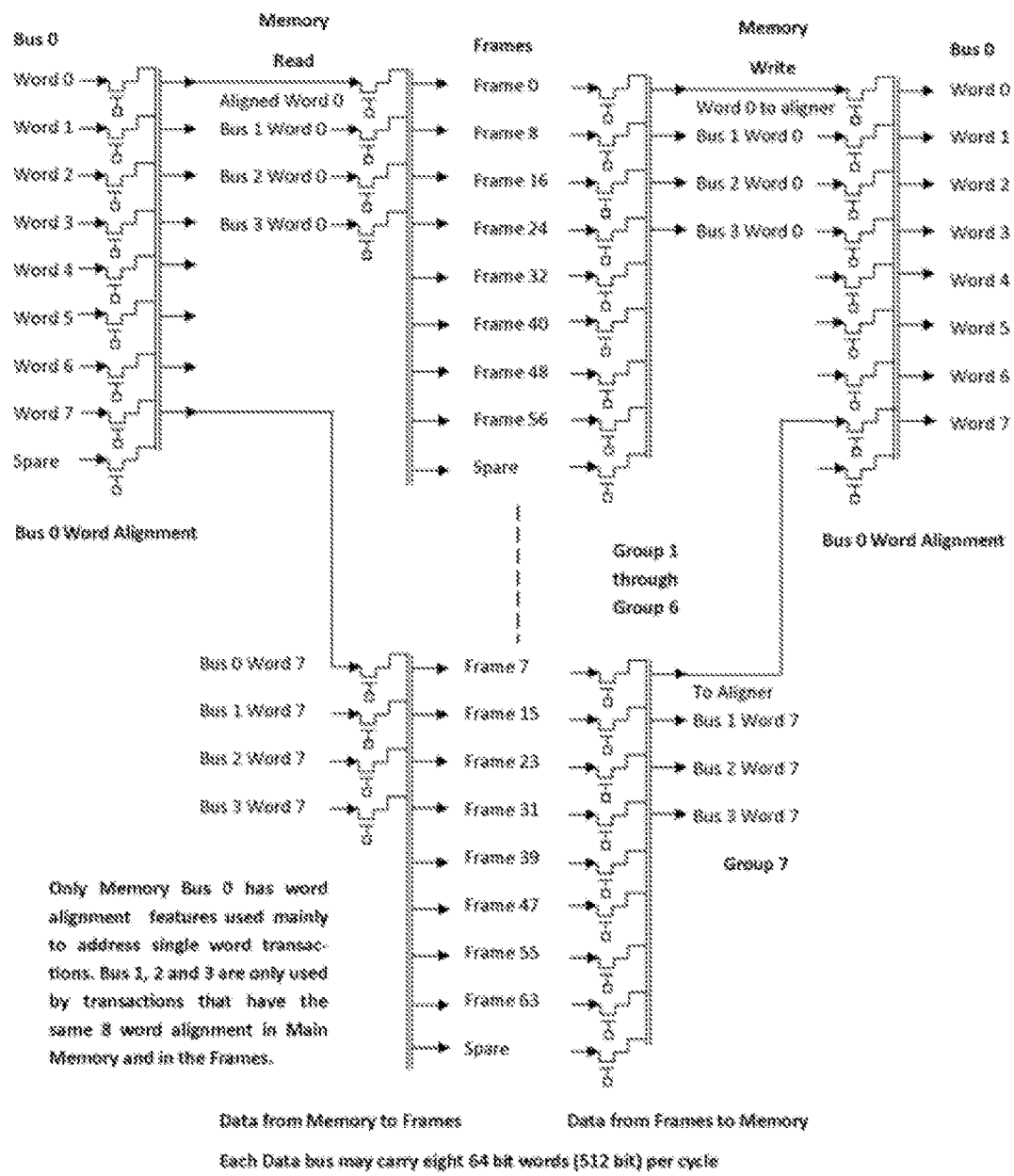
FIG. 9 is a diagram illustrating one embodiment of a bins/frames interconnect to and from main memory.

FIG. 9 describes the data interconnect between main memory and the Frames. The left side of FIG. 9 is the "read" portion bringing information from memory to the Frames. The right side of FIG. 9 is the "write" part of the circuit used for moving data from the Frames and writing it into memory. The system uses 4 memory buses and the read side and write side may or may not share the physical memory data busses. The "read data" and "write data" lines are not connected in FIG. 9 since their physical connection is left as an implementation choice that may be dictated by the main memory system.

Blocks of 8 words in main memory are deposited as blocks of 8 words in the Bin. If X-XXX011 is the array base in main memory reading or writing will commence at location 3 in the Bin and the first three Bin locations are left unchanged (write) or blank (read). If 0 base alignments for tables (or for all Variables) is desired, the tables (or all Variables) may be placed at 8 word boundaries in main memory.

The memories read and write addresses contain an 8 bit mask in lieu of the 3 least significant bits so the masked words are not involved in the 8 word memory block transfer transaction. This mask selects the particular single word or the section of the 8 word block to be read or written in main memory.

Starting from the left of FIG. 9, Bus 0 word aligner allows one to rearrange the order of the 8 words on Bus 0. The rest of the 3 busses connect directly to the second level crossbar enabling one to deposit a block of 8 words from any of the busses into any of the 8 groups of 8 Frames.

Single Word Variables

Dimensioned Variables are allocated Bin sizes that accommodate proper Variable cache size for high performance, for small arrays the Bin allocation may be the size of the entire array while for large arrays the Bin size allocation will be only a portion of the array. Single word Variables are however allocated 16 words arranged as a circular file in their corresponding Bin, this is done to support speculative execution (branch prediction, out of order execution, etc.) and debugging features without the need to add shadow registers to retain past program history in case of "undo" due to miss prediction.

When dimensioned Variables are changed in an inner loop typically a different array entry is changed by the next iteration. If A(6) is changed in iteration 6, A(7) will typically be changed in iteration 7, etc. As long as a "write-through" to memory is not performed on loop entries during speculative computation (there may be more than one changed entry, A(I) and A(I–1) in the example below) one may "undo" the speculative operation by holding back the Memory write-through, as the write-through over-writes the previous values in Memory and cannot be undone. Specifically, with arrays the Bins may hold new the values while Main Memory may hold previous history to support the speculative execution undo process.

Therefore for dimensioned Variables, one may use the combination of space in the allocated Bins, tarmac registers, and holding back Memory write-through in order to support speculative operations where one must retain in cache or recover from Memory previous values for "undo" operations in case of a speculative miss prediction. The case where the same entry in a dimensioned Variable is repeatedly changed by successive iterations is rare and thus the condition may be handled by blocking speculative execution altogether in those rare cases. In other schemas one may also use the tarmac registers for "undo" buffers.

Note the case of single Variables T and F in a waterfall sort below:

$N=M$ $DO\ J=1,M;\ DO\ I=2,N;$

IF $(A(I)>A(I-1))$ $T=A(I);\ A(I)=A(I-1);\ A(I-1)=T;\ F=1;$

END DO

IF $(F=0)$ EXIT $DO;$ $F=0;N=N-1;$ END $DO;$

On every iteration, the values of both F and T may be changed. However the dimensioned Variables operands A(I) and A(I–1) will not be changed after two iterations. As single Variables are commonly used in loops, turning off speculative operation for changed single variables may significantly hurt performance. Since it is desired not to have any Variable storage outside the Bins and the Memory, 16 words arranged in a circular file have been allocated for each single Variable in the program. A new single Variable value is placed in the next position in the circular file; it does not replace the previous value. As stated, this is done to avert the need for "shadow registers". Due to the fact that the single Variable word may be in any one of 16 positions in the Frames it requires aligning the word to the proper position in an "8 highway lanes" port. Thus one reason for the word alignment circuit for Bus 0 is that this bus is used for single word operands read or writes operation that requires placing the single word in specific word of a block, a position that is different from its location in the Bin block.

This arrangement for single Variables provides clean Frames/Bins means of support of speculative execution (such as branch prediction) without adding strange hardware circuits like shadow registers for holding recent history. The method also, in part, creates the need to align a single word in its appropriate word location within an 8 word block in the incoming or outgoing 8 word memory port. The alignment is done by the alignment circuits on the top left and top right sides of FIG. 9.

When dealing with dimensioned Variables the support for speculative execution is done by delaying the Bin's cache-to-memory-write-through until all pending speculation conditions have been confirmed. The Instruction Interpretation and Mentor circuits check for operand change under speculative conditions and consequently the Instruction Interpreter properly handles the speculative steps when an inner loop changes Variable entries.

Returning to the alignment circuits on the top left and right side of FIG. 9, block word alignment is provided by two 8×8, 64 bit crossbars interconnect for block word alignment for memory channel "0". In top left of FIG. 9 is the crossbar for Memory to Frames data (read), top right for Frames to Memory data (write).

The central portion of FIG. 9 contains the 8×4 512 bit blocks interconnect connecting the 4 memory ports to the eight, 512 bit blocks of eight Frames each in the Frames/Bins structure. Note that while Bus "0" goes through the alignment circuits "Bus 1", "Bus 2" and "Bus 3" connect directly to the memory ports. Write-mask controls are used to control which word within an 8 word block are written into memory or written into the Bin(s).

Bins/Frames Interconnect to the Functional Units

Figure 10:
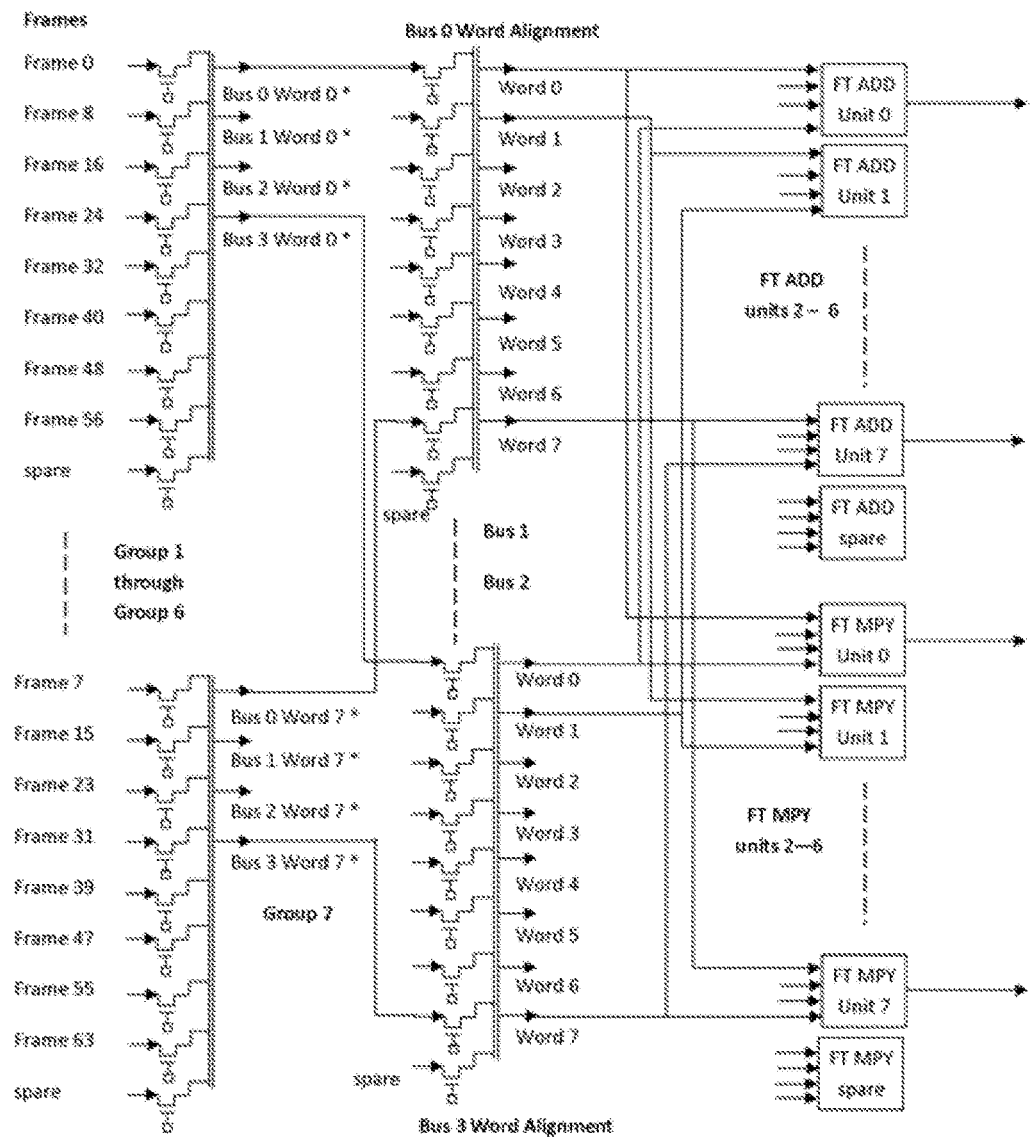
FIG. 10 is a diagram illustrating a crossbar interconnect from frames to functional units.

FIG. 10 is a block diagram of the crossbar interconnects from the Bins/Frames to the Functional Units. As the case with Channel "0" of the memory interconnects, the crossbar structure contains 2 levels. The first level is to the same type as the right center side of FIG. 9 as it is an 8×4, 512 bit wide crossbar interconnect that selects 4 out of 8 Frame block to be transferred to the Functional units. The second level contains 4 sets of 8×8, 64 bit wide interconnect structures that align words within the block. To recap, the first level selects the blocks; the second level arranges the words within the block and presents the information on the four 512 bit Functional Units input busses.

In FIG. 10 the lines from the Word Alignment circuits to the Functional Units inputs above show only a very small fraction out of the total number of interconnects. The functional Units, as stated are clustered into groups of 8+1 Functional Units per type. Thus a group of 8 ADD units receives two sets of properly aligned 512 bits per input on two of the four input busses. FU 0 of each FU group receives inputs only from the four Word 0 of the alignment Bus outputs. FU 1 of each group receives the four inputs out of Word 1 of all four busses and so on, thus finally FU 7 receives its four inputs from word 7 alignment Busses.

Functional Units Interconnect to the Bins/Frames

Figure 11:
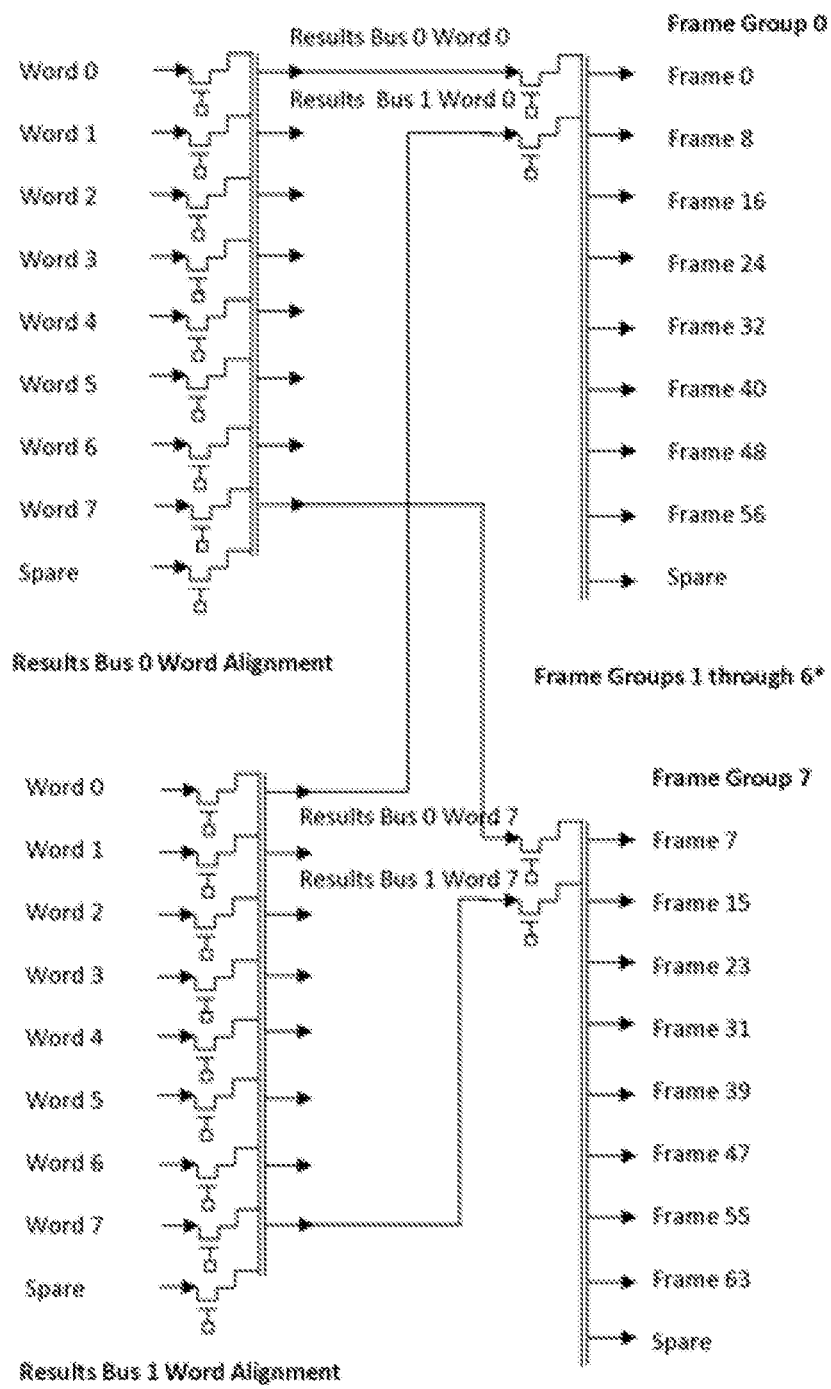
FIG. 11 is a diagram illustrating functional units to frames/bin interconnects.

The Functional-Units-to-Bins section contains the 512 bit wide 2×8 crossbar interconnect leading from the Functional Units to the Frames/Bins structure. See FIG. 11. As previously stated all input operands have been previously aligned to the word alignment of the results (output) so no alignment is needed in this section of the data structure. The depositing of a single word or less than a full block is controlled by the use of 8 "write control" tabs per channel.

Returning to FIG. 3 the top left corner shows a block whose function is to supply addresses to the four ported memory system. The addresses are generated by the Mentor circuits which are the subject of the next parts in this presentation. Mentor circuits first bid and then get access to a memory port. Up to four Mentors may gain simultaneous access to the memory system. The Mentor circuits deposit the memory address for their block or word transfer on one of their assigned four addressing busses. The 32 bit addresses are sent to the allocated memory port using a 32 bit wide 4×4 addressing crossbars shown in FIG. 12.

Figure 12:
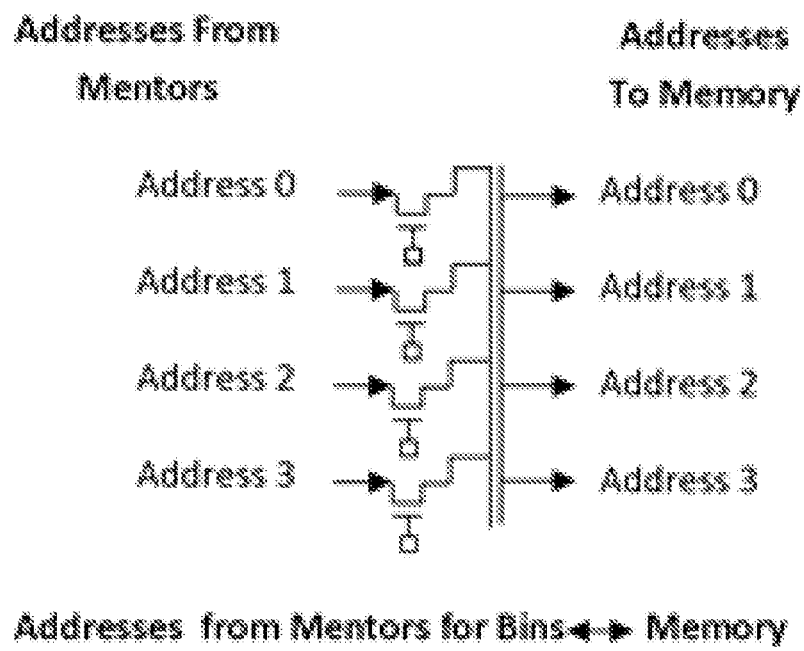
FIG. 12 illustrates a memory addressing circuit.

This small crossbar simplifies the pipelining of the operations as the allocation circuit simultaneously notifies the Mentor circuit and pre-sets the addressing path such that there are no delays in memory access on the following cycle, a subject of high importance in strictly sequential programs. The memory addressing circuit in FIG. 12 shows that up to 4 memory channels may be addressed in each cycle. For "read" operations a block of 8 words will be brought up from memory with 0 fill if memory address is outside the rage of some of the words in the incoming 8 word block.

Block Word Alignment and Pre Staging

As mentioned earlier, the current vector method of aligning blocks of operands through vector registers unnecessarily complicates the software.

$$a \cdot b = \sum_{i=1}^{n} a_i b_i = a_1 b_1 + a_2 b_2 + \ldots + a_n b_n$$

While some algorithms like dot product expression above fit well in the category of algorithms whose data flow is done through simple arrays operand indexing, other algorithms use indexing variations of the same array. For example, in a Simple Relaxation Algorithm, a new operand value may be the average of the value of its four neighbors.

$$DO\ j=2,M-1;\ DO\ i=2,K-1;$$

$$A1(i,j)=0.25*(A(i,j-1)+A(i-1,j)+A(i+1,j)+A(i,j+1));$$

END DO; END DO;

While the two outer elements A (i,j−1) and A (i,j+1) do align with the innermost loop index (i), the elements A (i−1,j)+A (i+1,j) are either one element ahead or one element behind the loop counter. In either case, in order to gate the right element of the operand stream into the Functional Unit port(s) one has to align the operands into the Functional Units ports in the algorithmically correct form. It thus behooves one, if possible, to use a single operand stream for both A (i−1, j)+A (i+1, j) as they are only two operands apart.

Operand Pre Staging

Consider an array whose base entry does not line up at an 8 words address boundary, destined to one of inputs of a block of ADD Functional Units, while the other input is properly aligned. Assume that the last three bits of the array base address is 011. Upon the first input block transaction; the transaction will bring five out of 8 words from the array's assigned Bin. This is not sufficient in order to perform the 8 ADD operations so the inputs are pre-staged in their respective tarmac registers. Furthermore the pipeline of the Functional Units as a whole is not advanced. The control cycle discipline does not allow the pipeline to proceed unless all operands are present at FU inputs.

In the case that the array base address is 011, out of the first "highway transfer", five words out of the first 8 incoming will be realigned in the alignment section by a "left three" (circular) shift. The results of the first channel transaction are deposited in the tarmac registers of the 8 ADD units. "Left three" means that the five words position 3-7 are placed in position 0-4 and word 0-2 are placed in position 5-7. During the next cycle the same "left three" transformation is made on the next set of 8 words. Now the words in position 5-7 and the five in the tarmac register (as well as the aligned operands on the second FU input) go into the 8 ADD as operands, the control cycle is now complete (thus issued). The remaining five words are stored in the tarmac register as operands for the next cycle. The pre-staging information is retained in the tarmac registers for the loop's duration and thus the first control cycle took two clock cycles, the system is now "self-synchronized" and the following control cycles take a single clock cycle. Thus the alignment setup penalty is but a single cycle at the onset of the loop.

Alignment is one use of tarmac registers, other uses are holding constants or a slow moving variables such as storing C (j) in:

$$A(i,j)<=B(i,j)*C(j);$$

Or 3.5 in:

$$B(i)<=T(i)*3.5;$$

In the case of a constant or a slow moving operand the operand or constant are first pre staged and "spread" by the alignment logic from one location to the tarmac registers to all 8 Functional Units tarmac registers in the block and then used for the duration of the loop in one of the input legs of the Functional Units group.

Spares Strategies

In FIGS. 4 through 12, design elements are shown in an 8+1 arrangement where typically the $9^{th}$ element is used as a spare. This is one strategy and it is strategy for Functional Units blocks in this design example. The Frames and the crossbars may be taken as a complete unit form from "bit sliced" units of 64 identical structures—one slice per bit, with one or more "bit slices" as spare. Alternative "spares" strategies maybe used that best fit, for example, the particular silicon process and the particular choice of the processor's cycle time.

As previously mentioned, technology now enables the use of spares strategy as manufacturing tools where good parts are selected and "zapped" into operational status or the implementation may use gating or "flash technology" or other methods for interconnect methods allowing field self-repair.

Mentor Control Circuit Level
Processor Control Circuits Overview

A task of the control structure is the supervising the Bins in the Frames structure. Each Bin serves as the home base to one or more Variables. A Variable is set of one or more operands, and is specified by a descriptor (which may be explicit, inferred, or a combination as specified by the DONA instruction set architecture to be discussed later).

A Variable may represent an array, list, file, queue, single variable, constant, program, routine, instrumentation port, communication port, etc.

The Bins may serve as the means of access to all data Variables. A laptop system, for example, may be based on two virtual levels, Bins to main memory as the first level and main memory to hard drive as the second level. (In more complex systems the "permanent storage" may not be a hard drive, but a more complex structure that may include the cloud.)

Operating according to the two level architecture principles, each Variable is defined by the descriptor which contains physical location, size, dimensions, data type and other properties when applicable to a particular descriptor model like Object class, Object abstraction, Object inheritance, etc. In order to present addresses to memory the program includes the definition of the Variable's memory location and size or uses shared Variables that have been previously defined and then access operand(s) within the defined Variable.

Figure 13:
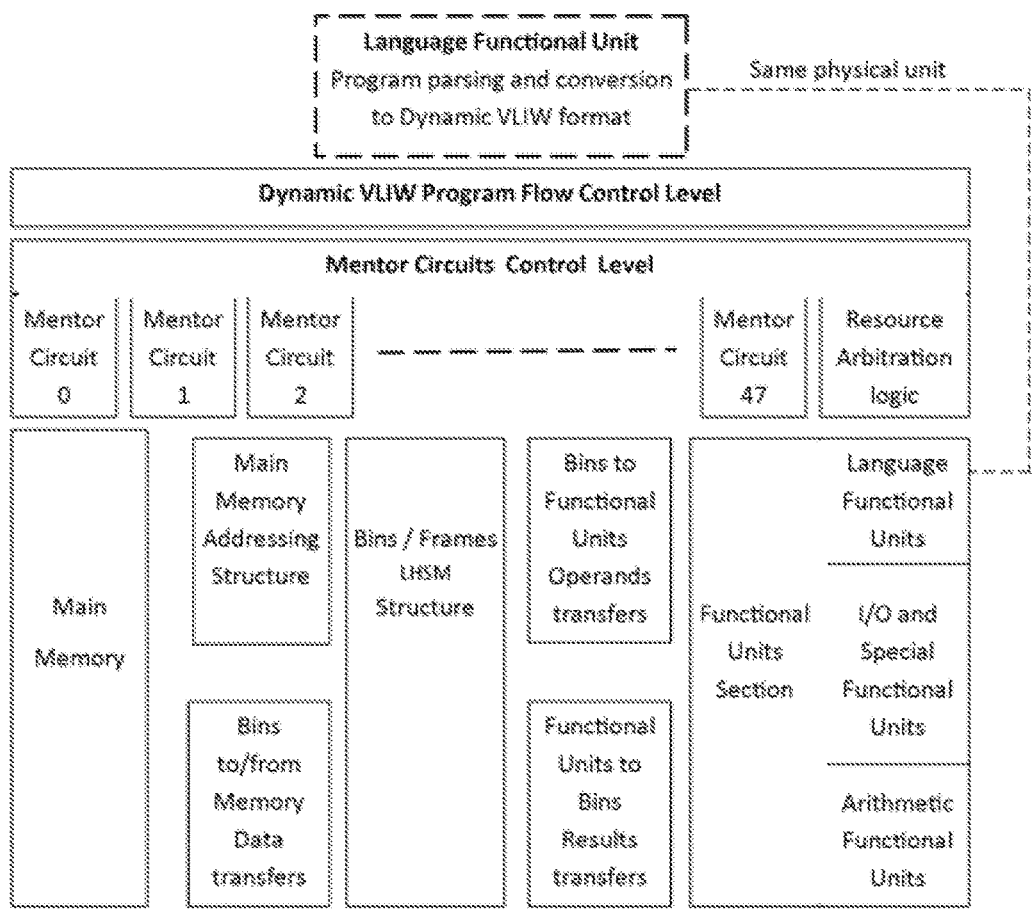
FIG. 13 illustrates a functional block diagram of a processor including a dynamic VLIW program flow control level and a mentor circuit control level.

FIG. 13, is a redrawn block diagram that contains the information in FIG. 3 and includes several more items in the control and functional units sections. The Functional Units section has been modified—in addition to the traditional arithmetic and logic functional units special Functional Units and I/O functional units are added to the diagram. One example of a new functional unit, a CAM FU is included later in this description. The CAM FU may perform pattern recognition, for example, on biological DNA information; finger print data searches, or code breaking.

The I/O Functional Units may allow for direct processor interaction through high speed I/O interfaces, including, for example, processor-to-processor InfiniBand links, DWDM SONET and Internet fiber-optic interfaces. The inclusion of high speed interfaces as part of the basic Variables in the architecture may allow the processor to bypass data transport limitations of some existing systems. The high speed I/O interfaces allow for the forming of effective processor teams that cooperate by means other than interacting through shared Main Memory. One advantage of the high speed I/O interfaces is the computing device's ability to filter massive data before storing the relevant part of it in memory.

In this example, a set of Language functional Units (LUs) may be added to the Function Unit section. The Language functional units are the instruction interpretation units and are responsible for program flow control of the machine and therefore the LUs are present in two different places in the block diagram. As the LU is a user of a Variable type program thus it is part of the data structure. The same LU is also on the top of the structure, as it is the top control element.

The LU is responsible for converting the machine language instruction stream to internal control signals such as a wide word format in the Dynamic VLIW format discussed herein. In turn, the Dynamic VLIW may control the Mentor circuits, which supervise Bin operations.

Control Flow Overview

As shown in FIG. 13, control in various embodiments may be divided into three levels:

(1) Language functional Unit. The Language functional Unit may perform machine language program parsing and instruction interpretation and convert the machine language program to dynamic VLIW program. As previously mentioned, present technology allows one to design sophisticated LUs that look ahead at significant machine code sections and thus "understand" complete loops or small routines. This section is not paced by instruction action launch of operands to FUs or instruction completion (the control cycles).

(2) The Dynamic VLIW and flow control. This section is used by all the LUs. The section progresses according to control cycles and is responsible for issuing control commands to the Mentor section (implemented, for example, by way of one or more mentor circuits), cross bars and FUs. The Dynamic VLIW may issue data transfer requests in terms of Variables. The Mentors provide the physical Bin and Memory address, or I/O data in case the Mentor supervises "infinite external operands". This section is paced by control cycle instruction action launch of operands to FUs and instruction completion.

3) The Mentor Level.

The top two levels should be familiar to an ILP designer though the terminology used to describe the functions performed in those two levels may be different than the one used here, the next one, the Mentor level is a new level. The following section details the diagrams, function and use of the new level, the Mentor level, a level forming a new architecture innovation.

The Index Loop Circuits

In some embodiments, Index Loop circuits are used to operate loop indices. The Index Loop circuits are placed in the Dynamic VLIW control layer. It is the discretion of the DONA (the machine language) compiler whether a named program element that is used as loop index is translated by the HLL to DONA compiler as a Variable or as an Index.

Definition: A named integer operand used as loop indexing control and updated by incrementing or decrementing by a fixed integer until it reaches the prescribed limit is defined as an Index.

Complex manipulation of the named HLL operand used as the loop's index may require the operand to be translated as a Variable.

Using an Index instead of Variables does not violate the principles of "data conceptual units are Variables" as it is up the compiler to decide which HLL statements denote use of Variables and which are just "linguistic ways of stating" specific algorithmic actions. I.e. DO I=0, N; A(I)<=B(I)*3.5; END DO; is just HLL's way of saying "multiply array B by 3.5 and store the results in array A". FORTRAN does not provide a way of stating action upon plurality of operands without linguistically using indices.

In some embodiments, loop indices that are operated through: starting value, end value and increment value are assigned by DONA to an Index Loop Circuits in the Dynamic VLIW flow control level. The Index circuits may be synchronized with the Instruction Interpretation and the use of DONA LOOP END instruction such that the termination of the loop does not involve program flow speculation (branch prediction) as the program flow knows ahead of time when the last loop iteration will occur. In the use of history based branch prediction, in addition to incurring a miss-prediction recovery delay, the branch prediction mechanism is a common source of out of bounds operations. The history based predictor associated with Conditional Branch will forecast branch taken on the last loop iteration, an action that may cause an out of bound access to the N+1 element of an N element array. While the out of bound access is indeed recovered by the logic, the N+1 access behavior interferes with the ability to install out of bound checks in the computing device.

Whether originating in an Index circuit or a Variable, all loop index values may be broadcast by the Dynamic VLIW layer to all Mentors. Only the present value, the initiation and termination of the innermost loop may be broadcasted at loop initiation. The Mentors may retain all relevant (outer) loop information previously provided.

The Mentor Circuit as the "Addressing Processor"

In some embodiments, a processor includes N Mentor circuits; the number for N in this example is 48. Each Mentor circuit is responsible for handling all the transactions relating to one or more Variables assigned to it, where each Variable resides in the Bin (and associated memory, communications and instrumentation interconnects) that is assigned to the Mentor. Each Bin may handle one or more Variables.

The program flow activities of the data structure are directed by the Dynamic VLIW. The Dynamic VLIW is the internal intermediate multiple activities per cycle instruction format. The Dynamic VLIW issues instructions in terms of logical Variable IDs. It is up to the Mentor circuits to translate Variable IDs to Frames addresses and physical locations in Main Memory (or communications or instrumentation operations).

The control activity done by the Dynamic VLIW for example in the operation A (i)<=B (i)*C (i) is done in terms of the logical names of A, B and C and the index value of loop iteration "i" made available to the Mentor circuits owning the Variables A, B and C. The tasks of the Mentor circuits includes but is not limited to, when given the logical names "A", "B" and "C" and the value of "i" to do the following:

1. Provide to the data structure the physical Frame addresses of the Bin operands, A, B and C.
2. If any the operands of B and C are not in the Bins bring the operands from memory.
3. Perform a write through of A from Bin to memory when appropriate.
4. Participate in word/block alignment if operands arriving in blocks of 8 words are not properly aligned with the desired word location of the result.
5. Support speculative execution when appropriate by keeping record of past operand values and/or hold back write through to memory.
6. Report bounds check violation if the address requested by the values of the indices ("i" in this example) are outside the Variable's range.

Access to the Variable's assigned data space is granted through a Mentor responsible for this Variable's Bin. The Variable's assigned space includes but is not limited to both the Main Memory space and the Bin space. In the command issued by the Dynamic VLIW to the Mentors, Variable's logical ID may be followed by a list of index relative formulas. Consider the expression:

$$DO\ i=2,M;\ DO\ j=2,K;$$

$$A1(i,j)<=0.25*(A(i,j-1)+A(i-1,j)+A(i+1,j)+A(i,j+1));$$

END DO; END DO;

The Dynamic VLIW program flow control level will transfer to the Mentors the indices relative formulas to the equivalent of:

$$A1<=0.25*(A(,-1)+A(-1,)+A(+1,)+A(,+1));$$

The four formulas [,-1]; [-1,]; [+1,]; [,+1] specify the index values relative to the inner loop (i) and the next higher level loop (j). The formulas are unchanged through the two level DO loops run. Given the formulas and current value of loop indices, it is up to the Mentor circuit to calculate and produce the correct physical operand addresses during each program cycle. Note that A1 does not require a formula as in absence of an explicit formula the current values of indices (i,j) are used. The use of (loop) index relative notation also makes for compact (DONA) machine code and simple correlation of object code to source code.

Computing operand locations for a multi dimensional Variable will typically involve additions and multiplications. Therefore the computation may take several cycles, however note that the operations once performed will typically produce a value that requires only an increment (or decrement) by a fixed number in the following cycles, thus the operand address computation fits in the pipelined processor control cycle method of operation. The first control cycle in a loop may take several cycles but the following iterations may be done in a single cycle.

As a result of assigning the index arithmetic calculation to the Mentors and providing to the Mentor circuits the state of loop iteration circuits through the Dynamic VLIW control circuit, just about all indexing calculations are offloaded from the main code to become tasks for the addressing circuits in the Mentors. The Mentor and loop index tasks are done outside the data structure and in parallel with the main code. Comparing to the instructions activity in a traditional (ILP) register machine, typically two thirds of the instructions activities, specifically the "where to find [the operands]" (Backus) part, may be offloaded from the main program flow to the Index Loop circuit and Mentor circuits.

As a result, the main program control is now mainly about "traffic concerns . . . significant data itself". The "where to find it" part of the program's work is done now in parallel by the Index circuits and by the Mentor circuits.

Mentor Circuit, Tasks and Functions

A Variable is managed by a logical Mentor through a physical Mentor circuit operating on behalf of the Variable's logical ID. A physical Mentor circuit manages a limited number of logical Variables. In the example presented here, a Mentor may handle a single dimensioned variable or up to 64 single Variables and/or up to 1024 constants. The numbers of Variables handled by a Mentor circuit may be increased by increasing the design complexity of the circuit, the spares parts approach advocates that the number of Mentor circuits should be 8 or more. In this example, the processor includes 48 physical Mentor circuits.

Variables are operated through Mentor/Bin pairs where the Bin contains the Variables immediate data and the Mentor contains the Variable's descriptor, addressing formulas, and controls the actions involving the Variable. For dimensioned Variables the Variable's full data set is typically stored in Main Memory and the Bin may contain all or a part of the Variable's data set, thus the Bin is acting as a "cache" for the currently used portion of the Variable's data.

FIG. 14 is a functional diagram of a physical Mentor circuit. The diagram relates to the different functions performed by the logic circuits inside the Mentor, FIG. 14 it is not a hierarchical diagram of control.

Starting at the bottom of FIG. 14 one can see three sections. The central section is a hardware addressing circuit responsible for generating all the Main memory addresses and all Bin addresses for accessing individual elements of Variables. For complex addressing expressions, as in inversion layer in a data base the Mentor may also receive information from the data structure section.

At the left bottom section one sees the Variable's self-bounds check. This circuit performs bounds checks on all main memory and Bin addresses generated by the Mentor. The mentors perform those checks simultaneously with sending the addresses thus no delays are incurred due to bounds check. The design contains a pipeline halt mechanism so the action is stopped prior to consummation (memory write through) for the very rare cases a bounds check violation flag is raised.

Bottom right is the Intrusion bounds check. This circuit is monitoring all four memory address busses for cases that someone else (another Mentor, or another processor in a shared memory system) violating the Variable's assigned space. This circuit, for example, protects against allocation errors and malware. An allocation error may occurs when a new Variable is allocated memory space while the system forgot to de allocate that space from an existing Variable and/or forgot to remove the old Variable from the system.

Going now up in FIG. 14, the conflict resolution logic is responsible for obtaining Memory port allocation for Bin to memory and memory to Bin data transfers.

This part of the Mentor circuit is also responsible for negotiations and staging when more than one Mentor attempts to access the same physical Frame block for Functional Units operands transfers, as well as when an extra cycle is needed for staging and block alignment. As was described in previous parts, the Mentors and allocation logic are using the control cycle discipline to resolve Frame contention. Once multiple requests in the same cycle for the same Frame are present, one Mentor gets access to the Frame forming a pre-staged transfer to a tarmac or a memory port.

The following cycle both first and second Mentor channel requests perform a transfer. The process continues until the entire sets of request in the control cycles have been honored. As previously explained once the pre staging is done during the first loop iteration, the following loop iterations take only one cycle per control cycle as the operands flow is now pre staged. The competing Frame requests may come from the same Mentor as each Mentor may issue 3 channel requests per cycle, two Bin-to-FUs and one FUs-to-Bin, or they may come from different Mentors.

The next level up in the FIG. 14 is where, for dimensioned Variables the Variable's "cache management" resides. Specifically this function contains the table and controls for which sections of the dimensioned Variable are placed in the Bin and contain the logic to handle incoming section (read) and outgoing sections (memory-write-through) as well as traffic in and out from the Bin to/from the Functional Units. (Note; a program code section or a variable length list or string is considered a dimensioned variable.)

For single Variables this section contains the pointers for the 16 element circular file that retains the Variables history.

One will also find in this section the logic for "cache coherency" support for dimensioned and single Variables. As stated; the Bin is the "private cache" of each Variable.

The next section up in FIG. 14 diagram "History and logic for Undo". This section is concerned with all the elements of speculative execution (branch prediction, out of order execution) and using "undo" that participates in debugging support. Speculative execution requires that the processor logic retains full context to undo operations in case the speculative assertions fail. The system may also be designed to provide undo capability beyond what is needed by the speculative actions in the hardware. Specifically to allow for undo back to checkpoints defined by software. Please note that the processor does not deploy shadow registers, undo operand storage is supplied by the (Dynamic VLIW and Mentor programmable) use of the Bins. This includes using circular files for single word Variables and holding back the Variables' memory-write-through until all speculative assertions have been verified. Thus due to the programmable nature of the undo capability it may be extended beyond present hardware needs of supporting speculative operations.

The top part in FIG. 14 deals with the general Mentor control and Variable's definition parameters. A Mentor's ownership of a Variable may start when the Mentor receives from the DONA Instruction Interpreter the Variable's definition. The Mentor contacts the Resource allocation circuit in the Dynamic VLIW layer to receive the Variable's Bin space allocation.

The Resource allocation circuit may be contacted by the assigned Mentor at the initiation of a routine to request Bin space allocation in the Frames structure to Variables in this routine. Shared spaces or transfer Variables (CALL by name) have already assigned space. Operands in CALL by value are assigned as constants in a Mentor/Bin assigned to the new routine. Other, more sophisticated CALL/RETURN techniques, like Inheritance and Polymorphism properties in Object oriented C++ may be incorporated in the Mentor and Dynamic VLIW control design as decided by an implementation system architect.

The Variable definition, among other things, contains Mentor ID, Variable type, size, dimension, and Variable's location in main memory, and Bin allocation. The Bin may be uninitialized or initialized by its previous use. A discussion of the use of the Mentors as limited physical resources to support a large number of virtual Variables follows in The Virtual Mentor Files section.

Logical Mentor

As used herein, a Logical Mentor is a logical entity responsible for the integrity, addressing operations and/or other functions of Variable(s) assigned to the Logical Mentor, whether it assigned to a physical Mentor, to a Virtual Mentor File (VMF) or to other software and/or hardware mechanisms included in the architecture. The Logical Mentor construct includes the existence of physical and logical mechanisms responsible for the creation of a Logical Mentor and the conversions between Mentor VMF state and logical mentor using a physical Mentor. As techniques like Object oriented Inheritance and Polymorphism or Data Flow programming are incorporated into the computing device architecture, the logical Mentor design may include the appropriate support for those capabilities. The physical Mentor used by a logical Mentor may be similar to the Mentor circuit described here or it may use a different implementation including portions in hardware and other portions in software. The logical Mentor mechanism as described herein may also include a "conscious dormant" state capability through allocated active hardware or software, where for example address bounds checks or other mechanisms may automatically render a Variable active, including the assignment of a physical Mentor to the Variable. Conceptual relations between physical and logical Mentors are similar to the conceptual relations of virtual memory pages. In "bottom up" physical view a page is in dynamic memory or it is on the hard drive (or both). However in the top down logical view a logical page is in the memory system and the virtual mechanism, however it is physically implemented, is responsible for the operational details. The following discussion, for reasons of full disclosure, takes the bottom up view assuming the same information may be converted to the top down logical view by a person skilled in the art. Logical Mentor as defined herein includes the existence of the full hardware and software mechanisms to implement the logical Mentor whether they are similar to the physical method described herein or totally different.

The Mentor Circuit Interconnects

Figure 15:
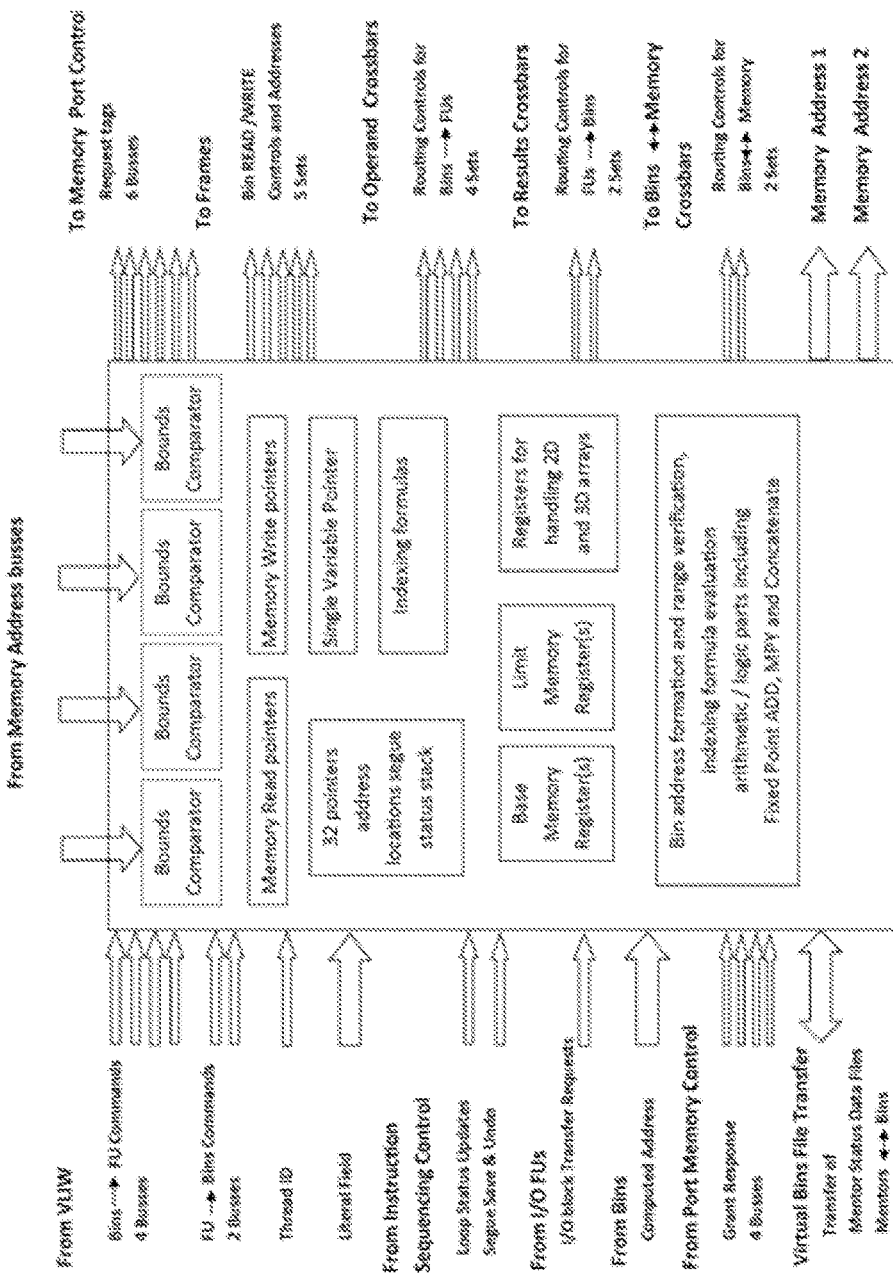
FIG. 15 is a functional and interconnect block diagram of mentor circuit.

FIG. 15 is viewing the Mentor circuit from interconnects and functional block diagram point of view. An important aspect to note is that in terms of sophistication and complexity a mentor circuit may rival the complexity of many processors, in the same manner that a single jet engine of a modern airline exceeds the complexity of many propeller airplanes. The task objective of a Mentor circuit is to assume full responsibility for the operation of one or more Variables. Specifically the task of Mentor circuit is to do all the Backus "where to find it (and protect it)" tasks of array index calculations, bounds checking included in the mapping of a logical Variable to physical Variable operand address and cache management and other to be defined tasks relating to security, simplicity and system robustness.

Mentor Circuit Items

Starting at the top of FIG. 15 the Mentor circuit includes 4 Intrusion bounds check circuits, one per memory address bus. While each Mentor circuit performs full bounds self-checks for the conformance of its generated memory addresses with the space it has been assigned, space intrusions by malware or errors may still occur in the system. For example space has been allocated to a new task or Variable without being de-allocated from a current task or Variable. The Intrusion bound check circuits checks each cycle for "is anyone operating, by read or write in my assigned space". By the Variable data definition all data access operations must go through the Mentor circuit assigned to a Variable owning the space. This includes shared spaces where the Mentors assigned to a shared space knows if the space intrusions are or are not part of the (token passing, etc.) legal procedures for shared spaces. The 4 Intrusion bounds check circuits detect space intrusion violations caused by someone else in the system.

Moving to the left top side of the central box in FIG. 15 leads to the Read and Write Bin to/from FUs Commands. The input segments from the left top include 6 logical Variable's commands. Up to 4 Variable read to FU commands and up to 2 Variable FU to Variable write commands. The Variable's logical ID is broadcasted according to the format in FIG. 16. The Mentor examines the logical Variable IDs in the command and only accepts commands that match their assigned Variables logical IDs.

Each Mentor circuit may simultaneously check each cycle all six data transfer commands issued by the Dynamic VLIW for a match to the Variable IDs the Mentor is handling. As a practical consideration for this design the Dynamic VLIW may not issue more than two read operations and one write operation per Mentor per cycle. (In the rare case that this is a limitation a second physical mentor may be assigned as a "helper".)

Next input is an 8 bit thread ID. When commands are issued in terms of logical Variables the namespace of the logical variables belong to a program thread. The full logical address contains the thread ID and a logical Variable ID within the thread. A context switch may assign the processor to a different thread which will use either newly assigned Mentors or reactivate Mentors previously assigned to the now reactivated thread. This conscious-dormant technique enables an inactive thread owning one or more Mentors (dedicated Mentors that are not available to the current thread) to keep a watch over its address domain and become active within few cycles as the dedicated Mentors holds the thread's operating context. The activation may be due to a CALL, RETURN (to) or the detection of address space violation of the dormant thread space by its dedicated Mentor.

Going down on the left side one finds Literal (Address) and Bin Setup. This input in FIG. 15 is coming from the Dynamic VLIW literal, it is used in generating memory address when, for example, the program contains a fixed memory address to post a computational result in the addressed location or an address to jump to in case of a program completion or error. This field is also used in order to set up the Mentor circuit with the addressing formulas.

Program Loop Index Value and Status

The next item going down on the left side of FIG. 15 is broadcasted from the Dynamic VLIW Program Flow Control FIG. 13 to all the Mentors is the status of current index value and loop termination status including a LOOP END, BRANCH to a location outside the loops area, or exception. The Mentors retain all (outer loop) parameters obtained prior to inner loop entry as they do not change as long as the innermost loop is active. As stated, active loop indices are typically used as operand in indexing formulas.

Pointer Status Save and Undo Commands

The following input in FIG. 15 is a set of control lines from the speculative execution portion of the Instruction Interpretation circuit requesting that the history stack perform a "program status save" and retains the Bin index values so that the Dynamic VLIW program may return to this location. A status save instruction is given for example upon any speculative execution including program going through a CONDITIONAL BRANCH based on branch prediction. The status save mechanism is also used by the software debugging tools for Undo operations that go beyond the status save range required by speculative out of order execution or branch prediction.

Continual status updates are also received by the Mentors from the Dynamic VLIW control when speculative program flow status has been confirmed, for example after the branch prediction test was done and the results agree with the prediction, indicating that the information is no longer subject to "undo" and Bin content, for example may now be deposited in Main Memory (write-through).

The confirmation of Branch prediction or other speculative operation is necessary prior to the Mentor initiating any information write-through to memory or data overwrites as a write-through to memory is not recoverable. "Status save" and "Undo" commands are broadcasted to all Mentor circuits by the Dynamic VLIW Program Flow Control.

Computed Address

This input to the Mentor circuit in FIG. 15 is an operand coming from single or dimensioned Variable such as array, table, queue or list residing in a Bin. The operands are computed by algorithms that are typically using addressing formulas that are more complicated than the range of computations done by Mentor addressing formulas. Case in point would be addressing formulas that themselves require access to operands in Variables in the same or other Bins. An example would be the computing of the inverted index into the data files of a data base. Where the scope of Mentor addressing functions ends and the use of computed addresses begins may also depend on the type of mechanisms that are included as standard in the hardware and (DONA) machine language of the computing device described herein regarding the inclusion of new mechanisms and existing system software mechanisms present for example in C++, Java and Visual C++ concerning: Class, Encapsulation, Inheritance, Data Base inverted index files, etc.

The computed address is fetched from a Bin and is put bus "0" word "0" to feed the Mentor's Computer Address bus as similar to sending an operand to a FU using the leg input ID of the FU. The Computed Address Bus is broadcasted to all the Mentors for computed address input.

Access Grant to Memory

The information at this input is coming from the Memory bus arbitration circuit. Mentor ID plus Memory port grant information is transferred from the Memory bus arbitration circuit in the Dynamic VLIW Program Flow Control. The information includes the Memory port assigned to the Mentor and number of Memory cycles allocated (1, N, unlimited). The Mentor is to proceed with Memory port transfer during the following cycles.

Virtual Mentor File (VMF) Load/Unload

The last entry on the left side of the diagram is a path that enables the creation and use of Virtual Mentor Files (VMF). VMFs are the basis for a virtual Mentor structure. To activate a Mentor, the Dynamic VLIW requests from the Dynamic VLIW Program Flow Control resource arbitration section a Mentor assignment as well as the assignment of Bin space based on the Variable Data Definition section in the VLIW program (and/or/when other means for example polymorphisms and self-defining data are included). The Mentor and Bin space are returned to the resources allocator at program termination.

The resources allocation circuit may exhaust either Mentors or Bin space, in this case some of the current Mentor+Bin spaces are turned virtual. The area in the Bin that needs to be transferred to Memory (write-through) is transferred to Memory and the content of the Mentor (Variable's base address, Variable type (Class), dimensions, etc.) is turned into a Virtual Mentor File (VMF) See FIGS. 17 and 18. A Dedicated Mentor is assigned to the VMFs as the VMF set is also a Variable.

As described above, the Mentor content may be mapped to VMF format if the resource allocator circuit turns a Mentor assignment dormant in order to assign the physical Mentor circuit and/or Bin space to another task. The VMF is typically turned back from dormant to active if a program attempts to use the Variable. In that case the resources allocator may turn other Mentors to VMF status. The resource allocator may use Least Recently Used or another algorithm to decide which Mentors are active and which are dormant. The VMF operation and VMF Mentor is the subject of the following The Virtual Mentor Files (VMF) section.

To Memory Port Control

Starting at the top right corner of FIG. 15:

Request Tags.

On the right side of the figure starting at the top, one sees the memory access request tags used by the Mentor to gain control over one or two of the four Main Memory ports. The request tags are sent to the Memory bus allocation circuit. There are six "request tag busses", one each of the six transfer channel requests.

When the Mentor decides it needs Memory access it may post, during the cycle after receiving a command, a request on a tag bus corresponding to the original channel operand transfer requests. The allocation circuit knows the ID of the requesting Mentor by keeping track of the command issued one cycle ago. The request also identifies whether this is a regular or a Semaphore request (shared space) and whether it is for a word, a bank (8 words), multiple banks, byte stream, etc.

To Frame Structure

The following sets of signals contain the corresponding information to FIG. 16 Dynamic VLIW channel transfer commands. While the channel commands (FIG. 16) are given by the Dynamic VLIW in terms of logical Mentor/Bin IDs the information provided by the Mentors to the Memory busses, Frame addressing and crossbars controls is in terms of physical Memory addressing, Frame addressing and crossbar control information. The Mentor translates the signals from the Language Unit+Dynamic VLIW control structure operating in a logical Variable space to the physical space of the memory and data structure.

Bin READ/WRITE Word Masks and Addresses

These signals select the Frame blocks and provide both the addresses within the blocks and the Read-Write control signals to the Frames for all memory and FU information transfer. A single Mentor may select up to five Frame blocks (8 words each) in a single cycle, two for Bins to FUs, one for FUs to Bins and two for communicating with memory.

As previously discussed Frame access conflicts may occur. The pipeline control circuit is using tarmac registers and the control cycle method in order to resolve the "collision of requests". The pipeline control cycle circuit blocks the pipeline advances of the FUs pipeline and Dynamic VLIW, while it takes extra cycles to "pre stage" tarmac registers and resolve collision conflicts. The "pre staged" configuration is retained throughout the loop duration such that the "pre staging" penalty is typically paid only once at the onset of a loop operation.

To Operand Crossbars

Routing Controls for Bins to FUs

Those signals provide the destination FU buss address for the crossbar control. Note that each cycle in this implementation a Mentor may issue commands on maximum of two out of four of the crossbar control busses actions.

To Results Crossbars

Routing Controls for FUs to Bins

Those signals provide the source FU buss address for the crossbar control. Each cycle on this implementation a Mentor may issue commands on maximum of one out of two of the crossbar control busses actions.

To Bins to/from Memory Crossbars

Routing Controls for Bins to/from Memory

Provides controls for Memory to/from Frames crossbar interconnect. A Single Mentor may be assigned up to two out of the four Memory ports on this implementation.

Memory Addresses.

The last two outputs provide the Main Memory addresses. Each address bus may be used in a read or a write operation.

Circuits Inside the Mentor

In this description we only detail the major blocks of circuits inside the Mentor, which is the central box in FIG. 15. Implementation may vary based on design decisions influenced by pipelining and cycle time about exactly which parts of tasks are done by the Mentors, and which parts of tasks are done by the Dynamic VLIW Program Flow Control, the bus arbitration circuit(s) and the resource allocation circuit the Dynamic VLIW Program Flow Control (FIG. 13).

The choices are practically dictated to large part by the architecture features that are basic to the computing device hardware/software interface design approach and tested concepts and ideas in language interpreters like Java, C++, etc. Re-inventing a hardware/software interface all afresh is impractical as it takes too long.

The hardware/software interface choices include the basic namespace approach; mapped or physical location based. I.e. is: "Variable name=Variable base location in Memory" or Variable ID is a mapped namespace. The choices also include the selection of function/features set one wants to match. (This is computer talk for "the rules and laws of the computing device's legal system").

If, one for example chooses C++ as the software transport route to move away from Register based machine language to a machine language using information processing's "conceptual units", one should at least start with a proven system already operating in the "conceptual units language space" and include in the software/hardware interface (data definitions, instructions definitions and all their intricate relations) a complete subset of the instruction types and data structures in all their modes of operations in a fashion that matches the: object, class, abstraction, encapsulation, inheritance, polymorphism, etc. of C++. One may add feature/functions, (VMF, IMMUTABLE, etc.) but typically subtraction of features is problematic.

The match may be "bit compatible" or functionally compatible. If the architecture choice for the computing-device is to be "bit compatible", existing code and data may be used "AS-IS". If the choice is for "functional compatibility" code and/or data may need to be transliterated from the existing forms to a new forms. (If Greece decides to adopt the US legal system "AS-IS" all Greek citizens better speak English. If Greece decides to functionally adopt the US legal systems, US laws, precedence cases, etc. must be fully translated to Greek.)

Implementation of Low Use and Future Innovation Function/Feature in the Mentors.

Mentors have direct access to Memory, their assigned space as well as other spaces (as long as the Mentor assigned to those spaces does not object). This allows the computing device architect to use both Memory and/or associated Dynamic VLIW buffer space to implement low use functions as well as proposed new features/functions, by (existing recompiled) software and microcode instead of by hardwired implementation means.

This capability is very important for software migration as the compatibility rout taken may include elements that clearly need to change (for example the use of multiple threads for implementing micro parallel functions in CC++ is very inefficient) but the functions are needed in the transition period.

This capability also addresses newly invented feature/functions in security and other areas that should be fully field tested despite their sluggish original software/microcode operations prior to being installed into the hardware.

For example consider that an encryption method is proposed for Variable ID and the Mentor is to do part of the encryption/decryption. The system may be first tested with the Mentors using a "sneak memory path" to let an encryption/decryption software program do the actual work, but to the rest of the system it looks like the Mentors are doing the task.

The Circuits Inside the Mentor

FIG. 15, from the top down.

Bounds Comparator(s)

The Memory address bounds comparators contain the bound intrusion detection mechanisms. The circuits are checking against Memory addresses that are generated by other Mentors and intrude into the domain assigned to the Mentor's Variable(s). For efficient operations single Variables should be clustered into a continual memory space and served by a single Mentor.

Memory Read Pointers, Memory Write Pointers

The Memory Read and Memory Write pointers locate the next block for either a read from Memory or a write-through into Memory. During Memory transfer activities, the pointers are checked against the Base and Limit Registers (or other more complex mechanisms if the Variable is in a distributed structure as may occur in cloud storage) to verify that Memory operations do not reach beyond Variable's bounds for the self-check done by the Mentor.

Single Variable Pointer

Single Variables, stored in a single word in Memory are retained in a 16 elements circular file, so that the file retains the past values history for Undo operations during speculative execution. The past history retention is also an important element in debugging. A Mentor may serve up to 32 single Variables and 512 constants.

Memory Base and Limit Registers

The register contains the Variable's base address and the size of the dimensioned Variable (or more complex mechanism supporting a distributed storage system and chosen new system architecture features).

Registers for Multi Dimensioned Variables

The registers contain the base number (usually 0 or 1) and the size of the particular coordinate for all dimensioned Variables, accommodations up to 6D Variables. Higher dimensioned Variables are handled by the compiler as arrays of arrays.

Bin Addresses Formation and Self-Bounds Verification

A set of arithmetic elements including add/subtract units, multiplier, and logic elements for concatenate and mask operations. The Control cycle mechanism enables complex addressing operations that take longer than a single cycle. The multi cycle operations is to be set up to typically only take multiple cycles the first loop iteration and a single cycle the following iterations.

Mentor Command Format

FIG. 16 contains the format of commands sent to the Mentor by the Dynamic VLIW.

Mentor ID identifies the logical ID of the Variable receiving the command if the following L/P bit is "0". If the L/P bit is "1" the command addresses a physical Mentor circuit. Physical addressing is used in Mentor set up and in diagnostics.

Channel ID specifies the operand channel involved. 0-3 Bin to FU (operands) channels, 4 and 5 are FU to Bins (results) channels.

FU leg ID identifies the Functional Unit leg involved in the transfer.

Indexing formula identifies one of 16 indexing formulas used to generate the Bin's operand address in this data transfer. Formula "0" is the default case of using loop indices unmodified as Variable indices. The indexing formulas have been pre-loaded to the Mentor prior to the command appearing in the Dynamic VLIW.

Tarmac setup refers to three setups for pre staging operand(s) in a tarmac input leg for the duration of a loop. Code 00 no setup. Code 01; apply input word "0" to all tarmac words in an FU block input. Code 10; apply an operand or an input block to the 8 tarmac registers. Code 11 is yet to be defined.

For information regarding the reasons for operand setup, consider expression like: B(I)<=A(I)*3.5 and C(I,J)<=D (I,J)+E (J), where one operand stays constant during the loop computation. Note that the operands 3.5 and E(J) respectively stays constant through the all the loop's iterations. Tarmac setups options allow for setting up a single operand or a bank of 8 operands in the FUs' tarmac registers as the same value input for the duration of the loop.

The Virtual Mentor Files (VMF)

The Virtual Mentor Files may overcome the physical constraint of a limited number of hardware Mentors circuits and limited memory space in the Frames.

In some embodiments, a "VMF Mentor" is permanently assigned to the handling the virtual Mentor stack containing a set of dormant Variable VMFs that are used to reactivate dormant Variables. The VMF information (in FIGS. 17 and 18) is used to reactivate dormant Variables.

The VMF Mentor may operate in concert with a special circuit, Mentor/BIN resource allocator (allocator) residing in the Dynamic VLIW program control level (FIG. 13). The Mentor/BIN resource allocator circuit replaces part of the L1 cache control circuit in current designs. The allocator is responsible for the allocation of Mentor circuit(s) and Bin space(s) in the Frames to new Variable(s) being activated by a program, as well as to Variables that were previously turned dormant by the allocator as part of the Mentors and Frames space (virtual) sharing of physical resources. The other part of L1 cache management, which is the placing information in cache and the cache write-through to Memory is the task of the Mentors.

When a new Variable is initiated by the VLIW program a request for a Mentor and Bin space is sent to the Mentor/BIN resource allocator circuit, which grants this request. In case of insufficient space in the Frame structure or insufficient number of physical Mentors the Mentor/BIN resource allocator circuit may turn, based on least recently used or similar algorithm some of the Mentors dormant. The context of the Bins turned dormant is stored in memory and the Mentor information is stored in the VMF file. The VMFs of Variable(s) turned dormant are found in the VMF stack handled by the VMF Mentor. It is a design choice whether the copy or address in the VMF stack entries also includes (additional) runtime information.

The Mentor/BIN resource allocator circuit is similar in function to the hardware circuit(s) used in cache management where data segments are placed in L1 cache and the complete data is stored in main memory (including L2, L3 and other means). It is also similar in function to the allocation tasks of the software program handling virtual memory, specifically the allocation of dynamic memory space to pages that are permanently stored on a hard drive or other permanent storage means.

The allocation may involve both the allocating a Mentor circuit and the allocation of the "Bin space" in the Frames. Upon new Variable(s) being activated by a program, both Mentor and Frames space are allocated to the Variable(s). Upon the program's completion (RETURN) both the Mentor circuit and the Bin space are surrendered back to the Mentor/BIN resource allocator circuit.

Not all the Mentors and Bins that are used by a routine are new allocation Variables that receive their allocation at the commencement of the routine. The shared memory areas (COMMON) that have been established by the program making the CALL (or its ancestry) or Variables passed to the routine through another CALL mechanism are already operational Variables. (If the information contain CALL parameters passed by value the CALL parameters are stored in the Bin(s) as constants, but Mentor and Bin space may be allocated).

An advantage of an LRU allocation method is the quick reuse of the Mentor/Bin pairs. Specifically when, for example, a routine CALL is part of a loop in a program the routine performs a RETURN to be called again upon the next iteration of the loop. Reallocation of the identical Mentor/Bin pair(s) saves Mentor set up time since the Mentor circuits may not need to be reinitialized with the Variable's parameters (Variable's dimensions, size, memory location, Bin location) as they are the same as the last time the Variable(s) were used.

Upon an Instruction Interpreter allocation request for Mentor and Bin that cannot be fulfilled by the Mentor/BIN resource allocator due to the fact that all Mentors or Bin space are spoken for, the Least Recently Used Mentor is turned dormant by the Mentor/BIN resource allocator.

Before turning a Variable dormant all the corresponding Bin content are placed in memory by a Bin to memory write through. After the completion of the LRU Mentor memory write-through operation the VMF of the dormant Mentor is placed in the VMF file.

The Variable is activated again using the VMF when program flow control returns to a program using the dormant Variable(s).

FIG. 17 provides details for a VMF associated with a dimensioned array:
Size: The size of the VMF in 64 bit words
Mentor Type: This selection specifies the Mentor's assigned type based on the type of Variable(s) the mentor handles, in this case "array". The example given in FIG. 17 is for a dimensioned array. Other Mentor's assigned types (classes in C++, Java, etc.) will handle single Variables and constants, (FIG. 18) byte strings, Variables with varied element size, communications channels, etc.
Variable ID: The Variable's logical ID in the routine (Variable's name).
Dimensions: Single, 1D, 2D, 3D, etc.
Mutable: 0X mutable, 10 read only, 11 write only.
Bin location: Bin location in the Frame/Bin 262144 word address space.
Bin size: The size allocated to the bin in 64 bit words.
Variable Memory address: The Memory base address of the Variable.
Variable size: Variable size in Memory.
Dimension Base: 00 Base 0, 01 Base 1, 1X the base is defined by Variable Type.
Dimension size: Size would be size of each dimension, in a 2D array it is the size of the rows and the columns.

FIG. 18 is the VMF format for a Mentor/Bin assigned to single Variables and constants.
Size: The size of the VMF in 64 bit words
Mentor Type: This selection specifies the type of Variable(s) the mentor handles; in this case the Mentor handles a number of single Variables and constants.
# of Variables: Number of single Variables in the Block.
# of constants: Number of constants in the block.

Bin location: Bin location in the Frame/Bin 262144 word address space.

Bin size: The size allocated to the bin in 64 bit words.

Variable Block Memory Address: For bound protection all single Variables and constants are allocated in a contiguous space in memory.

Variable ID: Following is the list of IDs of single variables in this block.

Constants Base: The Bin address where the set of constants begins.

Mentor Based Conscious Multithread Capability

A basic operational assumption in operating a processor presently is that all the hardware resources are dedicated to the program now being executed, in the case of Mentor circuit it means that all the Mentor circuits will be assigned to Variables in the current program. However note that Mentor circuits may be assigned differently based on the mission of the system, rather than by looking only to optimize operations for a single program. To illustrate the issue we show the roles that may be assigned to Mentors in a real time system doing both foreground and background tasks. In a system controlling a robot the foreground tasks concern the robots motions. The background tasks concerns doing routine checks of all sensors, motors and actuators as well as power supply, etc. including keeping an accurate log of all past history of the maintenance checks.

In some present systems, the system minimizes delay when interrupting the background program if a control or sensor signal is issuing an interrupt. Taking control away from a background task may leave all its maintenance files in disarray. In those systems, the background task is broken into chunks, each chunk done in a time period that is smaller than the specified "minimum system response time" after which a supervising program poles for the presence of an interrupt event. This "minimum system response time" may be quite lengthy as it requires full context switch time thus may be too long for some real time systems.

Using the Mentor circuit, the system may maintain multiple program contexts. The foreground program is assigned a set of Mentor circuits and associated Bin spaces in the Frames. The Resource Allocation circuit handles those Mentors as reserved and thus not available from the allocation pool. The background program may now be interrupted in a process that has the reaction time of just few scores of cycles for flushing the data and control structure pipeline. The foreground thread is turned active in less than 100 cycles and the background thread turned passive without the loss of any information in the background or foreground programs.

In this approach, system management OS layer(s) operates similar to the foreground layer in the real time system above. The approach allows the OS to keep "conscious dormant thread(s)" by allocating permanent Mentor and Bin resources to the OS task(s). A conscious dormant OS thread for example may need two reserved Mentors, one for its program and one for its data. Additional Mentors may be assigned when the OS tread is activated. The OS thread activation may be due to a (proper) normal CALL or a Memory address bounds intrusion (error/exception) detected by the OS active Mentor. Also note that the method of thread activation by encroaching on the OS space does not necessarily signify an error. The application program may simply access the OS space by exception when needing information or OS services. The access causes activation of the conscious dormant OS layer which now services the request and then returns to a dormant state. While this method of thread interaction means reducing some of the resources available to the application program, the proper implemented, may simplify the OS and significantly increase the overall system efficiency.

In a register machine a dormant thread typically relies solely on time slot assignment (or hardware interrupt) in order to get control, otherwise the thread has no ability to know anything about the ongoing operation. In the embodiments described herein, however, the Mentors assigned to the conscious dormant thread may be left active and any attempt by intent or means not previously established to access information in the memory domain(s) assigned to the dormant thread will turn the thread active again. The thread is thus dormant but conscious. Not only is the current program status of the OS control thread preserved but its full control over its proprietary memory area may be protected throughout the system's operation.

Conscious multithread capability as described herein is "native" to a computing device with a Mentor control layer and may, in some cases, be applied to conventional register architectures. The technical implementation may be based on any possible variations of including thread change mechanism that employs means such as entering protected spaces, requests for resource allocation changes, calls for specific routines, etc. to trigger the thread change. Similarly there are many techniques one may include in register machine architecture, without the use of Frames/Bins and Mentor technology examples described herein in order to include the context storage of the "conscious thread(s)" in the processor's architecture, however the techniques are typically ad hock and reactive, the introduction of the Mentor circuit helps put structure into the picture.

To conclude the technical description of the Mentor circuit considers that early on computers were mostly about algorithmic number crunching. Today the emphasis is data, personal data, "big data", national security and economic data, etc. The Mentor is an element responsible for aspects including the use, integrity and security of data elements.

The Mentor Roster checks circuit.

The reader may have noticed that the Mentor described herein two types of bound checks, self-bounds checks and intrusion detection. While self-bounds checks are typically within the operational logic connectivity of the Mentor, the intrusion detection circuit relies on physical connection to one or more memory busses. In a PIM type implementation this connectivity is possible, but to a limited set of processors. However, in alternate, pin limited embodiments monitoring other busses is not physically practical.

An alternate embodiment methodology to provide intrusion detection and other detection of conflicts is the "roster checks circuit". The roster checks circuit is based on a fast table lookup high speed memory device. The roster checks circuit may reside in a special device and contains memory look up table and other logic device(s) that do "security and rights checks" at Mentor circuit requests coming from Mentor circuits from several computing devices.

When the Mentor in a system using the roster circuit is activated it sends (for example via a high speed serial InfiniBand link) to the Mentor roster check circuit its VMF information specifying its ownership or shared ownership of a memory space and possession of other rights and resources. Note that while multiple Mentors are engaged during normal operations, Mentor/Bin pairs are initiated one at a time, so all the Mentors in the computing element may share a single "confirmation and reporting link" to the roster circuit.

The Mentor roster checks circuit, typically using a table looks up method, checks for compliance and/or conflicts.

The requesting Mentor may choose to halt operations before a confirmed "no conflict" message or may proceed (speculate) assuming a positive confirmation of rights.

Most present operating systems employ software check point strategy so since the discovery of violation/conflicts is rare and the cost of recovery is typically the return to the last software checkpoint, the option to continue assuming no roster violation is typically the recommended method of operation.

There is also an advantage to not changing mode of operation upon discovery of violations. Strange errors tend to be intermittent and only show up under particular conditions, so one wants to keep the operating conditions the same until the error is isolated. Also, sophisticated malware may be programmed to hide when system conditions change.

The Mentor roster checks circuit may assume additional functions, for example it may include, a multiple requestors, multiple server queue mechanism in a multiprocessor system.

The hardware arbitration, roster rights checks and conflict resolution circuit may be a several orders of magnitude faster than resolving conflicts or arbitration through methods that evolve going through CALL/RETURN chain of context switch changes when going through the hierarchical software structure of the OS.

The "current Mentor rights table", which is the content of the Mentor roster checks circuit, is also a "Variable". The Variable is set up by the system and therefore belongs to a system thread that is responsible for its set up and maintenance. The fact that this Variable may be changed not only by its owner but also by input activity (of other Mentors) makes the "Mentor roster checks" the Infinite Variable data class/type, that for organizational reasons is connected to the high speed I/O FU of a computing device, assigned as a Roster supervisor.

The Rosters may also be designed to check operations that are characteristic of malware intrusions for example not only does the Roster check if this Mentor have the official rights to access/change bank account information but may ask why is the customer changing bank account information at 3:00 AM local time through a link from Tangier??

The technical challenges in including a Roster check circuits in distributed multiprocessor systems include:
1. Keep the Roster check circuits as part of the basic model (i.e. it is a system "Variable" and not some hidden gizmo)
2. Avoid single point of failure, so provide two or three (voting) copies.
3. Have very fast response time.
4. If at all possible proceed without check confirmation delays and change system operations only upon confirmed violations.

An alternate embodiment of the "Roster checks circuit" is a method of using shared memory that includes a program in shared memory that performs the "Rroster checks circuit" described above.

Since Mentors have direct access to shared memory they may send their assigned Variable space definition and other rights checks to an OS Mentor roster checks routine upon assuming a Mentor assignment. Since rights violations are rare, the Mentors may speculate on "no violations" and rely on check point software strategy.

The downside of this software approach as compared to the hardware circuit method is that it relies on shared memory thus may aggravate the "memory wall" problems.
The Use of Mentors in Register Machine Emulation As was previously mentioned, the emulation of a Host machine provides a route for porting Register machine based software. The "Host" mode in the processor may allow the results of two program runs using the identical system conditions to be compared, a setup that is very hard to obtain using "side by side machines" Host, on the one hand, and systems as described herein, on the other hand.

Assuming that the Host emulator has been properly certified as would be the case for a new version of the native Host core, comparing program run that show incompatible results helps isolate whether the code porting problems are in the program, compiler or the basic model that the program is based on (mathematical, economic, etc.). The runs, for example may point out problems in the HLL code models. The current code may have "good enough accuracy"; however the program may fail the bounds check and other software robustness criteria. Please review the Simple Relaxation Algorithm section for an example.

Returning to FIG. 13, in embodiments described herein, any of the LUs may be assigned control top level Instruction Interpreter(s). The Instruction Interpreter may convert the machine language code to the intermediate Dynamic VLIW code. The Dynamic VLIW may then executed by the Dynamic VLIW control layer in FIG. 13. Now assume the current top box in FIG. 13 is the "Host" Language Unit emulating an existing register RISC "Host" instruction set.

In order to perform the assignment, the "Host LU" requests and receives from the Resource Allocation circuit (whose function, as stated, is similar to the memory page allocation circuit in virtual memory based machines), the assignment of four or five Mentor circuits and four or five corresponding Bins.

One Mentor circuit and the corresponding 512 words Bin (32×16) is assigned to operate in single Variable mode and handle the emulation of the 32 machine resisters. If the Host has two sets of registers, one for fixed and one for floating point registers as is the case with the IBM POWER, two Mentor circuits with the two corresponding 512 words Bins are assigned to emulate the two sets of registers.

Next, three additional Mentor+Bin pairs operate in dimensioned Variable mode and are assigned the task of instruction cache, data cache and shared data cache respectively. The three Mentor circuits, when serving those dimensioned Variables, operate the Variable's Bin content using sixteen, 64 word Frames/Bins data sections, and thus they are allocated a 1024 words Bin each.

If the three spaces are kept separate in main memory of the Host programs, bounds checks may be performed. If the spaces in main memory mingles all three (the typical case) the three are defined as the full memory size and the intrusion bounds check mechanism may be turned mute.

The Mentors of the data cache Variable and the instruction cache Variable operate in Bin data segments and are typically updated in the Bins only to minimize Memory traffic Bin segment content. "Write through" to memory may be delayed as long as practical and is done only if the segment has been altered by the program and/or is re assigned to handle another memory location and/or program operation is terminated.

The shared memory is used to memory space that interacts among processors is semaphore space it is used by the Mentors handling shared memory. Regarding this space the Mentors operate in immediate memory write through (semaphore) mode. As soon as a new result in the Bin is no longer under speculative condition the "memory write through" is performed. If the emulation includes the rarely used vector instructions, an additional Mentor/Bin may be included to emulate the vector registers functions.

Despite the fact that the "Mentor+Bin" set which are assigned to emulate the registers are capable of writing into memory, the Host emulation does not allow writing into memory as the content of "emulated registers" in the Host machine typically do not have a corresponding Main Memory location (the PSDW does not include register content). All register to memory or memory to register operations are therefore done by transferring operand from the register Bin to the data cache Bin or shared memory Bins for the memory write operations. Similarly, memory reads are done through transfers from the data cache Bin(s) and shared memory Bin(s) to the register Bin(s).

Parallel Operation Using Multiple Language Unit (LU) Sets

In various embodiments described herein, the data structure employs 8 words block operations under a single program thread control. Through a somewhat more complex design of the interconnect crossbars, the crossbars may operate either as a single processor hardware thread as previously discussed, or as 8 processors, i.e., 8 hardware processing threads. Each separate hardware thread may be logically connected to one unit out of the sets of 8 Language Units. The system, in this operation mode uses 8 Host LU's or 8 DONA LUs. Each "hardware thread" is controlled by a pair of Language Unit+Dynamic VLIW program control section.

Implementation of a data structure including the 8 "hardware threads" option may involve somewhat more complex Bins to Functional Units and Functional Units to/from Bins two layer crossbars, the two crossbars (alignment crossbars and the transfer crossbars) may need to switch positions. The Bins to/from Main Memory design need not change as cache to/from memory transactions are done in blocks.

Bounds Protection System Wise

Bound protection per Variable provided by the Mentor circuits may be effective as long as the Mentors covering the Variables are active, however once a Variable's Mentor is dormant and specifically the Mentor has not been reserved to serve a "conscious dormant thread" the mechanism no longer protect the Variable's space.

Embodiments as described herein allow for the hierarchical definition of Variables such that the whole working memory space of a program, containing program and data are also defined as a Variable, so that the entire program space is protected when parts may be dormant. In this case some Variables may be covered by more than one Mentor Circuit. One Mentor for example is covering array "A" and another covering all the Variables in a program including array "A".

The complete system solution lies in the proper integration of the "fine feature" Variable bounds protection capabilities provided by the Mentors (including when applicable the Mentor roster circuits) in the architecture combined with the "coarse feature" page protection presently afforded through the Virtual page management systems.

The system may synchronize the Mentor protection with page protection operation such that elements that are dormant in the VMF system are also co-located in pages on the hard drive (or other secondary storage and transfer of pages from permanent to dynamic storage). Page swap is a good time to check the credentials of the requestor and verify security and credentials before dormant Variables are reconstituted to the active state.

Dynamic VLIW Control Section
Dynamic VLIW Control Word Model

As used herein, the term "Dynamic VLIW" may be used in the same context as "microprogramming" was used in the architecture of the SEL 32/55. A Dynamic VLIW word either generated by the Instruction Interpreter section (Dynamic) or previously compiled for a specific function is used in managing all the control activity over data structure during one cycle. Each Dynamic VLIW word may control activities on behalf of one or more machine language instructions, and the actions pertaining to each machine language instruction are typically found in two or more VLIW words.

In typical deployments of VLIW techniques, the VLIW directly controls all elements of the data structure. In embodiments described herein, the Dynamic VLIW does directly control some elements (like FUs), nevertheless in some embodiments, most elements including the Frames and crossbar interconnects are controlled indirectly. The Dynamic VLIW control may issue commands in terms of logical Channels and logical Bin operands to the Mentor circuits. The Mentor circuits may translate the logical Variable addresses to physical Frame addresses and with the cooperation of crossbar control logic the Dynamic VLIW command information is translated to crossbar configurations.

It is recognized that there are many methods for implementing pipeline control other than the Dynamic VLIW control method described herein. Furthermore all control design methods may benefit from architecture approaches described elsewhere herein, such as the use of the Mentors, Frames, Bins or crossbars interconnects. A big advantage of the method described herein is its applicability to spare parts replacement strategies thus enabling large footprint device at low cost. Most other design techniques tend to place distributed, typically small complex "one of a kind" control circuits throughout the design.

Dynamic VLIW Instruction Format

Figure 19:
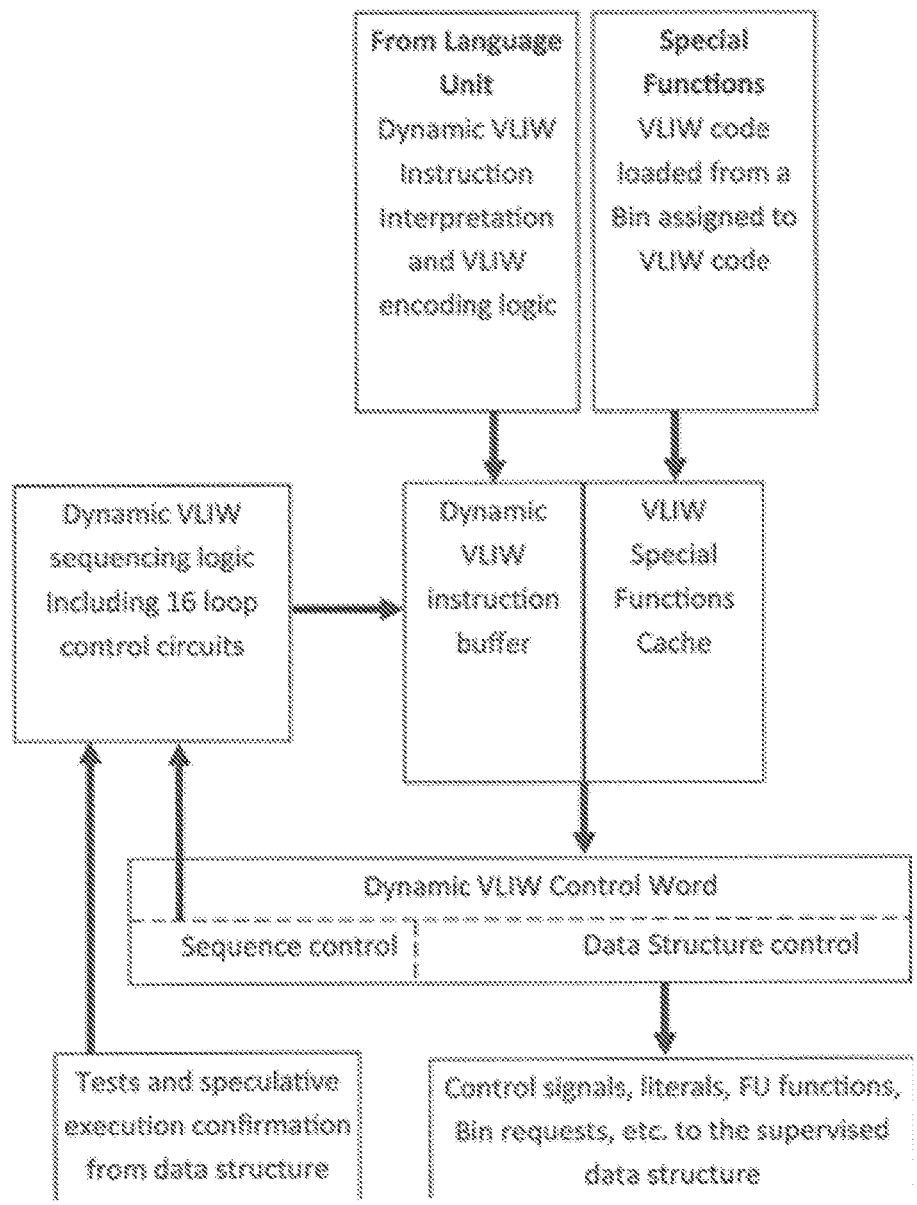
FIG. 19 is a block diagram illustrating dynamic VLIW control.

The Dynamic VLIW instruction flow as seen in FIG. 19 may come from different sources (1) the DONA instruction-decoder/Dynamic VLIW-coder circuit residing in the DONA LU, (2) Host instruction-decoder/Dynamic VLIW-coder circuits residing in the Host LU and (3) from the VLIW cache. The VLIW cache may be used to house functions (sine, cosine, I/O interrupt, etc.) coded in the VLIW format as well as language interpreters (Java, C++, etc.).

The systems bring up may use the "Host" decoder/Dynamic VLIW-coder to transport existing software to the processor described herein. Host programs may be however limited by their register architecture concepts. Programs compiled to DONA are able to take advantage of the full range of error and malware protection tools larger parallel performance scope, conscious thread techniques and debug support tools.

Figure 20:
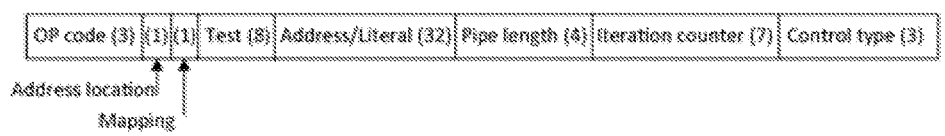
FIG. 20 illustrates a VLIW instruction format with sequence control.
Figure 21:
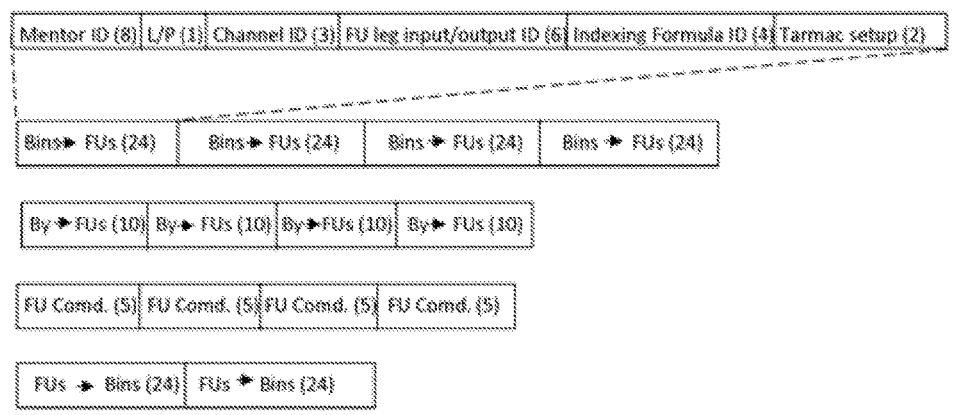
FIG. 21 illustrates data structure control of VLIW type 0000.

The VLIW instruction words contain two parts, the VLIW Sequence control (FIG. 20) and the data-structure control (FIG. 21). The data-structure control contains literals and control signals for managing the underlying, pipelined data structure.

The VLIW Sequence Control Section

Consider the sequence control basic control format type "000" in FIG. 20 it contains the following fields:

(1) OP-Code: A 3 bit op-code responsible for choosing the next VLIW instruction address.

This VLIW sequence control does not have an instruction counter; each VLIW contains the address of the following VLIW(s). In the VLIW program, the address of the next VLIW the LSB is "0". Each VLIW word contains branch test information that, if the test turns true, the LSB is modified to "1". Thus, VLIW words accommodate condition tests each cycle, without slowing the VLIW program flow. For a VLIW that uses the address/literal field as a literal, the next VLIW address is present address+2.

OP Codes

OP code (000) is the "normal" VLIW operation. The address section contains an even address in the VLIW cache. The next VLIW instruction to be fetched is the one at the even address when the Test condition in the VLIW's test field is false (not taken), or the following (odd address) VLIW instruction if the VLIW Test condition is true.

In addition to the Test condition that modifies the least significant bit of the address, there are 16 VLIW addresses that are chosen by the Test logic hardware in order to handle exceptions. If any of the exceptions occur, the VLIW Sequence control (or decoder/VLIW-coder) stops initiating new operations into the pipeline, and allows the VLIW program to bring outstanding operations already in the pipeline to conclusion. Following completion of outstanding operations the flow control proceeds to one of 16 exception locations in the VLIW program, a location selected by the event that triggered the exception logic.

The choice of which conditions participate and gets selected by the Test field and which conditions may cause any of the 16 exceptions is a design implementation choice, based on the target (DONA instruction, Host instruction, Function, etc.) as well as the architecture of Main memory (a virtual page fault, for example, may cause such an exception).

The handling of the special and exception conditions is typically idiosyncratic and specific to definition and handling of zero, overflow, underflow and the handling of privileged instructions virtual memory and I/O architectures. Normally, the first exception discovered is the one reported and any following exceptions are ignored, but that is not always the case. The good news is the number of parameters involved is relatively small, usually just bits including underflow, overflow, condition codes (or DO/ALL loop setup in DONA), page fault and few PSDW bits. The specific logic mapping may be handled by logic or a relatively small ROM table.

OP code (001). This op code operates the same way as OP code (000), with the exception that Address/literal field is used to provide a literal operand to the functional unit(s). In OP code (001) the next VLIW address is present address+2. The reason for this field sharing is that literal operands are typically used in setting up a highly iterative operation, but seldom appear in the inner microcode loops. Thus, this field sharing should have a negligent effect on performance.

OP code (010) is a decode jump (also called scatter jump) where the lower 6 bits of the address come from a data field in the underlying data structure. The VLIW program may jump to one of 64 locations. The jump base location is given by the Address field. The Test field selects the specific source of the six bit Test field. Thus, in this case, Test condition selects a scatter jump field and may also select a test condition.

OP codes (011 and 100) are subroutines call and subroutine return, respectively. These VLIW level calls and returns and may be used for example, for microprogramming interpreter routines (Java, C++, etc.) and Dynamic VLIW complex Functions.

Op codes (101-111). The rest of the sequencing control op codes are reserved for hardware error isolation, specific to the manufacturing and test process and for future use.

(2) Address Location: A 1 bit field that specifies that the branch address (in the Address field) is an address within the VLIW cache, or that it is a machine language program address. Some exceptions and I/O interrupt conditions are first handled by the Dynamic VLIW cache that sorts out the issue and control is then transferred to a machine language program.

(3) Mapping Bit: The Mapping Bit is used in emulating a current Register based ILP "Host", where high use sections (innermost loops, etc.) may be converted by special software to VLIW Functions and program flow mapped to VLIW flow.

(4) Test Field: The Test Field is an 8 bit field that selects one of many conditions under which the program should perform a VLIW program branch. A branch may be caused by an overflow, underflow, an addressing fault, or end-of-loop conditions sent from one of the 16 Index counters. As noted the condition modifies the LSB of the next address from 0 to 1 as each VLIW word contains a branch option.

The Test conditions may simply select a single hardware logic line or may participate in a logically compound circuit. The logic circuit for compound conditions is a specialized circuit fitting the Host or DONA machine instruction set, PSDW (Program Status Double Word), and condition codes. A compound condition would be used where multiple functional units in the pipeline may indicate underflow or overflow. Outcomes of some tests are machine idiosyncratic. For example, the architecture may require that an overflow resulting from a division by zero is set results to zero. The specific LU logic circuit used in instruction decodes/Dynamic VLIW code has special logic or ROM circuits to implement those specific functions.

Additionally as stated, the test field may be used to simultaneously test for some conditions and specify the location of a scatter jump field. Therefore the test field logic is implementation dependent, and its support circuitry may be composed of a small ROM table or just combinatorial logic.

(5) Address Field: This field is typically used to determine the address for the next Dynamic VLIW word, whether it is in the VLIW cache, in buffer memory or in Main Memory. The field's size is 32 bits or larger as dictated by the size of the of the DONA or "Host" program address within a virtual memory page. In case of a jump whose address is the original machine language format, the content of the field is added to the program base address or concatenated to the program page address in order to form a virtual memory address. The choice to add or concatenate is dictated by the virtual memory system architecture. For OP code (001), this field is used as a source of a literal to be sent to a Bin or functional unit as an operand.

(6) Outstanding Pipeline Length: This 4 bit number specifies the largest length of pipelined operation activated by this VLIW word. This field size is increased if the design includes functional units whose pipeline control cycle length is larger than 16. This number is used by the VLIW Sequence control for knowing when speculative condition has been verified. In a miss prediction case the flow control typically directs the VLIW program to continue until it concludes all outstanding actions already in the pipeline, but without issuing new operations.

(7) Iteration Counter Control. This 6 bit field, including additional logic is used for manipulating the current (innermost) iteration counter and in order to repeat the execution of full loop sequences in Dynamic VLIW code. This feature is used for extending the instruction interpreter's scope from "words" to "sentences" i.e. from "comprehending" one instruction at a time to "comprehending" a full inner loop or a program section. For efficient operations, programs, specifically the inner loop routines are interpreted as a program section or "program sentence" rather than looking only at the flow of individual instructions. A simple energy and time saving advantage is that once the innermost loop has been efficiently interpreted (including Conditional Branch's preferred directions are accounted for and the loop is fully Dynamic VLIW coded) the instructions interpretation process may be turned off until loop completion.

Stated differently, the LU may prepare an optimized Dynamic VLIW sequence for an inner loop and enter it once into the VLIW buffer. The LU therefore may do a complete inner loop coding before the onset of the inner loops for inner loops that do not containing branches or it may do so for inner loops containing branches after a few iterations or after performing a "dry run" that determines the (prediction) bias of the conditional branches inside the loop, as the expected speculative branch direction significantly influences the command fields selection in the VLIWs of the VLIW coded loop.

Once the inner loop is loaded into the VLIW buffer (optionally including several VLIW words past loop completion for "priming" following VLIW sequence), the LU may ceases to decode the program until the loop is terminated.

The DONA machine language uses LOOP END instead of Conditional Branch instruction to terminate enumerated loops (loops controlled by an Index, i.e. DO or FOR and ALL loops using Indices to terminate loop operation). The DONA LU may distinguish immutable from mutable program sections (See Simple Relaxation sections) and make the DONA LU coding of VLIW inner loop program a new and attractive feature of the DONA program operation. (In present ILP machines loop iteration typically uses speculation based Conditional Branch instructions, a process which interferes with installing bounds checks.)

Loop Iteration Counter Codes
"000000" No iteration counter activity.
"01AAAA" This Dynamic VLIW sequence should be repeated by the count given in Index AAAA. This feature is typically used in priming sequences for functional units with a long pipeline where the same VLIW line needs to be repeated several times. (ALL i=0, K; (A(i)*B(i)+C(i); END ALL; using a 5 stage MPY FU requires 5 MPY priming cycles prior to using the bypass from the MPY to the ADD FU for entering the full operation using both ADD and MPY.)
"100000" End of Dynamic VLIW loop iterations controlled by this Index.
"1XXXXX" Other functions that will be defined as part of the implementation.

The buffered Dynamic VLIW may include one inner loop or a set of multiple loop levels. There is a tradeoff which includes Dynamic VLIW buffer size, the size of the loop's code, the length of setup time and LU sophistication versus the higher compute per cycle efficiency achieved when the Dynamic VLIW is configured for maximum compute performed per iteration cycle. The tradeoff in each particular implementation may be made by the LU based on the Index value, i.e. the number of expected loop iterations.

(8) Control Type. This 3 bit field determines the data structure type that is associated with the VLIW, as explained next in the Data Structure Control Section. This 3 bit field is used to differentiate between (a) normal data structure control activity and (b) activity that sets up the mentor circuits and loads them with a particular Variable's parameters, including memory location, type of variable, operand size, and array dimensions. This activity also manages the virtual Bins. When the number of Variables in the program exceeds 48, physical Mentor circuits need to be reassigned. The content and format of the data structure control word section (FIG. 21) will differ based on the control activity type.

Data Structure Control Section
Control Activity "000".

The standard control activity and its associated data format are shown in FIG. 21. This activity applies to the transfer of operands to the functional units from the Bins and bypaths, the setup of tarmac registers, the instructions to the FUs, and the setup of paths for results returned to the Bins. All data transfer activities in the data structure are done in terms of 8 words or less as indicated by the controls. A maximum of four sets of 8 FUs may be activated by a single command word.

Per FIG. 21, the amount of data structure activity per cycle is comprised of (1) zero to four Bins to FUs transfers, (2) zero to four Bypaths to FUs transfers, (3) zero to four FU commands, and (4) zero to two FUs to Bins transfers.

(1) The format for: Bins to FUs is a 24 bit control field whose details were given in FIG. 16.
(2) The format for: Bypaths to FUs transfers. This is a 10 bit field where four bits specify the source bypath or the input tarmac (at this leg) and six bits specify the FU that is to receive the transfer. Note, bypaths are connecting within a group of FUs where the groups are for example; floating point, fixed point and byte stream operations.
(3) The format for: FU commands, this is a 5 bit field. MSB="0" is a standard FU command (ADD, SUB in an adder, AND, OR EXOR in an FU, etc.). For a single input FU (shift for example), the second leg receiving operand through a literal or tarmac register provides the amount of shift.
(4) The form of FUs to Bins transfers is the same 24 bit form as the Bins to FUs transfers.

Control Activity Type 001.
Same format as 000 while using field sharing. Only a single "Bins to FUs" channel specified and the rest of the command fields contain a literal operand. Note that the results return channels are available as they will typically contain "return flight traffic" of on-going machine language instructions where the operands were sent to the FUs by previously issued VLIW(s).

Control Activity "010". This Control Activity Transfers Indexing Formula to Mentors.

Different than present processors where the machine language code has only one destination through which the Instructions Interpreter manipulates the data structure, the DONA code has three different types of DONA code segments.

The first type of code segment is (1) the DONA algorithmic code, which is using Variable names instead of memory and register addresses. The code, when converted to VLIW of format 000 and 001 above will directly manipulate the data structure. The VLIW code is typically executed few cycles after being encoded by the LU.

The second and third types of codes are codes destined to (2) configure the Mentors and (3) supply Indexing formulas to the Mentors. The Mentors are the destination of two types of code segments containing Variable definition (see FIG. 17 and FIG. 18) and Indexing Formulas. The Indexing Formulas code segments are described in the following sections.

There are two methods to consider for handling the transfer of the Variable definition and Indexing Formulas to the mentors. The first method is to place the information in the VLIW in a format dedicated for this transfer task and few cycles later transfer the information from the VLIW to the mentors. The second method is to leave the information in the DONA machine language code file and few cycles later, arrange a transfer from the DONA code file to the appropriate Mentors. It may be a design choice in particular implementations which method to use.

For strictly DONA instruction interpretation the second method looks preferable as it is simpler and more compact, one need not provide space in the VLIW for ferrying the Variable definition and Indexing Formulas.

However, a key route for incorporating new capabilities is to enable the use of the new concepts first as VLIW coded functions. The role and use of those Functions can be field tested by the user community before their official incorporation in machine language and especially in compatibility to the HLLs be they C++, Java, FORTRAN or other languages. In order to take this route a better fit is to allow placement of the Indexing Formulas as part of the VLIW code, so the discussion below explains this particular VLIW format.

In Control activity "010", the content of the control section, with exception of the (FU=>Bin transfers) "return flights, results" controls contains the indexing formulas sent to the Mentors. The Indexing Formula format is given in the parts describing DONA.

Control Activity Type 011:

Routine Variable Initiation. This control line typically appears at the onset of a routine and points to a list of new Variables as well as constants that need to be assigned to Mentor circuits in order for the routine to become operational. The VLIW control word contains the Bin which includes the Initiation table and the location of the table inside the Bin. The Bin may be the Program Bin or another Bin specifically assigned by the compiler or OS for this function. The table contains the memory base addresses and size of all new variables to be initiated by this routine. The Dynamic VLIW program flow control circuit (FIG. 19, FIG. 13) will read the table information and request Mentor assignment of Mentors to activate the Variables. Once the Mentors are allocated the table information plus the Mentor and Bin resources assigned to them may be later converted to Virtual Mentor Files (VMF) to be loaded into the VMF stack if the Variable is turned dormant. Following the Variables' activation the operations the routine is commenced.

When LRU methods are used for resource allocation Mentors may be turned dormant, the LRU algorithm should retain all recent routine table activation addresses such that the reactivation of a routine is done in a few cycles as both the previously used Mentors and the VMF is already on file. Control Type (1XX).

The additional formats are reserved for future uses which includes the formation of high speed I/O communications setups for processor teams.

VLIW Instruction Issue Control Circuit Design

Figure 22:
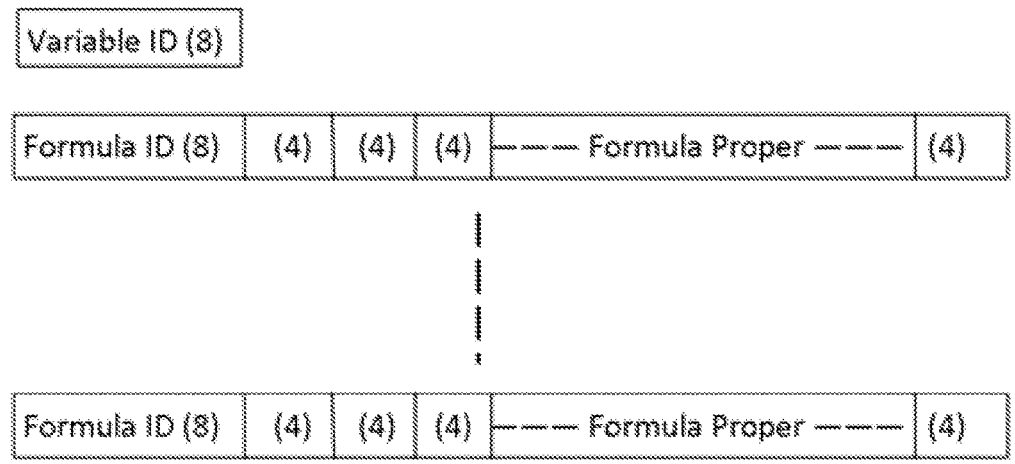
FIG. 22 is a block diagram for an implementation of a Dynamic VLIW instruction issue circuit.

FIG. 22 is a block diagram example of the combined operation of a Language Unit (LU) and the Dynamic VLIW Flow control and instruction issue circuit.

VLIW Control Circuit Logical Flow

Starting from the top of FIG. 22, machine language program flow comes from the Program Bin. In conjunction with information from the program status double word (PSDW) the aligning logic circuit breaks the flow into individual machine language instructions (Host machine language) or Ops and Variables list in DONA.

Individual instructions plus branch prediction information for branch instruction(s) is placed into four queues in an equivalent form to a four instructions per cycle issue ILP. The priority among the queues is roving, such that the queue with the longest time in the queue has the highest priority. Additional considerations, instructions with a long pipeline (outstanding completion) should preferably not place in the same queue of instructions that they may interfere with their out of order issue.

Each cycle, instructions in the queues verify that the operand information in the Bin (DONA) or in the Bin assigned to the Register the instruction uses (Host) is present or will be available at VLIW issue time. If there is no conflict in operand availability or no other conflict imposed by higher priority queue, the interpreted instruction is placed in the outgoing VLIW and the outstanding operation of the instruction (store the results) is placed in the outstanding (return) operation section in a VLIW N cycles later. N is the pipeline delay associated with the FU performing the operation initiated by the just issued VLIW. The Issued Dynamic VLIW control words are placed in a VLIW circular file such that once an inner loop (or other iterative program section) is placed in the Dynamic VLIW circular file the control may cease instructions interpretation as the iterative section is fully placed in the Dynamic VLIW buffer.

The instruction decode of the queue may be implemented by a fast memory, typically ROM whose inputs are the OP code section of the instruction plus some PSDW and other information (branch prediction; honor/ignore underflow/ overflow, etc.).

The Dynamic VLIW instruction stream may come from the instruction interpretation logic (FIG. 16) or Dynamic VLIW cache preloaded from a software compiled VLIW program Function, where the Function is compiled directly into VLIW as a method of defining new functions or speeding up particular inner loops or developing and testing VLIW encoding methods prior to implementation of those methods in next generation versions of computing device design.

In some embodiments, a design implements VLIW techniques in the context of Mentors and of dual control levels. Specifically the Dynamic VLIW does not directly control the data structure but is used to direct the Mentors.

In some embodiments, conversion of repetitive loops to VLIW format dynamically form machine language and then using the (optimized) Dynamic VLIW code to run the iterative section of the program.

The method described in FIG. 22 fits mostly for the "Host LU" and existing four-instructions-per-cycle interpretation technology. We expect that the DONA LU may start this way but the LU section will quickly evolve to a different form as powerful linguistic forms and associated terms are introduced to the instruction set. Following sections further discussed "plural form" in lieu of "N times singular". Consider the US declaration of independence starting with "We the people . . . ", the prevailing present "N times singular" approach requires "We the people" to be translated to a list of people by name, state place of residence, or other means.

Presently machine languages might in a sense be thought of as in the "baby talk" era; no plurals, no pronouns. Translate JFKs speech "Ask not what your country can do for your . . . " to baby-talk and you come up with a gobbledygook like "Jimmy should not ask what Sara, and Becky, and Billy and . . . ."

This is not advocating matching machine language to human language, which is a different field concerned with screen display, "who owns the screen", voice recognition, and other technologies as well as being engaged in battles of wills between ways customers wants tasks done and ways the (software, service) suppliers want tasks done.

While computers have been named many times "thinking machines", they are nothing of the kind. Watch a cat recognize strange movements and you will surely recognize a period where the tail is twitching and the cat is "thinking" prior to "acting" on this information. Computers are nothing of the kind, they do not "think", they only "act" according to the prescribed algorithms. Once someone will define the relations between "thinking" and technical devices that performs "thinking" we will engage in a different field of engineering.

There are many critical aspects of human communication, especially in the social and political areas that relies on vagueness, exaggerations, lies, incoherency and even acting obtuse.

Meanwhile, as we are implementing "acting machines" there are hosts of linguistic concepts that should be added to the computer machine language, enabling computers to better do their current and their new "acting" jobs. Vagueness, lies, exudations, incoherency and acting obtuse certainly do not belong into the new machine language dictionary. However concepts like; plural, pronoun, class, inheritance, polymorphisms, etc. do belong there. For an interesting example, the architecture defined herein might need to deal with US 14$^{th}$ amendment type of issue (in security), as "Infinite Variables" are not "native born" in the processor's memory.

The "language Wall" might be a bigger problem than the "memory Wall", "power Wall", and "IPL Wall". In this architecture, the Language Unit (LU) is specifically separated from the Dynamic VLIW Flow control in order to be able to upgrade the LU with minimal disturbance to the rest of the hardware structures.

As stated the instruction interpretation flow depicted in FIG. 22 fits the present (Host) instruction interpretation methodology and probably will do the initial job for DONA. However significantly better performance is expected from LU designs that take advantage of plural and other language features to interpret entire code sections. For example in optimizing (into VLIW code) loop iterations once instead of repeatedly re interpreting the same instructions set in each loop cycle.

DONA Instruction Set Architecture

Two examples are described herein and demonstrate the need for including the concepts of "plural" in machine language. The examples are the use of ALL instead of DO when loop index is strictly used for enumeration and the use of IMMUTABLE (see Simple Relaxation Algorithm) to define revision control.

The architecture defined herein takes advantage of the native micro-parallelism of many algorithms. Presently this native micro parallelism is blocked through two related mechanisms, the first is the serialization typically imposed by compiling into register architectures code where all array elements participating in the loop's operation must pass through a single machine Register. The second is the lack of "plural form" in computer HLLs. In analogy to English, HLLs use the "N-times-singular" form to deal with plural subjects. The plural form of "Company! About-face!" is stated as: "DO I=1, 120; Soldier (I) About-face; END DO. The intent of whether the soldiers should turnabout simultaneously or turnabout one after the other (wave) is obscured.

A linguistically powerful machine language may add to performance, robustness and may call for sophisticated instruction interpretation methods. The machine language improvements that are included in this disclosure (ALL, IMMUTABLE, MARK-SEGUE, UNDO) are mainly handled by the compiler as well as additional DO and ALL opcodes that replace the loop end Conditional Branch Op Code, and use in loop termination based on index value. (MARK-SEGUE sets undo point for debug support.) This approach enables micro parallelism and avoids the addressing over-reach of the branch prediction mechanism that interferes with read bounds checks. The hardware address bound check may be provided by the Mentors.

A hardware design of the instructions interpretation that is using present techniques for 4 instructions interpretation per cycle is sufficient for the early versions of the hardware section of instruction interpretation, since most limitations in ILP machines are not due to parallel interpretation but to operand interlocks caused by the "Registers" namespace, specifically in DO I=1,N; A(I)<=B(I)+C(I); END DO; all members of arrays A, B, and C are paraded through three individual Registers assigned to A B and C. Some versions may use more sophisticated techniques that "comprehend" complete loops, small routines or routine code segments.

The Mapping Domain Consideration.

In some embodiments, the system uses the Variable namespace mapping. Variables may be given a logical ID in a 256 Variable namespace in a thread (This may be done totally independent of whether parallel multithreaded operation is used by the processor). At the next mapping level the mapping accommodates 256 threads in a "logical processor" namespace. Mapping of the namespaces to physical and logical memory pages may be done through a set of namespace tables. The numbers of variables per thread and number of threads were chosen for reasons of code compactness. Many namespace mapping methods may be used to implement different DONA formats including using existing memory system architecture, direct logical or physical memory addresses as Variable ID, despite the significantly larger code they require and other problems they pose.

The DONA Machine Language Formats

DONA code contains code sections in three types of different formats, two formats are used to set up the Mentors and the third has the same function as regular machine language code. The Variable definition example was given in FIG. 17 and FIG. 18, indexing formulas discussed below and the DONA algorithmic code proper discussed next. Having different forms for the DONA algorithmic code and the indexing formula is a design option taken here for producing compact DONA code.

Dona Indexing Formulas

Figure 23:
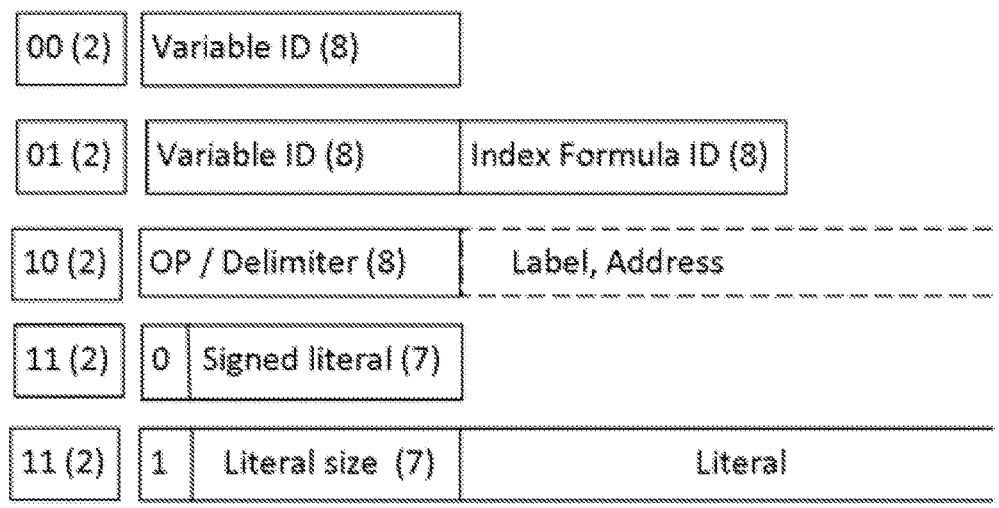
FIG. 23 illustrates an example of a DONA indexing formula.

FIG. 23 illustrates an example of a DONA indexing formula. Operand indices are based on addressing formula using the values of constants, Variables and loop indices.

Examples of use are formulas such as (i+1,j), (i*2), C(i−2,j+2,k). The addressing formulas and their IDs are typically sent to the Mentor prior to loop onset.

Consider the following example:

$$AB(i,j)<=(A(i,j-1)+A(i-1,j)+A(i+1,j)+A(i,j+1))*0.25$$

The first step is converting this expression into DONA indexing format for the four indexing formulas corresponding to:

$$(i,j-1), (i-1,j), (i+1,j) \text{ and } (i,j+1)$$

During operation, the assignment formula to a Mentor is done by sending to the Mentor responsible for the variable "A" the following expression which defines formulas 7, 8, 9 and 10:

0,1-=>7; 1-,0=>8; 1+;0=>9; 0,1+=>10;

The indexing formula is coded in a modified Reverse Polish notation statement including the operators "+", "−", "*", "=>" and ",".

The DONA algorithmic statement for the expression, in a different form of modified Reverse Polish notation, is changed from:

$$A1(i,j) <= (A(i,j-1) + A(i-1,j) + A(i+1,j) + A(i,j+1)) * 0.25$$

To:

$$A1 <= A_7 A_8 + A_9 + A_{10} + 0.25*$$

The algorithmic statement and the indexing formulas while both using Reverse Polish use different formats and character sizes. The Indexing formulas use a 4 bit character set and the format is described below. The algorithmic statements use 10 bit characters and are defined later. The main reason for the differences is character size and that the Indexing formulas are used in a context dependent format relative to the current values of loop indices. This type of implementation is not a requirement of the architecture, just an implementation approach.

DONA format for Indexing formulas consists of four bits characters. Different than the norm in programs, the indexing formulas are context dependent in that they are relative to the current loop nesting level.

If a Variable operand is using the nominal indexing case for example A(i,j,k), no indexing formula is needed as the Variable's operand address is determined according to the indices of the nested loop and the Variable's parameters (operand size, dimensions and base address). Index level "0" assumes the innermost loop index, the second index level "1", etc.

In case of an expression like: B (i,j)<=A (i,j)−A (j,i); The Variable operands for B (i,j) and A (i,j) are simply addressed by the Variable name "A" and "B". A (j,i) however is not the nominal form and does need an Indexing formula. In the Indexing formula for A (j,i) the Index characters 0101 and 0110 are used to indicate respectively a one higher and one lower index layer than that of the nominal index level case.

The operand addressing is based on the nominal case (i,j,k) indices where "i" is the innermost loop (index "0"), j is next (inclosing) loop index "1", etc. One formula is possible for each Variable dimension.

Consider the Simple Relaxation equation;

$$A1(i,j) <= (A(i,j-1) + A(i-1,j) + A(i+1,j) + A(i,j+1)) * 0.25$$

Note that "i" refers to the current innermost loop counter value and "j" to the next (outer) loop value. Absence of entries implies the use of index values unmodified.

The Indexing formulas for (i,j−1), (i−1,j), (i+1,j), and (i,j+1) sent to Mentor A (17) as Mentor Formulas 6, 7, 8 and 9. Note A1(i,j) does not need an Indexing formula as it is the nominal case. In a shorthand notation the formulas are posed as:

17 '6', '−1'; '7'−1','; '8'+1 ','; '9', '+1'; '

The DONA format for indexing formulas is: Variable ID (8 bits) followed by a set of Formula IDs (8 bits) followed by the formula proper in 4 bit characters (nibbles).

Continuing the above example the Mentor of Variable 17 is sent four formulas.

| | |
|---|---|
| i,j−1. | Formula 6. |
| i−1,j. | Formula 7. |
| j+1,i. | Formula 8. |
| i,j+1. | Formula 9. |

In binary form:

| | |
|---|---|
| 00010001 | 17 |
| 00000110 0000 0010 1001 1111 | '6', '−1 ';' |
| 00000111 0010 1001 0000 1111 | '7' −1 ', ';' |
| 00001001 0001 1001 0000 1111 | '8' +1 ', ';' |
| 00001010 0000 0001 1001 1111 | '9', '+1 '; |

As we have stated, this is an example of coding Index formulas and one can substitute many other code formatting variations.

DONA Main Algorithm Code

Figure 24:
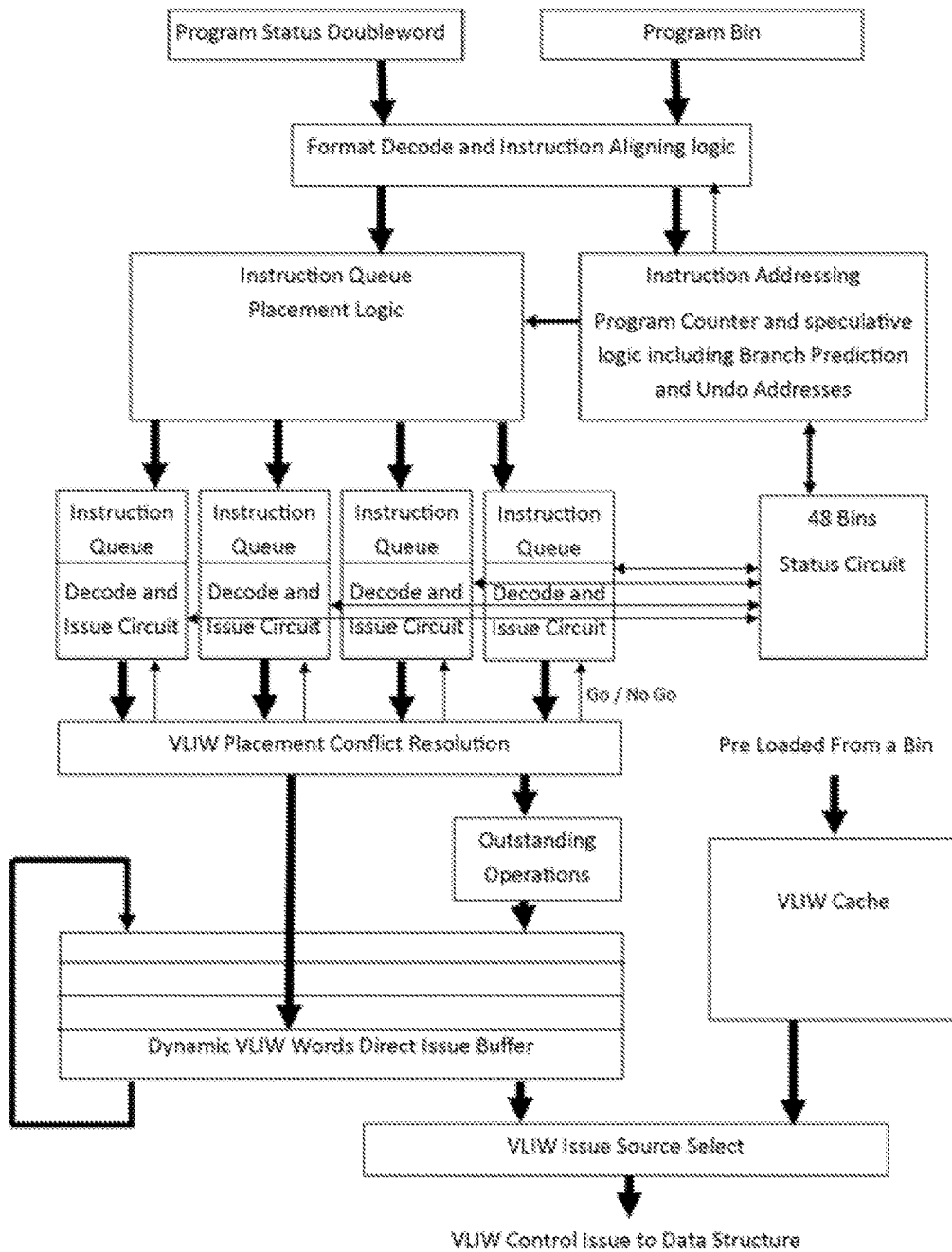
FIG. 24 illustrates an example of a DONA main algorithm code.

FIG. 24 illustrates an example of a DONA main algorithm code. The DONA algorithmic code will be more familiar to compiler writers than to machine designer as it is basically a reverse Polish notation of the algorithmic code using 10 bit characters. The 10 bit code characters contain a 2 bit definition and an 8 bit entry. For compatibility with word/byte memory architecture the code contains 5+ byte sections. The first byte contains four sets of 2 bit definition for the following four code entries.

"00" Variable ID, the code entry contains the logical ID of one of 256 Variables in a program thread and uses the nominal indexing.

"01" Variable ID followed by the ID of the Indexing formula ID for the Variable.

"10" OP code or Delimiter, the code entry contains either an op code like ADD, SUB, MPY, SHIFT, FADD, FMY, etc. or a code delimiter. In the code delimiter we include DO (FOR), IF, THEN, ELSE, END, ";", CALL, RETURN as well as IMMUTABLE and ALL. Note that the approach is not to try to minimize in machine language standard HLL concepts to simpler (or more simplistic) elements, since this subtracts relevant plural form information and information useful for security and robustness, we believe that making the processor smarter is well within technology reach and maximizing transfer of relevant information to the hardware is the right way to proceed for better software security and robustness. An OP code entry may be followed by label or labels denoting targets of branches or an address label (IF) of a parameter list (CALL). If the OP code requires a label or parameter(s) the OP code defines the size of the following label or parameter(s).

Character code "11" and a "0" in the MSB of the literal byte. A 7 bit literal whose value is +/−63.

Character code "11" and a "1" in the MSB of the literal byte. Indicating Long literal, the 7 bit entry denotes the number of bytes (N). The actual literal is in the following set of N bytes.

The use of Variable IDs and thus mapping, instead of memory addresses may make DONA code significantly more compact than register machine language code.

It is not so important whether one classifies a language expression as instruction (OP) or delimiter (CALL, DO, FOR, END, ";" "<=", etc.) where the delimiters are mainly imply context information rather than specific actions. What is important is how to transfer the relevant information to a processor and specifically design smarter processors that use the context information to overcome the "intellectual bottleneck . . . [of] . . . word-at-a-time thinking".

A Partial List of New Machine Language Elements.

DO (or FOR), IF, BEGIN, END, ALL, IMMUTABLE, MARK-SEGUE, UNDO. MARK-SEGUE and UNDO are used to enable the programmer to use the hardware undo mechanism used for branch prediction recovery to be used for other programmable "undo" reasons.

As a practical matter, the full list of new machine language element should be chosen in conjunction with the choice of: (1) "mapped ID approach and mapping strategy" or the "name=memory-address" approach. (2) The software migration route should select as a base. Our present candidates are interpreter languages (Java, C++, Visual C++, etc.) each forming a list of a well-organized and tested set "conceptual units" for the starting base. (3) The bit compatible versus functional route should be made for Host emulation. (4) The migration of the DONA route set should be augmented by key new elements of this computing device, like the VMF as well as the plurality support operators needed to demonstrate basic performance and operational characteristic of the new computing elements.

A software migration route from a C++ or similar interpreter does not necessitate that every instruction (primitive) must be implemented by a corresponding hardware (machine language) primitive, low use and complex instructions or data types may be implemented by microprogram and/or software routines that based on simpler primitives.

From product development point of view, the operative use of C++ or other intermediates language interpreter that deploys the Object Oriented discipline is very significant. The tasks of software migration and hardware development may be done in synchronous parallel with the hardware development (instead of serially).

This includes modifying the interpreter base to include new key features (VMF, plural micro-parallel expressions, etc.), modify key features (make "Object" match "Variable", etc.), as well as use the new base for providing the necessary test suite, OS and compilers.

The method also allows the hardware design to commence even if some of the more esoteric but not performance critical Op Codes are defined later in the project as their implementing codes are destined to stay either in software or microcode. An example may be the issue of resolving polymorphisms of strings and new security features in OS table setup for a basic mapped Variable ID schema chosen for the instruction set.

Special attention should be paid to hardware and microcode features that maximizes the local autonomy of the computing device and minimizes trips up and down through the operating system governing diarchy including interactions through shared memory spaces. An example of such a feature is the Mentor roster circuit presented herein.

For insight into the overwhelming size of this issue consider the DARPA 2008 report page 63:

As a historical context: the Cray XMP, the world's fastest supercomputer in 1983-1985, was a "balanced machine . . . ." This explains why the XMP would spend about 50% of its time moving data on a memory intensive code, but BG/L may spend 99% of its time moving data when executing the same code.

Thus, in comparing the IBM BG/L to the Cray XMP on equal footing of work per cycle the IBM POWER processors when used as in the BG/L "work team", the "work team" is only 2% efficient as compared to the work done by a single processor (Cray XMP). To restate the report, in order to keep 2 units effectively deployed doing the "end work" 98 additional units are deployed in administrative paperwork and data shuffle. This inefficiency is not a result of vector versus scalar instructions as both the CRAY XMP and the IBM POWER chip used in the IBM BG/L have vector capabilities.

Variable Names Based on Base Address and Other Mapping Options

As noted earlier in the presentation we chose to provide a presentation based on specific choice of system parameters, including a 256 namespace for Variables, 16 Indices 48 Mentors, 4K Frames etc. It must be however emphasized that this selection of method and numbers is done only to provide examples; an explanation without using specific numbers becomes vague and hard to follow.

The Variables namespace and number of Indices may be made larger or smaller depending on architecture implementation choices, for example a 4K Variable logical ID namespace size (instead of 256). One of the Variable logical ID choices is to (as normally is presently done) use the Variable's base address in memory as the Variable's ID, and for example use a 16 bit ID in an addressing structure that uses 64 K memory blocks, where a 32 bit memory full memory address contains a 16 bit LSB and 16 bit block address (MSB). The use of memory addresses as the Variable's label makes for a less compact program but may have some program advantages as it is the same as current architectures where the memory location (single Variable) or the Variables base location (dimensioned Variable) are also the Variables' label.

Additional Functional Units and Configurations

The Content Addressable Memory (CAM) Functional Unit

Embodiments described herein may provide a simple structure to integrate new functional units. The following is a description of a Functional Unit of a new type.

In various embodiments, a content-addressable memory ("CAM") functional unit may include some aspects not typically associated with a classical arithmetic/logic Functional unit.

1. The CAM unit like other memory structures is built out of a large number of identical structures thus the spare parts strategy is applicable to a single unit, only a single copy is sufficient to retain the yield and self-repair options.
2. While typical arithmetic/logical Functional Units are 64 bit wide, the CAM FU may be 256 bit wide.

Figure 25:
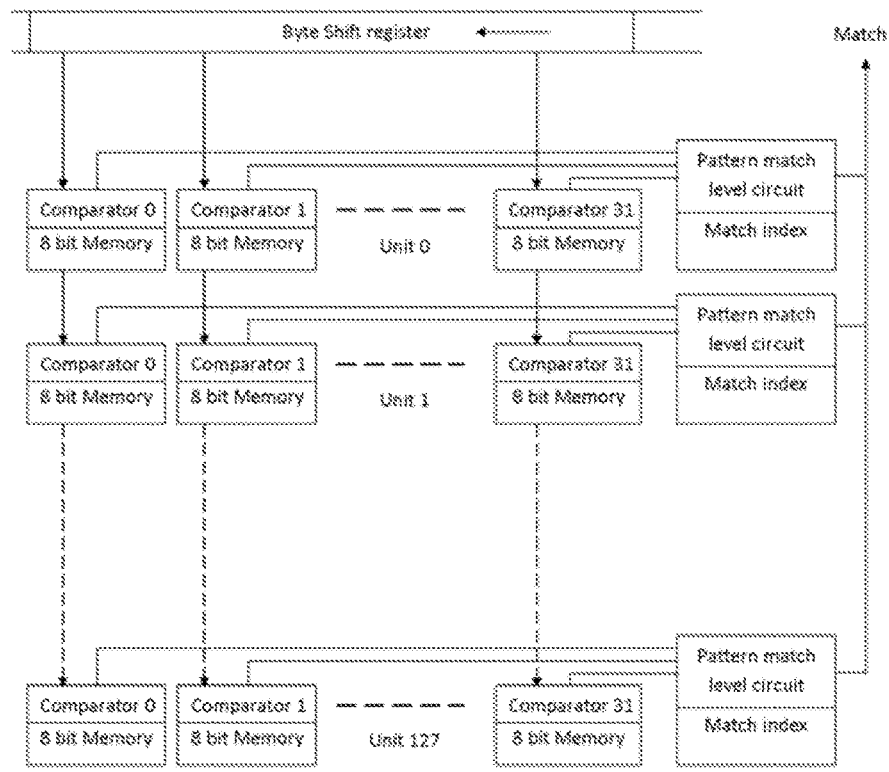
FIG. 25 illustrates a content-addressable memory functional unit.

FIG. 25 illustrates one embodiment of a CAM functional unit. The CAM Functional Unit (CAM-FU) in depicted in FIG. 23 is configured as an array of 32×128 elements where each element consists of a search pattern key (in bytes), comparators, and degree-of-match elements. The result of the comparison between the byte in the key and the scanned pattern (match/no-match) is sent to the key pattern degree-of-match element.

128 search keys are loaded with search keys (up to 32 characters) and degree-of-match levels. Degree-of-match "0" means that the key is not participating in the search. The degree-of-match setting is based on the number of character matches required for the circuit to raise the match flag. A match of 30/32 indicates that a match of at least 30 out of 32 bytes to the characters in the key. Similarly a match for the setting of 12/12 indicates a full match to a 12 characters key.

After the CAM-FU is set up with a set of search keys, the searched data byte stream is paraded in front of the CAM-FU searching for matches to the 32 character keys. An advantage of this design is that the degree-of-match per key can be adjusted such that in early stages of the search not only exact match can be detected but also close match can be included such that the search keys can be adjusted iteratively. For working with DNA codes the mechanism should allow 6 bit characters (DNA character) shift and 2 bit shifts (one base pair shift).

The size of 32×128 sensitivity adjusted CAM is just our first guess; experience should show what the most practical CAM dimensions are.

In the iterative adjustment of the keys, the system attempts to solve two problems (1) finding the location of pattern(s) in the stream and (2) finding how the pattern(s) are expressed.

In the CAM-FU example, a hardware FU circuit may perform in a single cycle an operation that might take several thousands of cycles when using standard arithmetic/logic primitives.

I/O

The following are examples of two different types of I/O interfaces that may be used in various embodiments.

First type: processor-to-memory I/O interface, where I/O devices interact with memory under the supervision of the BIOS program in the processor, similar to present machines. Second type: Mentor based "infinite Variable" I/O interfaces channels. The high speed I/O Mentor based interface, once initialized acts independently of the current algorithm during data transfers. The Mentors may supervise the high speed I/O channels during I/O transfers; the I/O FUs are responsible for operating the appropriate transfer protocol(s). Each I/O FU type is for example designed to conform to a Gigabit era high speed serial protocol or an instrumentation protocol and depending on the protocol may include physical provisions for interconnecting to fiberoptic line(s). The specific protocols currently included are Giga bit Internet, SONET and InfiniBand.

The proper inclusion of the "infinite Variable" types allows one to include processor to processor links via InfiniBand or Internet links and the crossbar switches to be part of the basic programming tools in a multiprocessor environment thus relieving the system from some of the "Memory Wall" problems created by the fact that processors presently may only cooperate through shared memory, since memory is the only "world" programmers may see through their current processor's namespace.

Using the Mentor based interfaces the data accessed through communications, point-to-point (InfiniBand, etc.) and instrumentation interfaces the I/O accessed information is part of the Variable space visible to the programmer and the high speed interfaces allow direct Bin-to-Bin and Bin-to-I/O transfers. Many system approaches are far better served both in computing and energy efficiency through direct, high speed, Bin-to-Bin information transfers, bypassing Main Memory altogether as well as having communications and instrumentation as well as main memory part of the processor's recognized operative space (for example, a Variable somewhere in the "cloud" is part of your processor's namespace).

There are presently several technologies for serially encoded, high speed I/O interfaces, close range InfiniBand, and long range fiber optic WDM Wave Division Multiplexing, DWDM Dense Wave Division Multiplexing, SONET and Ethernet InfiniBand is a common lower cost interface, but may be limited to short physical distances for chip-to-chip interactions.

The high speed interconnect operations are done by logically connecting the I/O channels through the interconnect matrix to the appropriate Bins. The Bin to/from high speed I/O channel connection through the crossbars stays in place for the duration of channel data transfer, this operational form is different than arithmetic and logic Functional Units operations that may rearrange crossbar connectivity each cycle by the Dynamic VLIW control.

During high speed interconnect operation the appropriate Bin(s) are reserved for exclusive interconnect use for the duration of the operation. The high speed interfaces allow data chaining and command chaining.

Clock Synchronization

In some embodiments, processor groups may deploy a de journal clock synchronization used in SONET telecommunications. Clocks are not synchronized to a master clock on each clock tick, a difficult task in a computer room and impossible across multiple, physically separated systems. Instead, the clock circuits in each physical subsystem (cards or racks) may use the telecommunication SONET standards and telecommunication industry clock design approach with the same or different de journal parameters, where the processor's clock frequency based on synchronization points has to be adjusted to meet the tolerance of a small credit/debit range in clock ticks per day. This approach ensures that the clock circuits agree in number of clocks emitted over a given time durations (millisecond, second, minute hour, etc.,) the parameters that are chosen by the integrated system design.

This technique provides a guaranty that, in workgroups, one processor is not leading or lagging the rest of the group in data transfer operations as this may cause a need for unlimited amount of buffer storage, instead the de journal clock synchronization provides for maximum buffer size needed for cooperative processors work. This basic SONET technique is typically obeyed for operating fiberoptic communications among physically separate system modules across the globe.

Alternate Embodiment #1

An alternate embodiment (referred to herein as Alternate Embodiment #1) is similar to the embodiments described above, with the exception of a different functional emphasis: the majority of arithmetic and logic units are replaced by high speed I/O Functional Units, for example 16 Functional Units each having one high speed serial input and one high speed serial output. The I/O Functional Units operate InfiniBand, DWDM fiberoptic Ethernet or DWDM fiberoptic SONET interfaces, depending on the model implementation choices.

In Alternate Embodiment #1, units serve as interconnect hubs, controls and flow monitors traffic in production groups, interaction buffers, and organization of large memory banks. In this embodiment, the processor may have a separate program memory for security reasons. The program memory may be inaccessible to electronic data transfers throughout the system. This feature allows the processor to operate with the assurance that no electronic means may compromise the programs.

Alternate Embodiment #1 may viewed as a communication switch or a router, however an advantage of the architecture definition is the inclusion of external data streams as infinite Variables such that both data processing and communications can use the same programming paradigms throughout systems and programs and Variables can reside in a single processor or be literally distributed among many processors in physically separate systems and still be viewed and programmed in the same Variable namespace of a unified system.

Alternate Embodiment #2

In some computing applications, the parallel nature of the computation is most discerned in the innermost loops. This type of application may be also referred to as microparallelism. Other problems may, however, display massively parallel nature only at a gross level (macro parallelism). Examples are commercial transaction processing such as airline reservations, customer transactions in the banking industry, online retail transactions; transactions of "cloud computing" storage services, etc., those transactions include massively parallel, computing systems interacting with millions of users.

The macro parallel nature of this type of massively parallel computing is typically present only at the full transaction level; each individual customer has to be handled individually. This type of computing rarely engages a significant amount of floating point processing, or even significant local, parallel, fixed point processing. The individual transactions perform a small amount of computation and mostly entail context switching among a plethora of routines; the parallel nature is in the millions of users engaged in the transactions, or in case of "data mining" the work typically involves sequential search for fit to a pattern(s) per individual record. The parallelism in the examination of billions of individual information records in search of patterns is that the work is done in parallel by multiple processors.

In the macro-parallelism or most personal use environments there may be no significant performance advantages for having multiple copies of functional units (thought gaming and graphics are quickly changing this picture). In another alternate embodiment (referred to herein as Alternate Embodiment #2), a data structure includes only a single copy of each functional unit. This embodiment may be an implementation of the general architecture described previously, in this case using its own version of the instruction set or using an instruction set compatible with the versions described above containing multiple FUs.

As with the embodiments described above, the computing device may, in this embodiment, use a three level control structures; the LU level (multiple instruction interpretation per cycle), the dynamic VLIW level (issuing actions on behalf of multiple instructions in terms of Variables operation) and the Mentor level (mapping Variable IDs to physical operand addresses for main Memory and for the Bins). The data structure may contain a Frames/Bins structure to accommodate Variable LHSM functions including Variable's cache operations, speculative undo, etc.

In this embodiment, rather than using, for example, four main Memory busses, there may be only a single bus. The single bus significantly reduces the number of I/O interconnects such that the computing device may be implemented using the silicon process and packaging techniques common to present IPL processors rather than requiring more demanding design considerations associated with PIM or other technologies. The internal parts spares strategy may or may not apply as the main elements left having potential multiple copies are the Frames/Bins structure and Mentor circuits.

The change from 8 sets of FUs to a single set of FUs may indicate a change from the spares parts strategy to a strategy befitting an ensemble of unique parts. In this case the Mentor section may be a set of physical Mentors or a structure that architecturally may be envisioned as a set of N copies of the Mentor circuit but the "N-Mentors-circuit" may be designed as a single unit having memory banks that hold individual Mentor information interconnected to a set of shared indexing arithmetic/logic elements, where the number of indexing arithmetic/logic elements is dictated by the indexing and bounds check work flow.

The size and number of Frames in this alternate embodiment may be similarly optimized to provide a proper fit to the work flow. Multithreading and conscious thread strategy may be emphasized to enable OS and application programs environment each to have an active response context switch for active threads.

The ALL HLL Statement

In some embodiments, a high level language implements an ALL statement (or another word with equivalent effect as further described herein). In this implementation, the order of doing the operations is irrelevant to the intent of the program. The machine should perform the operations in the order that will maximize performance.

In existing high level languages (HLLs), there may be no distinction between the use DO (or its equivalent FOR) for true sequential dependency as it exists in a Fibonacci sequence computation (See FIBONACCI below) and in DO use in algorithms where the DO statement and the DO index are used as linguistic means of enumeration, where enumeration is strictly as a way of identifying the number of operands as in the case of the following ADD-ARRAYS example.

In the suggested improvement the programmer uses the ALL instead of DO to indicate enumeration for the sake of operand naming only. Also the compiler, when recognizing that the DO indexing is used strictly for operand ID automatically replaces the DO (or FOR) phrases with ALL phrases in ADD-ARRAYS, so it appears as:

BEGIN ADD-ARRAYS;

ALL $I=1,P$;

$D(I)=A(I)+B(I)+C(I)$;

END ALL;
END ADD-ARRAYS;

If however a program contains the statement:
BEGIN FIBONACCI;

$A(1)=K; A(2)=L$;

ALL $I=3,N$;

$A(I)=A(I-1)+A(I-2)$;

END ALL; END FIBONACCI;

The ALL phrase in FIBONACCI is flagged as an error due to operand dependencies and the error message specifies the offending entries as; A (I−1) and A (I−2).

Adding the ALL phrase, especially in complex programs relates to performance and to quickly resolving issues where the programmer expects high performance due to the parallel nature of the code and receives poor performance results.

Using ALL, the programmer can clearly distinguish between a case where the compiler did not recognized the parallel nature of the code and the case where the compiler recognizes the parallel nature of the code but either the object code or the hardware are doing a poor job in taking advantage of it. So, while one does not normally classify slower than expected performance as errors unless real time systems are involved, bringing coherency to the picture by using expanded semantic is fundamental to robustness as well as a tool for getting performance on track.

A linguistic look at the problem shows one that most present HLLs and machine languages do not have a "plural form" in the language and use the "N times singular" where a plural form should be used. The ALL statement is by definition a plural form, indicating that the operations may be performed all in parallel.

In the example above, augmenting HLL semantics with the ALL word may enhance robustness and along the way performance. The incorporation of the corresponding parallel activity in the system described above may enable the computing device, that includes the corresponding machine language ALL Op Code to take full advantage of parallelism in the code as during run time the hardware may not have sufficient time to analyze the code, especially in a complex program, and discern that there are no operand dependencies barring parallel operations among the "iterations" in the loop, as all the "iterations" may be performed in parallel or any combination of serial and parallel. Specifically the so called "iterations" in case of ALL are not "iterations" but a linguistic method for including the "plural" form in the HLL and in the machine language (like a "cold shoulder" having little to do with either).

Simple Relaxation Algorithm

This example was chosen due to the fact that it is a simple demonstration of issues (and provides solutions) relating to lacking plural form, issues existing in complex modeling algorithms where typically the algorithms are much more complicated and the problems show out in code porting and are hard to isolate and demonstrate.

The following example demonstrates a problem one may encounter when moving code from sequential to parallel operation and the results, differ causing a compatibility problems, tracing the problem shows that the source of incompatibility is that sometimes the problem is in "the new results are too accurate". The problem is important due to the fact that it is part of the need for the inclusion of "plural properties" in computer language code both in HLL and machine language.

In a simple relaxation algorithm the value of a cell in a matrix is computed by averaging the four neighboring cells. In this example assume we are using the simple relaxation algorithm to model the behavior of a surface of a water pond after we dump a cup of water in its middle. For the example we chose a square pond and are using a 14×14 cell matrix "A" to represent the ponds water surface. All surface value points are initially set at "0" with exception of the center A (7,7) where a disturbance of 10,000 is introduced.

The mathematical equation representing the simple relaxation algorithm is:

$$A(i,j)=(A(i,j-1)+A(i-1,j)+A(i+1,j)+A(i,j+1))*0.25$$

A simple way to convert the simple relaxation algorithm to a program for an N×N (14×14) matrix "A" is:

$T=2; DO\ j=1,N;\ DO\ i=1,N;$ $A(i,j)=0;$

END DO; END DO;

$A(7,7)=10000; M=N-1;$ $DO\ k=1,T;\ DO\ j=2,M;\ DO\ i=2,M;$ $A(i,j)=(A(i,j-1)+A(i-1,j)+A(i+1,j)+A(i,j+1))*0.25;$

END DO; END DO; END DO;

Simple Relaxation Algorithm A

There are two artifacts created by the fact that the computer algorithm is using a substitution instead of solving the equation presented by the mathematical model.

Specifically the algorithm computes one cell at a time while in the physical system all the cells are acting simultaneously. This causes two types of problems; the first problem is that the sequential execution causes a "smear effect", which introduces an error into the computed results. The second problem is performance degradation due to operand dependency caused by the sequential relation introduced not by the original physical model but by the algorithm.

Table 1 shows the result of computing "Relaxation Algorithm A" program. Table 1 shows the results after the first two loop iterations. Table 1 clearly shows discrepancy as compared to the physical phenomena where the discrepancy is caused by the smear errors. One would expect ripples in a pond, similar to the case when a stone is thrown into the pond, this ripple effect does not appear in the results displayed by Table 1. Table 1 also clearly shows that the direction of computation is from left to right and from top to bottom.

This error artifact is due to the fact that the value of $A(i,j-1)$ and $A(i-1,j)$ are the results of present iteration, while the values $A(i+1,j)$ and $A(i,j+1)$ are the results of previous iteration. Some may recognize the issue as a "version control" mix up.

A correct model, true to the modelled physical phenomena should make all iteration K values base on the results obtained in iteration K−1, doing so will introduce no computation bias or smear errors as all new values will be independent of the sequence and time when they were obtained.

TABLE 1

Results of Relaxation Algorithm A

| | J=1 | 2 | 3 | 4 | 5 | 6 | 7 | 8 | 9 | 10 | 11 | 12 | 13 | 14 |
|---|---|---|---|---|---|---|---|---|---|---|---|---|---|---|
| I=1 | | | | | | | | | | | | | | |
| 2 | | | | | | | | | | | | | | |
| 3 | | | | | | | | | | | | | | |
| 4 | | | | | | | | | | | | | | |
| 5 | | | | | | | 625 | 313 | 117 | 39 | 12 | 3.6 | 1.1 | |
| 6 | | | | | | 1250 | 937 | 469 | 195 | 73 | 26 | 8.7 | 2.8 | |
| 7 | | | | | 625 | 937 | 703 | 390 | 108 | 50 | 23 | 9.3 | 3.5 | |
| 8 | | | | | 156 | 430 | 381 | 242 | 109 | 48 | 21 | 8.7 | 1.4 | |
| 9 | | | | | 39 | 168 | 174 | 125 | 69 | 34 | 16 | 6.9 | 2.4 | |
| 10 | | | | | 9.8 | 59 | 71 | 58 | 37 | 20 | 10 | 2.5 | 1.4 | |
| 11 | | | | | 2.4 | 14 | 29 | 25 | 17 | 10 | 5.5 | 2.1 | 1.0 | |
| 12 | | | | | .61 | 4.9 | 9.6 | 9.8 | 7.6 | 4.9 | 2.9 | 1.4 | .65 | |
| 13 | | | | | .15 | 1.6 | 3.3 | 3.7 | 2.9 | 2.1 | 1.4 | .65 | .49 | |
| 14 | | | | | | | | | | | | | | |

When we make the algorithm immutable to the iteration (stay true to version control) as shown in the following Relaxation Algorithm B the results are different as they do not have either computation bias or smear artifacts.

DO j=1,N; DO i=1,N; A(i,j)=0;
END DO; END DO;

A(7,7)=10000;

M=N-1; DO k=1,T; DO j=2,M; DO i=2,M;

A1(i,j)(A(i,j-1)+A(i-1,j)+A(i+1,j)+A(i,j+1))*0.25;
END DO; END DO; END DO;

DO k=1,T; DO j=2,M; DO i=2,M;

A(i,j)=(A1(i,j-1)+A1(i-1,j)+A1(i+1,j)+A1(i,j+1))*0.25
END DO; END DO; END DO;

Simple Relaxation Algorithm B

A basic change in the algorithm, specifically the inclusion of iteration version discipline produces accurate presentation of the physical phenomena and the results are devoid of the "smear" effects. All computations are performed based on the results of the correct previous iteration(s). Relaxation algorithm B has introduced a computational "iteration version control" into the algorithm. Also, to avoid extra computations and simultaneously achieve version control the inner DO loops are duplicated. This is done to avoid copying the array to a temporary array and then storing the results in "A" array.

The results for present iteration are computed based on data entries from previous iteration. The results presented in Table 2, obtained after one iteration that corresponds to algorithm A two iterations, are symmetric and represent the ripple effects one would expect. Also note that the effective ripple spread per iteration (toward the upper left corner) is the same in both algorithms A and B.

Relaxation Algorithm B

TABLE 2

| Results of Relaxation Algorithm B | | | | | | | | | | | | | | |
|---|---|---|---|---|---|---|---|---|---|---|---|---|---|---|
| J = 1 | 2 | 3 | 4 | 5 | 6 | 7 | 8 | 9 | 10 | 11 | 12 | 13 | 14 | |
| I = 1 | | | | | | | | | | | | | | |
| 2 | | | | | | | | | | | | | | |
| 3 | | | | | | | | | | | | | | |
| 4 | | | | | | | | | | | | | | |
| 5 | | | | | | | 625 | | | | | | | |
| 6 | | | | | | 1250 | 0 | 1250 | | | | | | |
| 7 | | | | | 625 | 0 | 2500 | 0 | 625 | | | | | |
| 8 | | | | | | 1250 | 0 | 1250 | | | | | | |
| 9 | | | | | | | 625 | | | | | | | |
| 10 | | | | | | | | | | | | | | |
| 11 | | | | | | | | | | | | | | |
| 12 | | | | | | | | | | | | | | |
| 13 | | | | | | | | | | | | | | |
| 14 | | | | | | | | | | | | | | |

Another outcome is that Algorithm B produces the same results independent of amount of parallel actions deployed. For example, four processors running four quadrants of the matrix will produce different numeric results as compared to a run by a single processor when using Algorithm A. The four processors will produce the identical numeric results as a single processor when running Algorithm B. Thus Algorithm B is portable to parallel systems.

Computation Speed Up

In addition to portability and accuracy one gets a significant speed improvement in processors capable of deploying any form of parallel computations, and specifically micro parallelism. A superscalar execution of Algorithm A will typically take about 16 cycles per A(i,j) computation due to operand dependency on previous operand, specifically A(i-1,j). The three operations affected by operand dependencies are two ADD operations, the first set using the A(i,j-1), and the second one using the result of the first ADD and finally the and MPY (*0.25) operation.

The same ILP superscalar may perform a single A(i,j) of Algorithm B computation in about 8 cycles if the IMMUTABLE (version control) discipline is enforced, about half of the time since the IMMUTABLE computation arrangement guaranties that there is no operand dependencies caused by the algorithm.

Both operands A(j-1,i) and A(i-1,j) are responsible for introducing smear errors into Algorithm A as they both bring the wrong iteration level values. However only A(i-1,j) is responsible computational delays due to operand dependency, as A(j-1,i) was computed many cycles earlier.

The compiler in an ILP processor code may generate additional operand dependencies if insufficient amount of work registers are assigned.

Performance improvement may be further gained by micro parallelism once version control that automatically abides by computation immutability is instituted into the algorithm by the iteration version control statement in the HLL and machine languages. Please also note that while computation immutability may be achieved declaring the arrays immutable and thus requiring two copies of the original array, other technique requiring less memory space may also work. Therefore one should note that immutable arrays and version controlled IMMUTABLE code sections are related but they are not the same thing.

In context of the embodiments described herein, introducing version control methods into source code language, the subject is important since it brings the correct results to algorithms that previously suffered from "smear effects" and enables micro and macro parallel operations in code that is presently classified as serial though the algorithm may model an "embarrassingly parallel" process.

Method of Introducing Version Control into Present HLL Programs

The method of introducing operand version control described is through the use of an iteration revision control context statement into the HLLs. The advantage of a context statement is that it does not force or limit the compiler to a single type of solution such as the use of immutable arrays. The statement only requires that either the compiler or the user provide a solution that will pass muster in processing the algorithm according to iteration version control discipline.

The following approach introduces a key word be it VERSION CONTROL, IMMUTABLE or another key word into a program closure in a form of:

```
BEGIN IMMUTABE
....
....
....
END IMMUTABLE
For example see the enclosure of Algorithm A below:
BEGIN IMMUTABLE;
DO k=1,T ; DO j=2, M ; DO i=2,M ;
A(i,j)=(A(i,j-1)+A(i-1,j)+A(i+1,j)+A(i,j+1))*.25;
END DO ; END DO ; END DO ;
END IMMUTABLE;
```

The method of context enclosure request that the compiler verifies the immutability of the algorithm and if it is not observed the compiler should make the necessary corrections, including interactions suggestions how to modify the algorithm and other necessary changes. Therefore, it is the responsibility of the compiler to interact with the programmer and both suggest methods to achieve iteration level operand control and certify to the hardware that the code section indeed does not have results distortion (smear) or operand dependency in array computation.

The techniques deployed in Algorithm B are quite different from immutable array techniques deployed for example in the Haskell compiler. Where immutable arrays need to be basically "read only" for the duration of the algorithm the revision controlled or immutable algorithm need only to guaranty that version control is not violated. One can achieve version control through immutable arrays, Ping-Pong array computing as illustrated in Relaxation Algorithm B or several other methods.

The "Context Statement", Increasing Lexicon to Accurately Convey Information

Better (pertaining to "conceptual units" and programming of conceptual units properties) HLL and machine language lexicons (expanded language that includes information relevant to "plural form") may simplify the hardware as well as software design, especially taking advantage of the lexicon rich context dependent approach to enable robust systems in terms of error prevention/detection in the program debug cycle and in malware detection resistance. In this Simple Relaxation section, a context dependent approach also serves as a key to better design and migration of software—independent of hardware consideration.

For example, the construct:
BEGIN IMMUTABLE $DO\ j=2,M;\ DO\ i=2,M;$ $A(i,j)=(A(i,j-1)+A(i-1,j)+A(i+1,j)+A(i,j+1))*0.25;$

END DO; END DO;
END IMMUTABLE may be preferable to the following three "algorithmic" constructs:
Construct A $DO\ j=2,M;\ DO\ i=2,M;$ $A1(i,j)=(A(i,j-1)+A(i-1,j)+A(i+1,j)+A(i,j+1))*0.25;$

END DO; END DO;

$DO\ k=1,T;\ DO\ j=2,M;\ DO\ i=2,M;$ $A(i,j)A1(i,j);$

END DO; END DO; END DO;
COMMENT Forced iteration control by use of A1 as temporary;
Construct B $DO\ j=2,M;\ DO\ i=2,M;$ $A1(i,j)(A(i,j-1)+A(i-1,j)+A(i+1,j)+A(i,j+1))*0.25;$

END DO; END DO;

$DO\ k=1,T;\ DO\ j=2,M;\ DO\ i=2,M;$ $A(i,j)=(A1(i,j-1)+A1(i-1,j)+A1(i+1,j)+A1(i,j+1))*0.25;$

END DO; END DO; END DO;
COMMENT Alternate use of A and A1 for more efficient execution;
Construct C $DO\ j=2,M;\ DO\ i=2,M;$ $C=B(i);$ $B(i)=(A(i,j-1)+A(i-1,j)+A(i+1,j)+A(i,j+1))*0.25;$ $A(i,j-1)C;$ END DO; END DO;
COMMENT: A one dimension array the size of one column of A is used as a temporary storage. This minimizes the extra temporary storage in case of very large arrays, however the use of the transfer variable C generates operand dependencies that slows computation;

While the constructs A, B, and C each represents a "literal algorithm", each has disadvantages. The form using, IMMUTABLE context lexicon extension presents the algorithm in unambiguous terms both as to stating the true intent and of producing the correct results.

Full Parallel Operation of Simple Relaxation Algorithm

Figure 26:
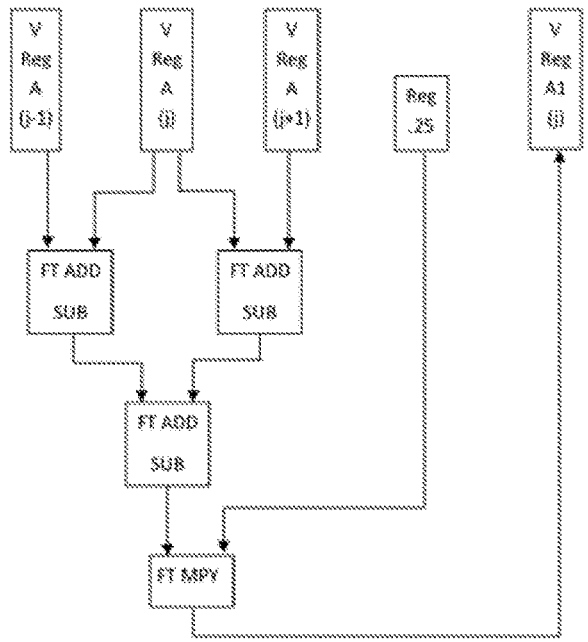
FIG. 26 is an operational flow diagram of a simple relaxation algorithm using array processing with multiple ADD and MPY functional units.

FIG. 26 is a flow diagram of array parallel processing for $A1(i,j)=(A(i,j-1)+A(i-1,j)+A(i+1,j)+A(i,j+1))*0.25;$ using two outputs one input arrays achieving the performance of one A1(i,j) computation per single cycle.

The result of using the combination of immutable algorithms and micro parallelism produces accurate and true results with a performance improvement factor of about 16 over an ILP processor for the simple relaxation algorithm, this type of micro parallelism may be used by the pipeline and parallel (8+1) FU data structure.

DONA Instruction Long Range View

In some embodiments, DONA (Direct Operand Namespace Architecture) is employed to create a machine level language that meets the goals of the "Variables" model. Three areas in the "Variables" model may be addressed by DONA:

The data domain
The program scope domain
The mapping domain

In the data domain area DONA provides a machine language that is cognizant of the concept "Variables". In this context, variables are defined as data entities and mapped to the physical address spaces they occupy in memory and in the Bins. While the DONA definition should be independent of specific implementation of processor hardware such as number of Mentors or the size of Bins, the Mentor/Bin concept is intrinsic to the DONA language as it provides the supporting mechanism in hardware for the concept of "Variables".

The program scope domain asserts that in the Variables environment "instruction interpretation is extended to the control section "comprehending" program segments such as entire inner loop or small routine this has both performance and energy efficiency advantages as the machine, for example, need not re interpret instructions on each iteration.

The mapping domain asserts that the use of "Variables" deploys namespace mapping techniques to both keep program size small and use the name-tables in support of bounds checks and other software robustness capabilities.

Figure 27:
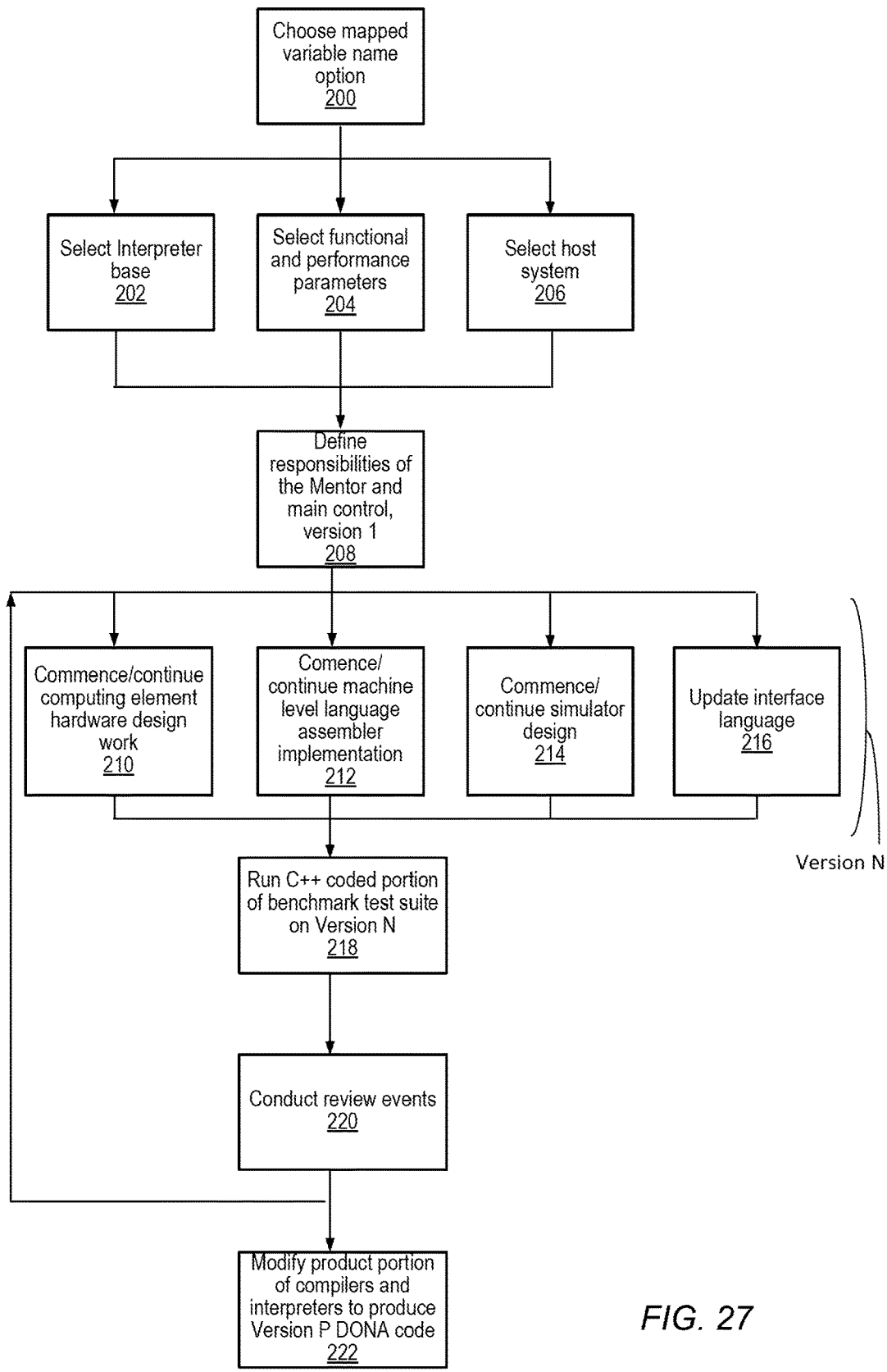
FIG. 27 illustrates an example of work flow in synchronized hardware and software development based on the use of C++ as software migration base.

FIG. 27 illustrates an example of work flow in synchronized hardware and software development based on the use of C++ as software migration base for the DONA machine instruction set as well as the very definition of the DONA instruction set. The computing device hardware development contains many complex tasks including selection of silicon process, clock cycle, pipeline strategy, CAD choices, etc. the following discussion highlights only the DONA definition and software migration.

At 200, the "mapped" Variable name option is selected. In this example, the mapped Variable name option is chosen over "Name=Memory-Address". The mapped option has advantages in code compactness, robustness, security and moving away from centralized to local processor governance in the OS. "Name=Memory-Address" method is also in conflict with the implementation of "Infinite Variables" and the inclusion of network(s) and instrumentation in the basic processor model (those Variables are not in Memory).

At 202, the Interpreter base (C++, Visual C++, Java, etc.) is selected. For purposes of the descriptions of the work flow in FIG. 25, C++ is assumed.

At 204, the functional and performance test suites (LINPACK-HPL, STREEM, PTRANS, etc.) are selected.

At 206, a "Host" system is selected. The two basic criteria are that it includes a C++ interpreter, key applications and all test suites run on the host and that a major portion of OS is coded in C++.

At 208, the responsibilities of the Mentor and the responsibilities of the Dynamic VLIW (or main control) are defined. In addition, all official datatype including polymorphisms (issues based context dependent data definition) may be defined. "Version 1" of DONA the machine-language formats and Op Codes for code proper, Mentor setup, addressing formulas, Mentor setup and VMF formats are also defined. FIG At 210, "computing element" hardware design work is continued/commenced using "Version N" information.

At 212, "Machine language level" assembler implementation is commenced/continued by modifying the C++ interpreter into a compiler type program where the "production" portion generates "Version N" DONA code. Portions of the C++ functions in the interpreter that are not performance critical may stay as a part of the assembler and thus not move to the hardware and/or Dynamic VLIW microcode of the computing device. The intent is to provide the best DONA definition, which is not the same objective as making the "computing element" a C++ processor.

At 214, simulator design is commenced/continued. Simulator design may be done by modifying the C++ interpreter to accept "Version N" code.

At 216, interface language and other parameters of test suite part implemented in C++ are updated as needed (e.g., per current DONA definition.)

At 218, C++ coded portion of benchmark test suite is run on Version N.

At 220, review events are conducted. Reviews may be in the form of scheduled and impromptu project review events, including synchronized reviews for the release of Version N+1 of DONA, the computing element "machine language definition". The reviews in a chip development schedule may be typically quarterly and/or based on scheduled completion of specific goals such as FU logic design completion, data structure logic design completion, etc.

At 222, port all needed production portion of the compilers and interpreters, (FORTAN, Java, etc.) to produce "Version P" DONA code.

At 224, all tests are run, as well as all other tasks in product delivery.

The term "Object Oriented systems" is discussed herein in a broader view than the definitions given in technical dictionaries and textbooks. According to our view the first computer system to use the Objects paradigm was the 1961 Bouroughs-B5000 conceived by Robert S. Barton, built years before the term Object Oriented was coined. The B5000 had 51 bit word, 48 data and 3 for the rights/properties descriptor.

The Bundle of Rights Paradigm

The Object Oriented model that was developed in the 70's may be considered a variation of the legal real estate "bundle of rights" model.

Only sovereign entities (countries) "own" real estate properties. What the rest of us may own is a "bundle of rights" to a parcel, where others (city, utility) may own easements and other rights to the same parcel (tax, etc.) The bundle of rights may not for example include for example the right to operate a grocery store in your back yard.

In addition to rights, the parcel has natural properties; it may be flat, hilly, rocky and may for example border a river which may bestow on it rights to use river water. So "rights" and "properties" are interlinked.

The reason for this broader view is that present Object Oriented systems using "Object, Class, Abstraction, Encapsulation, Inheritance, Polymorphism, Overloading" are designed specifically for the needs of Operating Systems coders. As long as OS software only is involved, classifying Object Oriented as belonging to the "bundle of rights" paradigm is mostly philosophically interesting.

However we have included in the hardware of the computing device the Mentor/Bins as the Mechanism to implement the "bundle of rights" paradigm. We use the C++ (or other OS Object software base) for the software porting task. It is clear however that the same Mentor/Bins structure may be very useful in the construction of computing systems with different sets of rights/properties than the C++ Object Oriented set for implementing for example franchise operators software, real estate escrow system, or airplane design and simulation system where properties of an airframe part are associated with the material (aluminum, carbon-fiber), natural resonance of the part, icing resistance of the coating, etc.

Once various data types have been defined for C++, why should not the same data types be used for all other computer languages? For example, for the Fortran used in coding the airframe simulator? The data types and instructions can certainly be used to do the Fortran tasks, but that can also leads to large inefficiencies and frustration in coding programs.

Consider the case that in the C++ choices; selected for OS coding tasks all forms of parallelisms (macro and micro) may be converted to multi threads for past compatibility reasons, and all shared files encrypted for OS security reasons.

Those choices however will produce extremely inefficient code in Fortran since the micro parallelism capabilities of the hardware are not used, and in the shared files that are used for communications between the mechanical drawing and the finite element simulator security is not an issue, but the overhead is daunting. To optimize the code, an aeronautical engineer may have to code his program in C++, a language he may find hard to learn and full of esoterica, useless for his task.

In some multiprocessor systems, the lion's portion of the overhead may be associated with the fact that, unless programs share space in a memory, communications among them may take place only through highly "bureaucratic" protocol laden OS I/O interactions. In system containing infinite Variables the OS may set communications rules and associate transmission standards (for encryption, error response, etc.) but once communications links are authorized by the OS, application layer programs in different processors may directly transfer/receive data to/from each other subject only to the existence and limits of the physical/logical links.

By way of analogy, consider a situation in which the US Post Office is be limited to delivering mail in the US. A letter to a friend in Athens is sent to: Friend's address in Athens, Colo.: Hellenic Republic embassy, 2217 Massachusetts Ave NW, Washington, D.C. 20008. A clerk in the embassy goes through each letter to makes sure the letter passes Greek spelling and grammar checks before forwarding your letter to your friend in Athens. Under the system described herein, in effect, the Greek and US embassies might agree to use the international post office protocol and both USA and Greek postal systems just ship each other mailbags. The corresponding embassies are free to tend to diplomatic matters.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

A computing system may include, and/or may be implemented as, multiple functional modules or components, with each module or component including one or more resources (e.g., computing resources, storage resources, database resources, etc.). A system may include more or fewer components or modules, and a given module or component may be subdivided into two or more sub-modules or sub-components. Also, two or more of the modules or components can be combined.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A computing device, comprising:
   a main memory;
   a local high speed memory configured to implement a frames/bins structure, wherein the local high speed memory comprises:
   a plurality of frames, each of at least two of the frames comprising a physical memory element; and
   a plurality of bins distributed in the plurality of frames, wherein each of the bins comprises a logical element, wherein each of at least two of the plurality of bins is configured to store information for a variable, wherein each of at least two of the variables corresponds to a conceptual unit and comprises:
data comprising a set of operands;
a variable descriptor; and
a variable ID;
a plurality of mentor circuits, wherein each of at least two of the mentor circuits is assigned to a particular one or more of the variables, wherein each of the at least two mentor circuits is configured to perform cache management and operand addressing operations with respect to at least one of the particular one or more variables to which the mentor circuit is assigned;
a control circuit configured to control a main program flow, wherein the main program flow includes calculating one or more end operands;
one or more functional units configured to perform operations relating to one or more variables stored in at least one of the bins, wherein each of at least one of the variables comprises one or more words;
one or more interconnects between the main memory and the local high speed memory; and
one or more interconnects between the local high speed memory and the one or more functional units,
wherein the mentor circuits are configured to perform the cache management and operand addressing operations with respect to the variables in parallel with one another and in parallel with operations by the control circuit in the main program flow, and
wherein each of the at least two of the variables is assigned to a particular bin within one of the frames of the local high speed memory,
wherein the computing device is configured to synchronize operand traffic streams to or from the bins of the local high speed memory as requested by or on behalf of the mentor circuits by main or other control, wherein, for each mentor circuit assigned to one or more variables, the mentor circuit performs cache management with respect to the particular bin or bins assigned to those one or more variables.

2. The computing device of claim 1, wherein at least one of the two bins stores an "Object".

3. The computing device of claim 1, wherein at least one of the variables stores an "Object" belonging to an interpreter system.

4. The computing device of claim 1, wherein each of at least one of the bins is distributed across two or more of the frames.

5. The computing device of claim 1, wherein at least one of the mentor circuits is configured to implement a self-bounds check for at least one of variables.

6. The computing device of claim 1, wherein each of at least two of the mentor circuits is configured to enhance security by performing one or more intrusion bounds checks with respect to variables to which the mentor circuit is assigned.

7. The computing device of claim 1, wherein one or more interconnects between the local high speed memory and one or more functional units comprise:
two or more frames/bins interconnect circuits, wherein at least two of the frames/bins interconnect circuits are going to the one or more functional units; and wherein at least two of the frames/bins interconnect circuits are coming from the one or more functional units.

8. The computing device of claim 1, wherein each of at least two of the variables is associated with two or more words.

9. The computing device of claim 1, further comprising one or more tarmac registers associated with each of two or more of the functional units, wherein each of at least two of the tarmac registers is configured for staging of one or more of the operands in cases of conflicts, and configured to align operand traffic among two or more of the operands.

10. The computing device of claim 1, wherein the computing device is configured to perform speculative execution on at least one variable.

11. The computing device of claim 1, wherein at least one of the interconnects comprises a crossbar interconnect, wherein the crossbar interconnect is configured such that the computing device performs parallel streaming by operand data sent and received via multiple ports.

12. The computing device of claim 1, wherein at least one of the frames is a frame spare, wherein the frame spare is configured to replace a flawed or failed frame section of the computing device.

13. The computing device of claim 1, further comprising at least one functional unit spare, wherein the at least one functional unit spare is configured to replace a flawed or failed functional unit section of the computing device.

14. The computing device of claim 1, further comprising at least one mentor circuit spare, wherein the at least one mentor circuit spare is configured to replace a flawed or failed mentor circuit section of the computing device.

15. The computing device of claim 1, further comprising at least one crossbar spare, wherein the at least one crossbar spare is configured to replace at least one flawed or failed crossbar section of the computing device.

16. The computing device of claim 1, wherein at least one of the variables corresponds to a physical device used or controlled by the computing device.

17. The computing device of claim 1, wherein at least one of the variables corresponds to instrumentation or a sensor used or controlled by the computing device.

18. The computing device of claim 1, wherein at least one of the variables corresponds to a functional element of a system used or controlled by the computing device.

19. The computing device of claim 1, wherein at least one of the variables corresponds to a communication link used or controlled by the computing device.

20. A method of computing, comprising:
providing a plurality of frames in a high speed local memory, wherein the local high speed memory is coupled to a main memory by one or more interconnects and to one or more functional units by one or more interconnects, wherein each of at least two of the frames comprises a physical memory element; and
storing a plurality of variables in one or more bins distributed in the plurality of frames in the local high speed memory, wherein each of at least two of the bins comprises a logical element, wherein each of at least two of the variables corresponds to a conceptual unit and comprises:
data comprising a set of operands;
variable descriptor; and
a variable ID,
wherein storing the information for the plurality of variables comprises:
assigning each of the at least two variables to a particular bin within one of the frames of the local high speed memory;

controlling, by a control circuit of the processor, a main program flow of a processor, wherein the main program flow includes calculating one or more end operands;

assigning each of at least two mentor circuits of the processor to a particular one or more of the variables, wherein each of the mentor circuits is configured to perform cache management and operand addressing calculations with respect to the one or more particular variables to which the mentor circuit is assigned, wherein a first mentor circuit is assigned to at least a first one of the variables and a second mentor circuit is assigned to at least a second one of the variables;

performing, by each of at least two of the mentor circuits of the processor, cache management and operand addressing operations with respect to at least one of the one or more variables to which the mentor circuit is assigned, wherein each of at least one of the variables comprises two or more words, wherein at least some of the cache management and addressing operations are performed simultaneously in parallel with one another and in parallel with operations performed by the control circuit in the main program flow of the processor; and synchronizing operand traffic streams to or from the bins of the local high speed memory as requested by or on behalf of the mentor circuits by main or other control, wherein, for each mentor circuit assigned to one or more of the variables, the mentor circuit performs cache management with respect to the particular bin or bins assigned to those one or more variables.

21. The method of claim 20, where access and cycle time of a frame takes a single cycle.

22. The method of claim 20, where access and/or cycle time of a frame takes multiple cycles.

23. The method of claim 20, wherein each of at least two bins in the local high speed memory is configured to store a variable.

24. The computing device of claim 20, wherein at least one of the variables corresponds stores an "Object".

25. The computing device of claim 20, wherein at least one of the variables stores an "Object" in an interpreter system.

26. The method of claim 20, wherein each of at least one of the bins is distributed across two or more of the frames.

27. The method of claim 20, wherein at least one of the mentor circuits is configured to implement a self-bounds check for at least one of variables.

28. The method of claim 20, wherein at least one of the mentor circuits is configured to implement an intrusion bounds check for at least one of variables.

29. The method of claim 20, wherein one or more interconnects between the local high speed memory and the one or more functional units comprise:
    one or more frames/bins interconnect circuits going to the one or more functional units; and
    one or more frames/bins interconnect circuits coming from the one or more functional units.

30. The method of claim 20, wherein each of at least two of the variables is associated with two or more words.

31. The method of claim 20, further comprising
    of at least two functional units; and the one or more functional units comprise a copy of a functional unit.

32. The method of claim 20, wherein performing at least one operation comprises staging at least one operation using a tarmac register.

33. The method of claim 20, further comprising performing speculative execution on at least one variable.

34. The method of claim 20, wherein at least one of the interconnects comprises a crossbar interconnect.

35. The method of claim 20, wherein at least one of the frames is a spare, the method further comprising employing at least one of the spares.

36. The method of claim 20, further comprising/employing at least one functional unit spare.

37. The method of claim 20, further comprising employing at least one mentor spare.

38. The method of claim 20, further comprising/employing at least one crossbar spare.

39. The method of claim 20, wherein at least one of the variables corresponds to a physical device used or controlled by the computing device for interactions with instrumentation.

40. The method of claim 20, wherein at least one of the variables corresponds to a functional element of a system used or controlled by the computing device for providing communications links.

* * * * *